DIGITAL HELICOPTER TRAINER

INVENTOR
Franklin E. Papin
James R. Toler &
Simeon H. Cotton
BY Hurvitz, Rose & Greene
Allan M. Lowe ATTORNEYS

LEGEND

| | | |
|---|---|---|
| FIG.6a. | FIG.6b. | FIG.6c. |

DIGITAL HELICOPTER TRAINER

LEGEND

DIGITAL HELICOPTER TRAINER

Filed Sept. 20, 1966 22 Sheets-Sheet 9

Sept. 10, 1968 F. E. PAPIN ET AL 3,400,471

DIGITAL HELICOPTER TRAINER

Filed Sept. 20, 1966 22 Sheets-Sheet 13

Sept. 10, 1968 F. E. PAPIN ETAL 3,400,471

DIGITAL HELICOPTER TRAINER

Filed Sept. 20, 1966 22 Sheets-Sheet 15

Sept. 10, 1968 F. E. PAPIN ET AL 3,400,471

DIGITAL HELICOPTER TRAINER

Filed Sept. 20, 1966 22 Sheets-Sheet 21

United States Patent Office 3,400,471

Patented Sept. 10, 1968

3,400,471
DIGITAL HELICOPTER TRAINER

Franklin E. Papin, Annandale, Va., James R. Toler, Fort Washington, Md., and Simeon H. Cotton, Springfield, Va., assignors to Melpar, Inc., Falls Church, Va., a corporation of Delaware Filed Sept. 20, 1966, Ser. No. 580,745
69 Claims. (Cl. 35—12)

ABSTRACT OF THE DISCLOSURE

A helicopter simulator for training student pilots includes a student station with continuously variable controls simulating the actual continuously variable control mechanisms aboard a helicopter of the type simulated, these controls connected to potentiometers for developing variable voltages functionally representative of the character and extent of the respective control exercised on the actual helicopter by corresponding actuation of the actual flight control mechanisms. Also provided at the student station are on-off controls simulating those aboard an actual helicopter for engine ignition, landing gear activation and other operating or non-operating functions, and power sources for supplying discrete voltage levels in response to respective actuations of these on-off controls, the discrete levels being functionally representative of the character of the respective control exercised. The signals emanating from the student station are processed by a data processor, and appropriate digital computations are performed after analog-to-digital conversion of certain of these signals to generate information signals representative of the response of the helicopter to the control functions exercised by the student. The information signals are utilized to actuate a display at the student station simulating the instrument panel of the actual helicopter, thereby permitting observation by the student of the effect on the craft of his control operation. The digital computer within the data processor is also utilized to periodically compute the total effect on helicopter performance of the moments and forces exerted at selected observation points along the path of the rotor, and to supply these computations, or signals derived therefrom, as a portion of the information signals indicative of helicopter response.

*Introduction*

The present invention relates generally to helicopter trainers and more particularly to a digital helicopter trainer wherein the forces and moments due to rotor movement are considered.

Accurate simulation of helicopter flight, for training purposes, is complicated because the rotor blades are continuously changing in position during each segment of a cycle of rotation so that the forces and moments due to the blades are constantly changing. Utilizing straightforward techniques, computer simulation of the forces and moments due to the constantly changing rotor blades requires the solution of a multiplicity of continuous differential equations.

In a digital computer, however, it is not possible to solve a plurality of simultaneous differential equations because the computer inherently operates only on discrete quantities, rather than changing variables. In consequence, to simulate the effects of the rotor of a helicopter with digital computer techniques, straightforward techniques cannot be utilized.

According to the present invention, a strobe technique is utilized wherein the forces and moments at discrete points about the path covered by the helicopter blades are computed. At each of the points, the moments and forces introduced by each of the blades are averaged to arrive at a resultant value for the particular parameter being considered. In the specifically disclosed embodiments of the invention, twelve distinct points are selected at four different azimuth locations on three different radii. It is to be understood, however, that simulators utilizing in excess of twelve, and less than twelve, points or stations may be utilized.

It is a feature of the invention that the same apparatus, essentially, can be utilized to train personnel for flying different types of helicopters, including single and tandem rotor craft. It is possible to use the same equipment for simulating both single and tandem rotor helicopters because the trainer utilizes a general purpose computer having a memory which is preloaded with a program indicative of the aerodynamic constants and equations of the craft which a student is being trained to use. To change the craft being simulated, it is merely necessary to reprogram the computer memory with the required constants and equations for the new craft that is to be simulated.

Simulation of the tandem rotor helicopter, according to the present invention, is through the same general approach as for the single rotor helicopter, i.e., a multiplicity of discrete stations is selected at which the rotor forces and moments are calculated. The forces and moments for only the front or fore rotor of the tandem rotor helicopter are computed. The forces and moments due to the aft rotor are calculated as a function of the simulated angle between the swash plates of the two helicopter rotors. This is possible since, in an actual helicopter, the swash plates of the fore and aft rotors are coupled to each other through the control of the sticks and pedals.

It is, accordingly, an object of the present invention to provide a new and improved helicopter simulator.

It is another object of the present invention to provide a digital helicopter simulator that can be utilized for training personnel to fly a multiplicity of aircraft.

It is an additional object of the present invention to provide a digital helicopter trainer wherein the forces and moments of the rotor are calculated and utilized to control the performance of the system.

It is a further object of the present inveniton to provide a digital helicopter simulator wherein the forces and moments of the rotor are calculated by determining the average forces and moments at a plurality of discrete locations over the span of the rotor movement.

It is still another object of the present invention to provide a tandem rotor helicopter trainer utilizing a digital simulator.

It is an additional object of the present invention to provide a helicopter trainer, of the tandem rotor type, utilizing a digital computer in which the aft rotor calculations are based upon functions of the fore rotor calculations.

Still another object of the present invention is to provide a digital helicopter trainer wherein the instructor has the ability to freeze the operation of the system to prevent action by the student from further affecting the simulated performance of the craft.

A further object of the present invention is to provide a digital helicopter trainer wherein the occurrence of a crash condition, due to action taken by the student, causes a freeze signal to be derived to prevent the student from removing the craft from the crash condition, without having himself or the instructor apprised of the crash.

A further object of the present invention is to provide a digital helicopter trainer wherein the normal operating mode of a gas turbine motor is simulated.

Still an additional object of the present invention is to provide a digital helicopter trainer wherein the forces and moments due to the tail rotor of a single rotor helicopter are simulated.

Yet another object of the present invention is to provide a digital helicopter trainer wherein the effects of the landing gears are considered.

An additional object of the present invention is to provide a digital helicopter trainer wherein the following simulated effects are calculated and displayed: altitude of the craft, speed of the rotor, gas generator speed, indicated air speed, engine power turbine speed, rate of climb, rate of turn, engine torque, slip angle, pitch angle, air temperature of the environment in which the helicopter is simulated, and roll angle.

The above and still further objects, features, and advantages of the present invention will become apparent upon consideration of the following detailed description of one specific embodiment thereof, especially when taken in conjunction with the following drawings, wherein.

Figure 5:
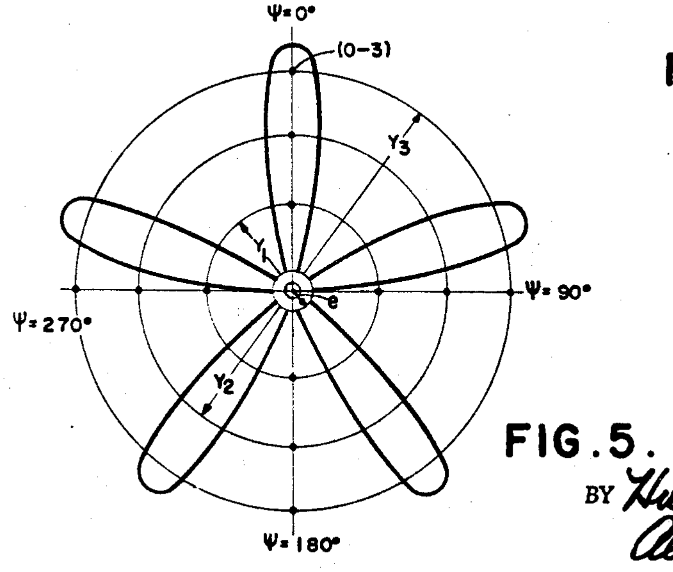
Figure 6A:
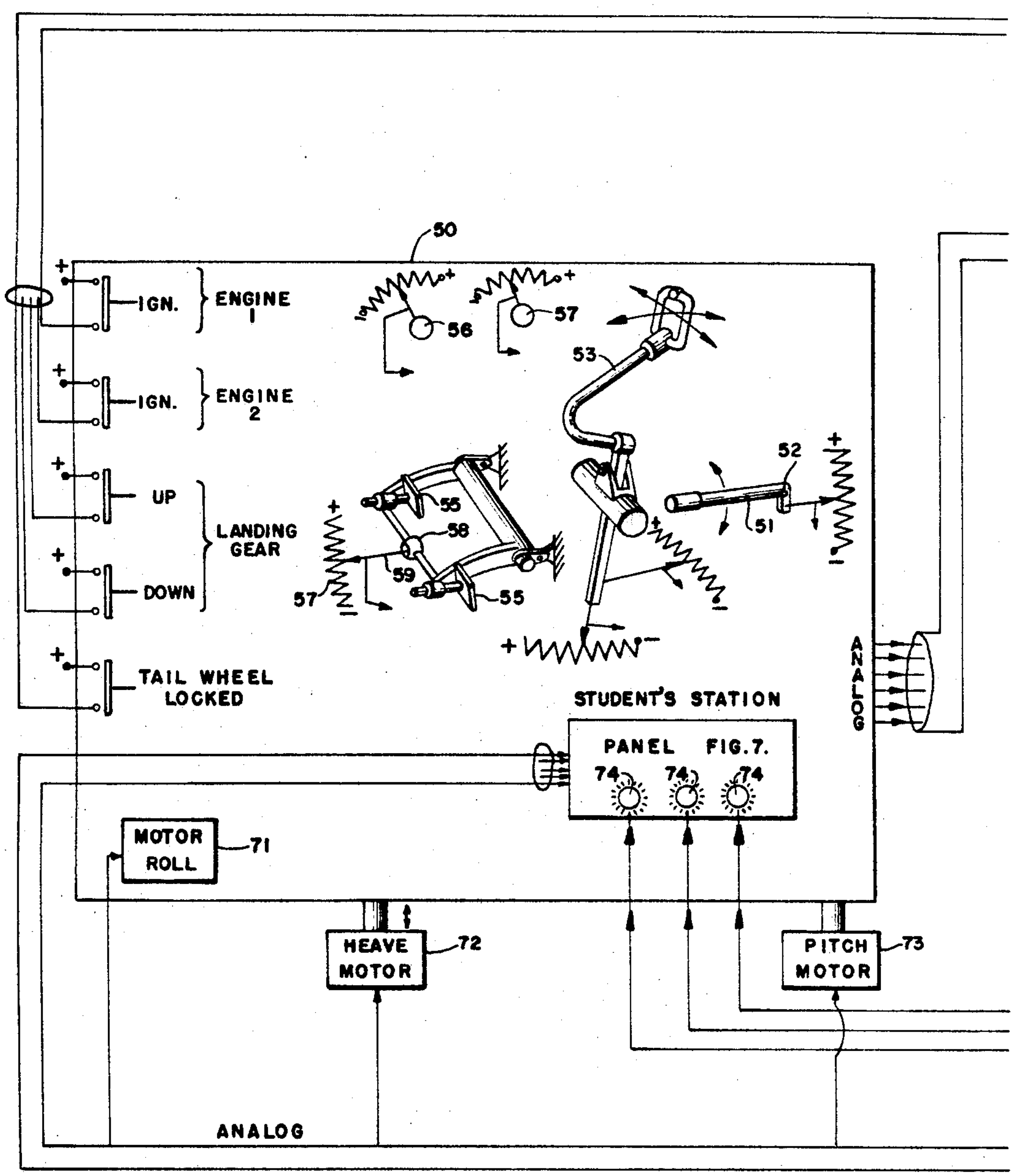
Figure 6B:
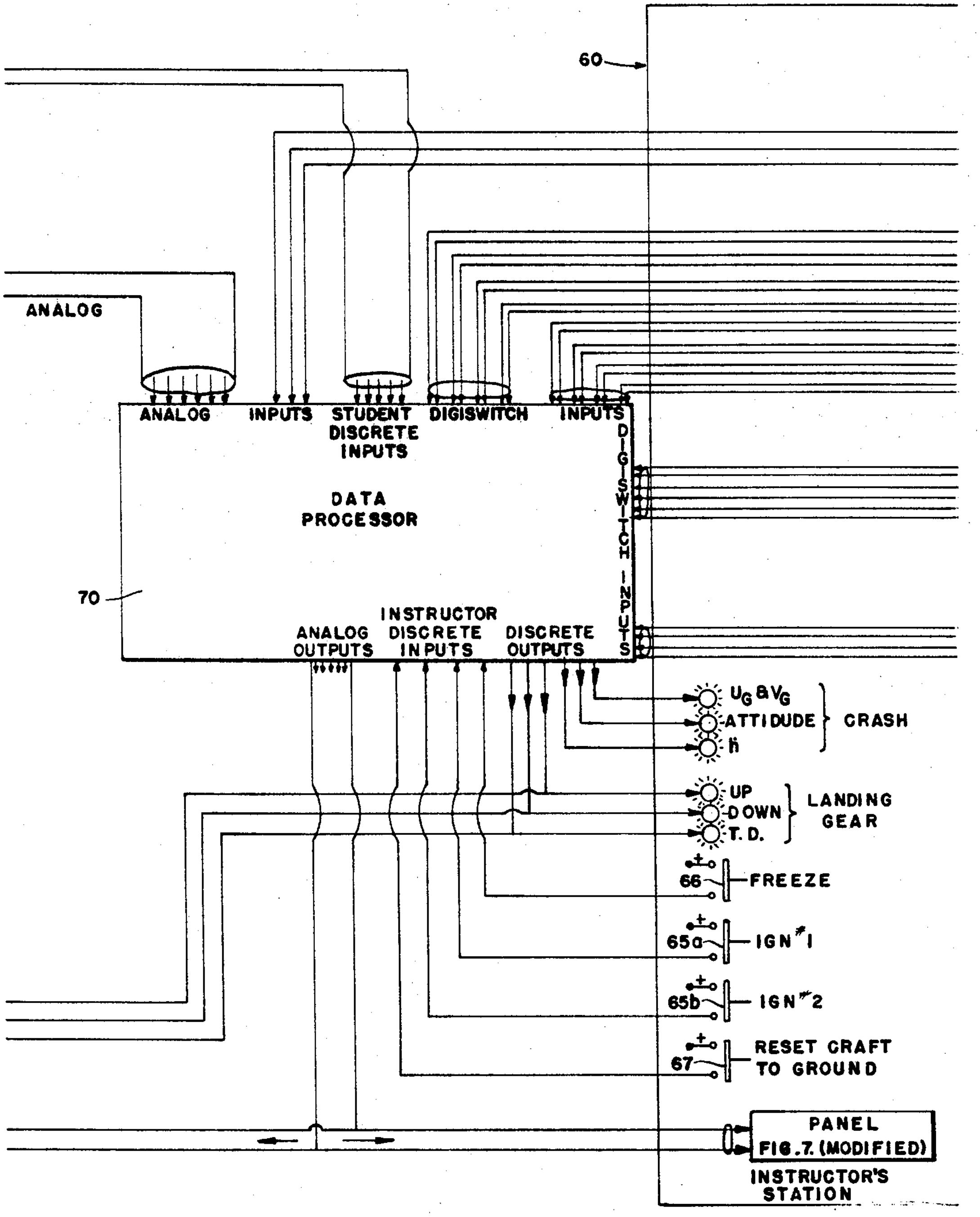
Figure 6C:
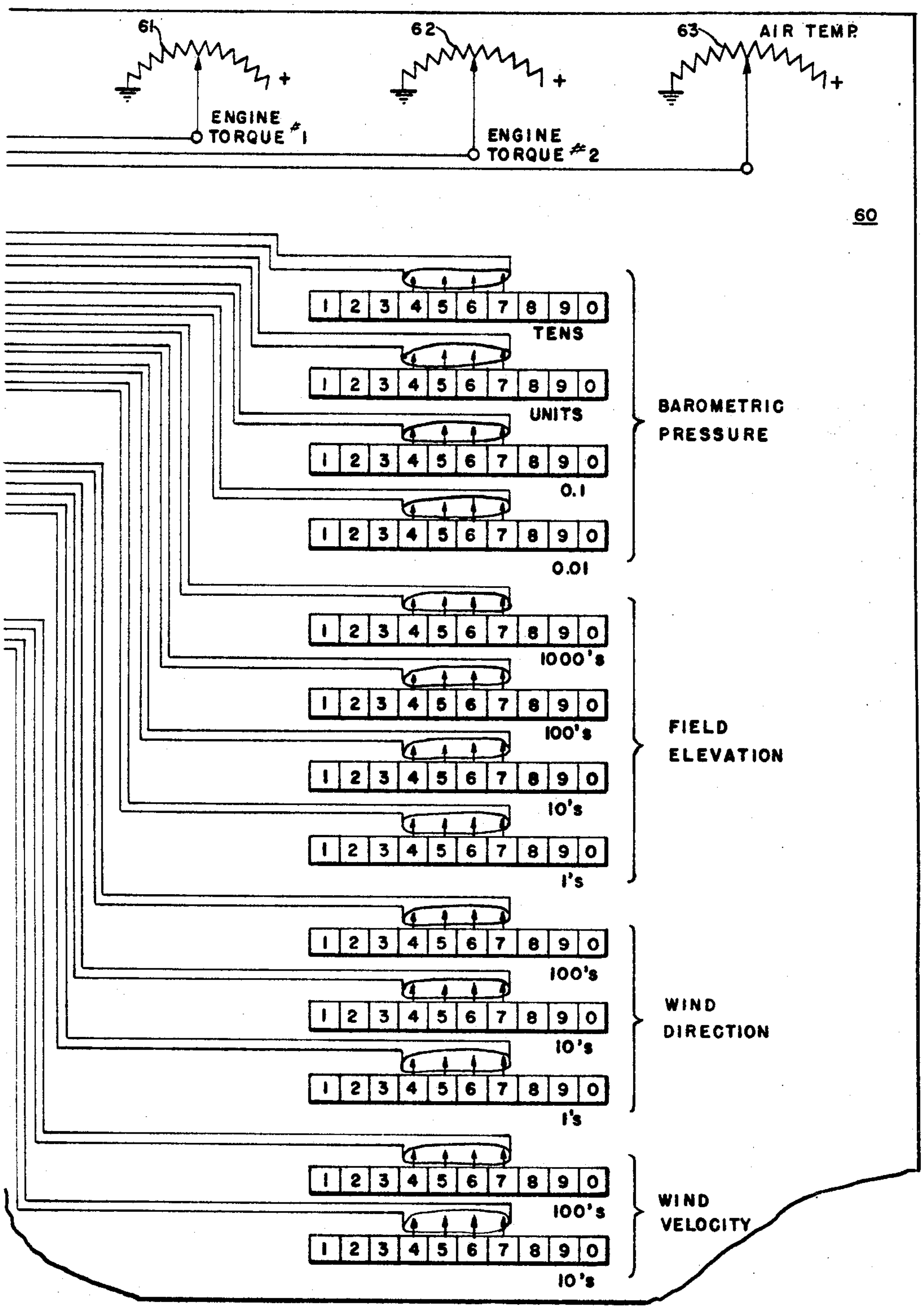
Figure 7:
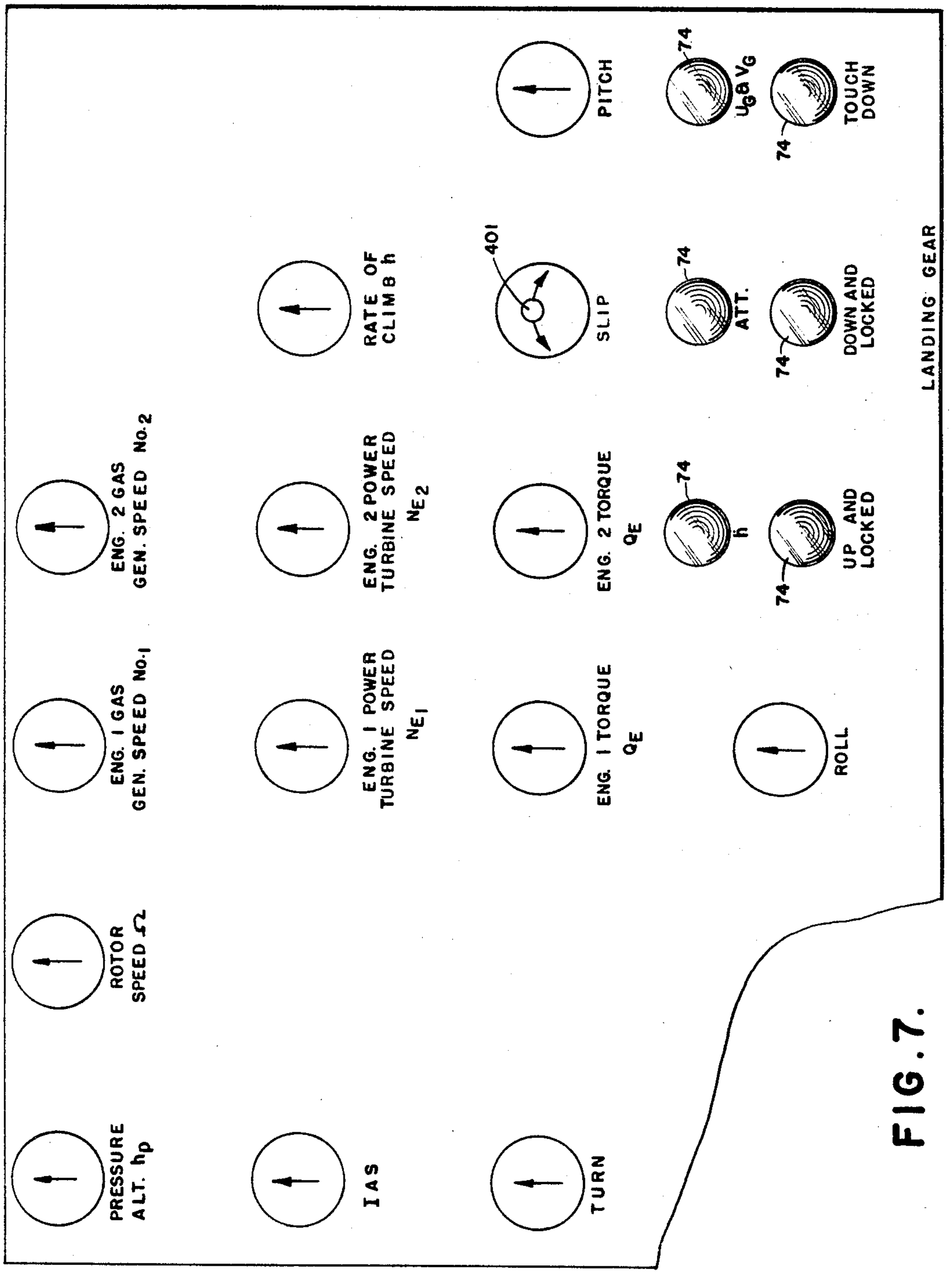
Figure 8A:
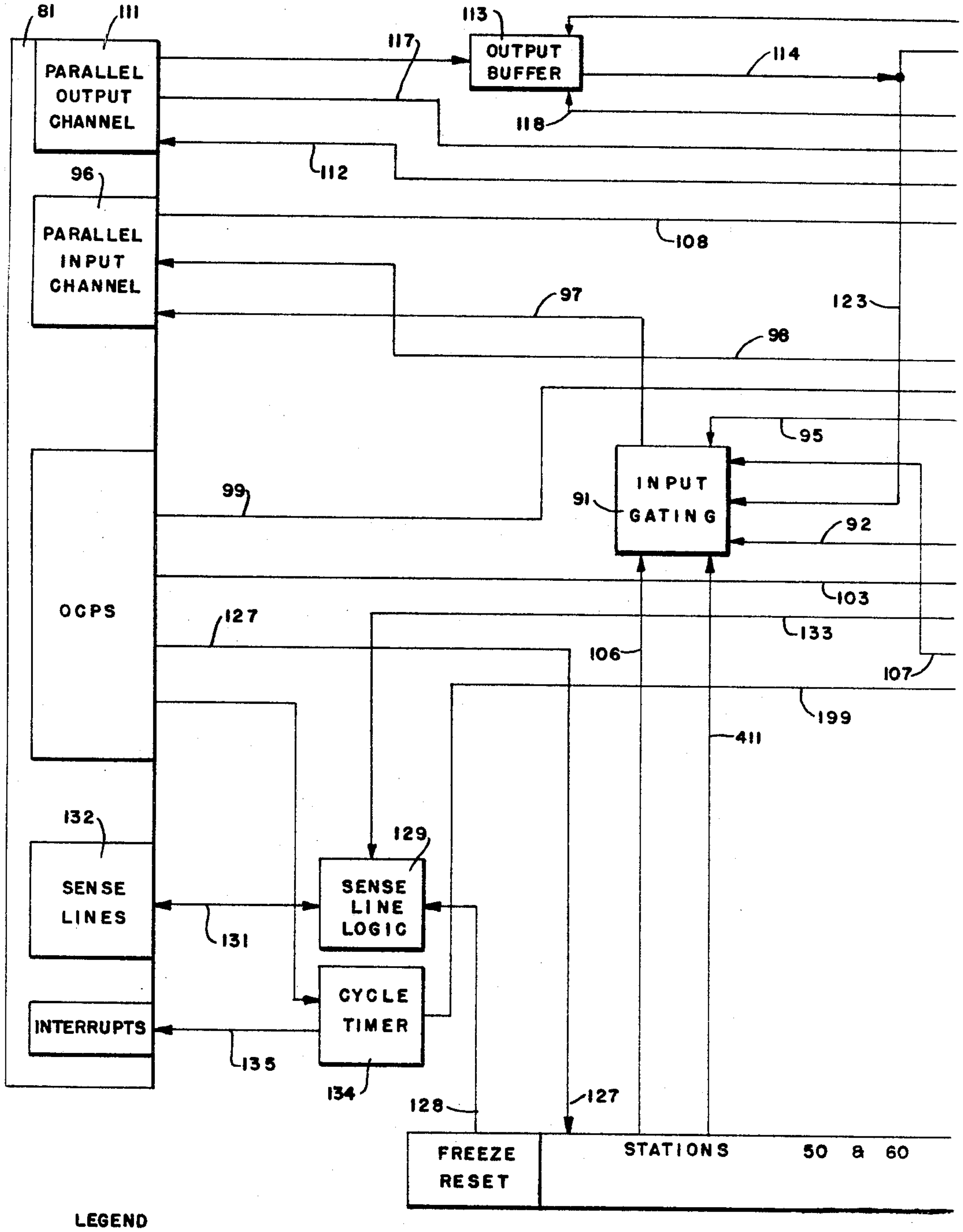
Figure 8A:
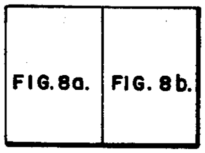
Figure 8B:
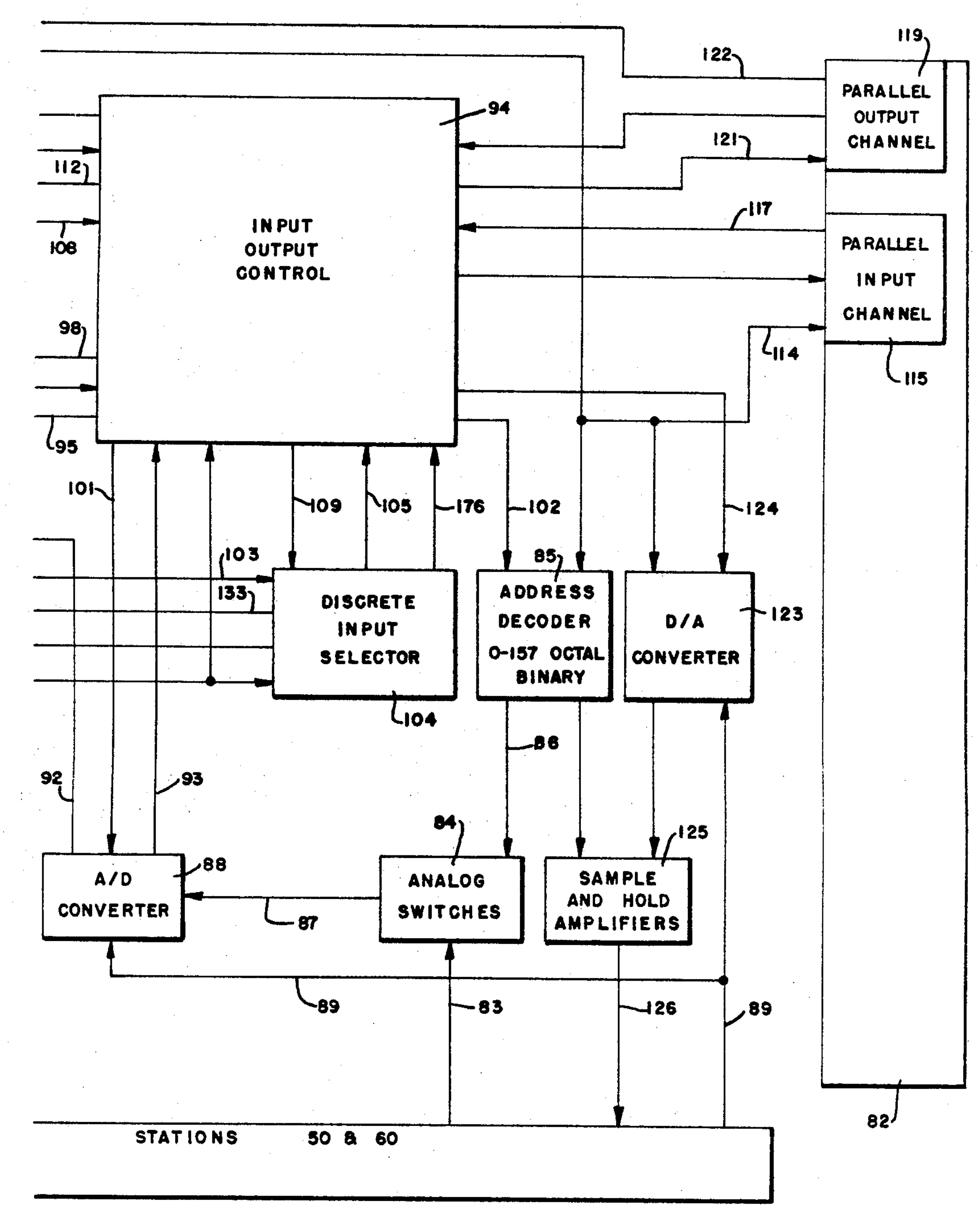
Figure 9A:
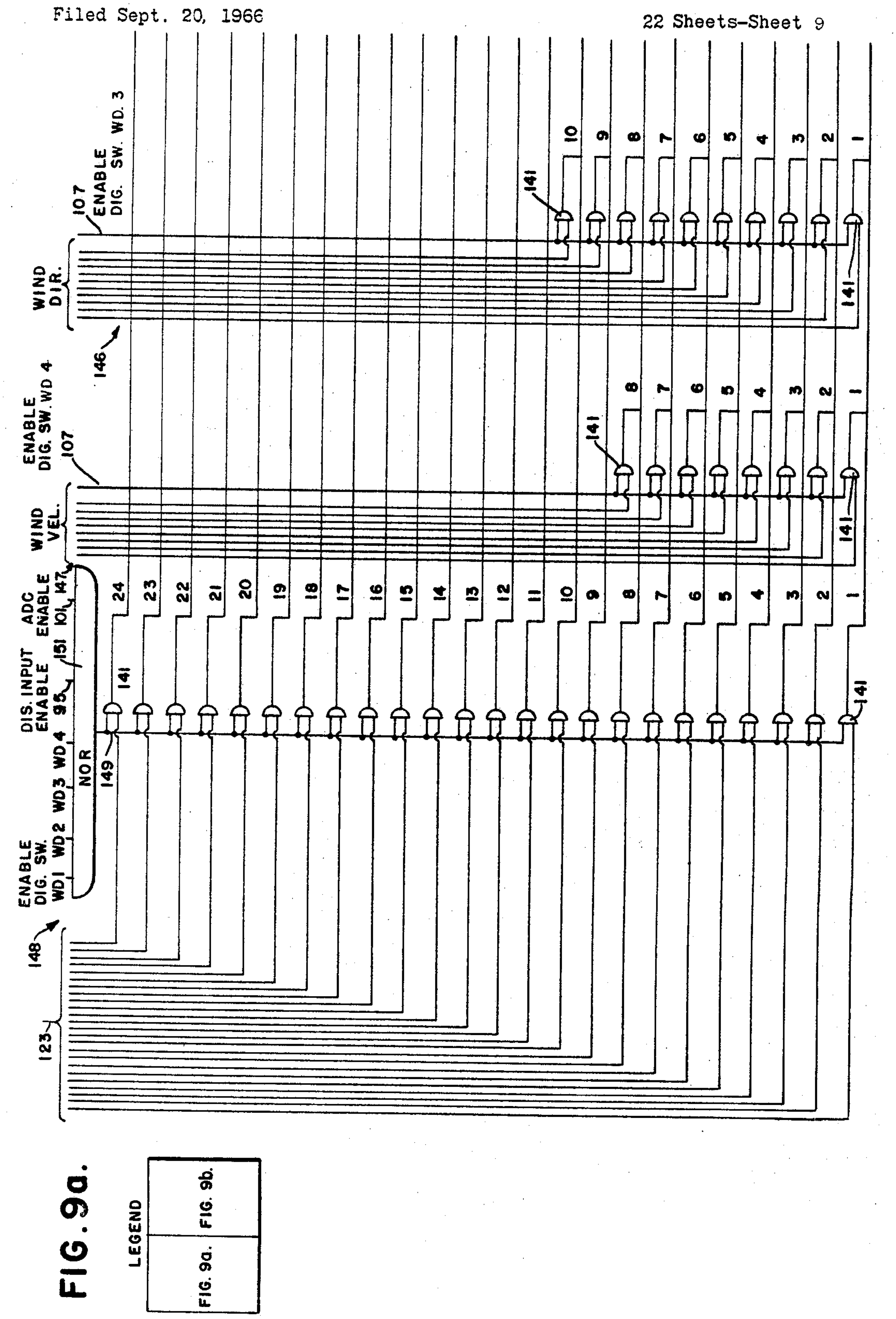
Figure 9B:
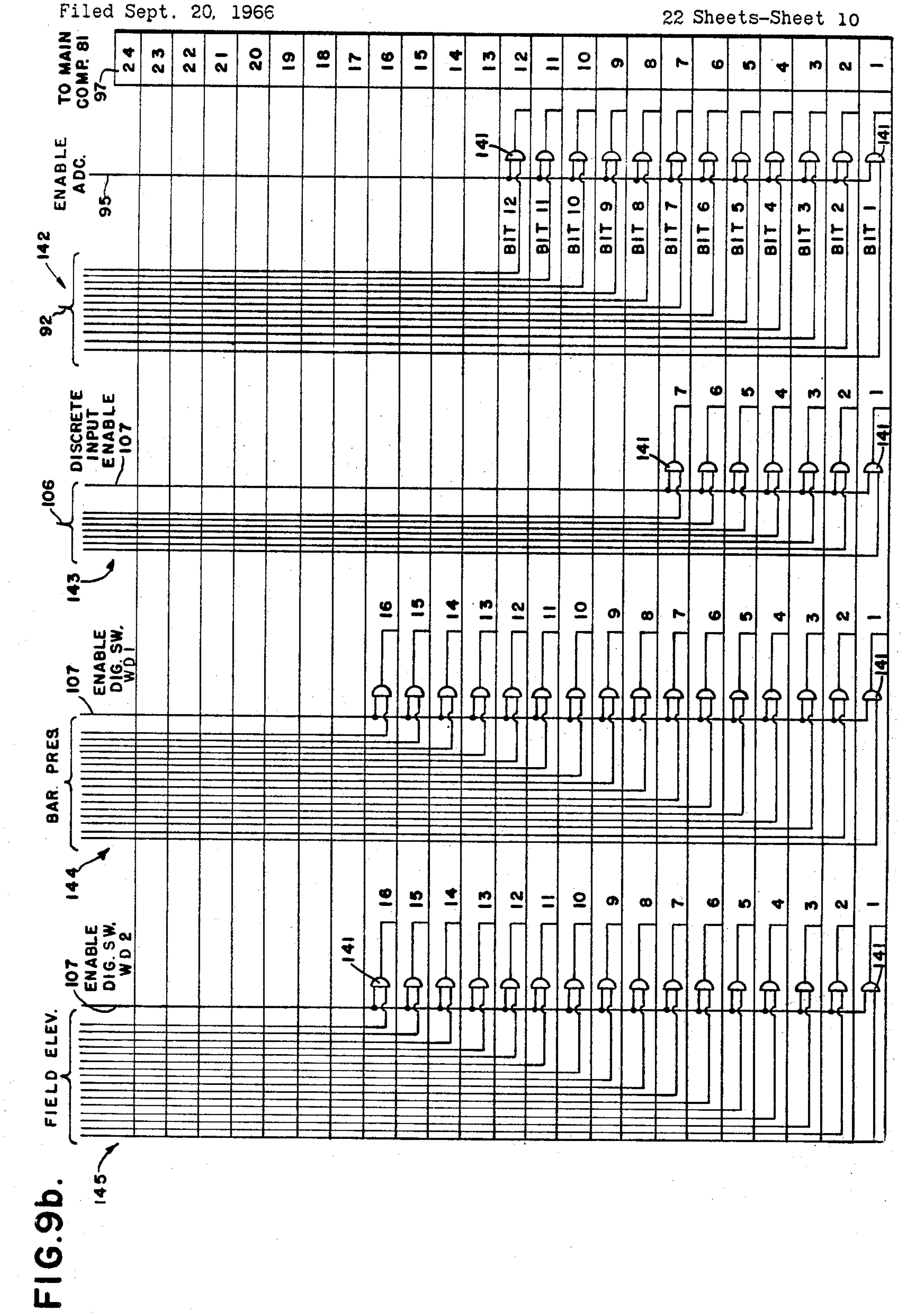
Figure 10:
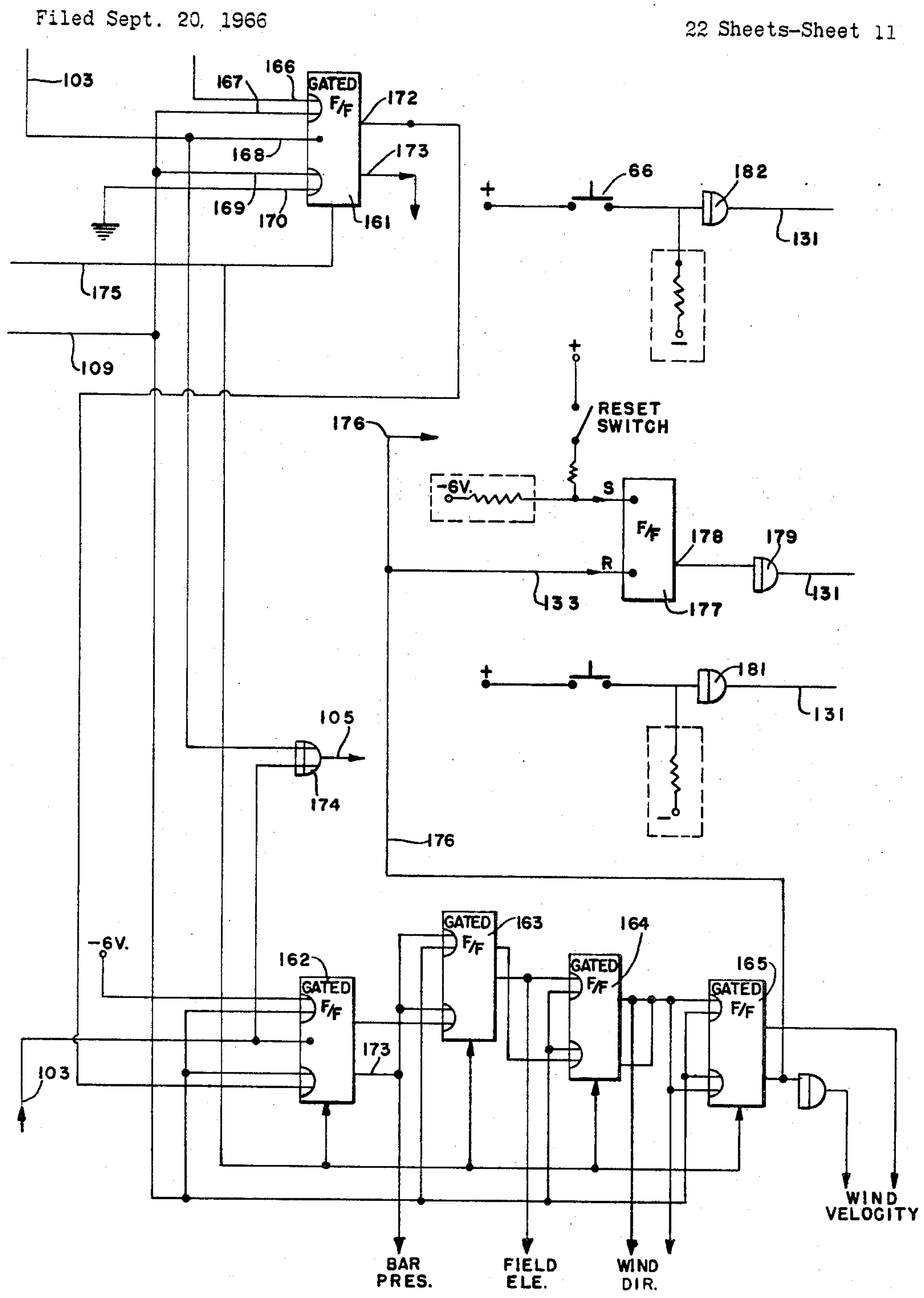
Figure 11:
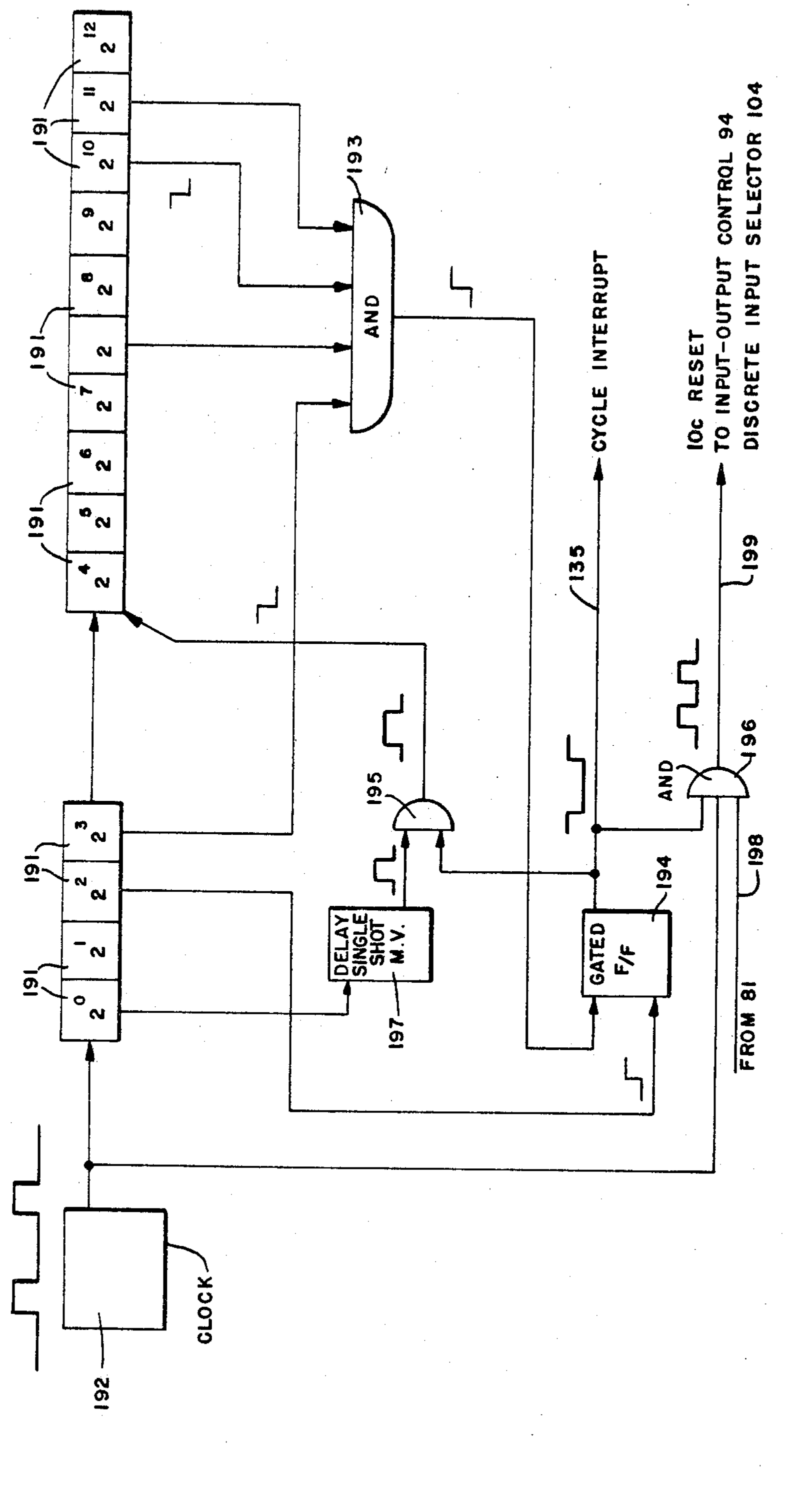
Figure 12:
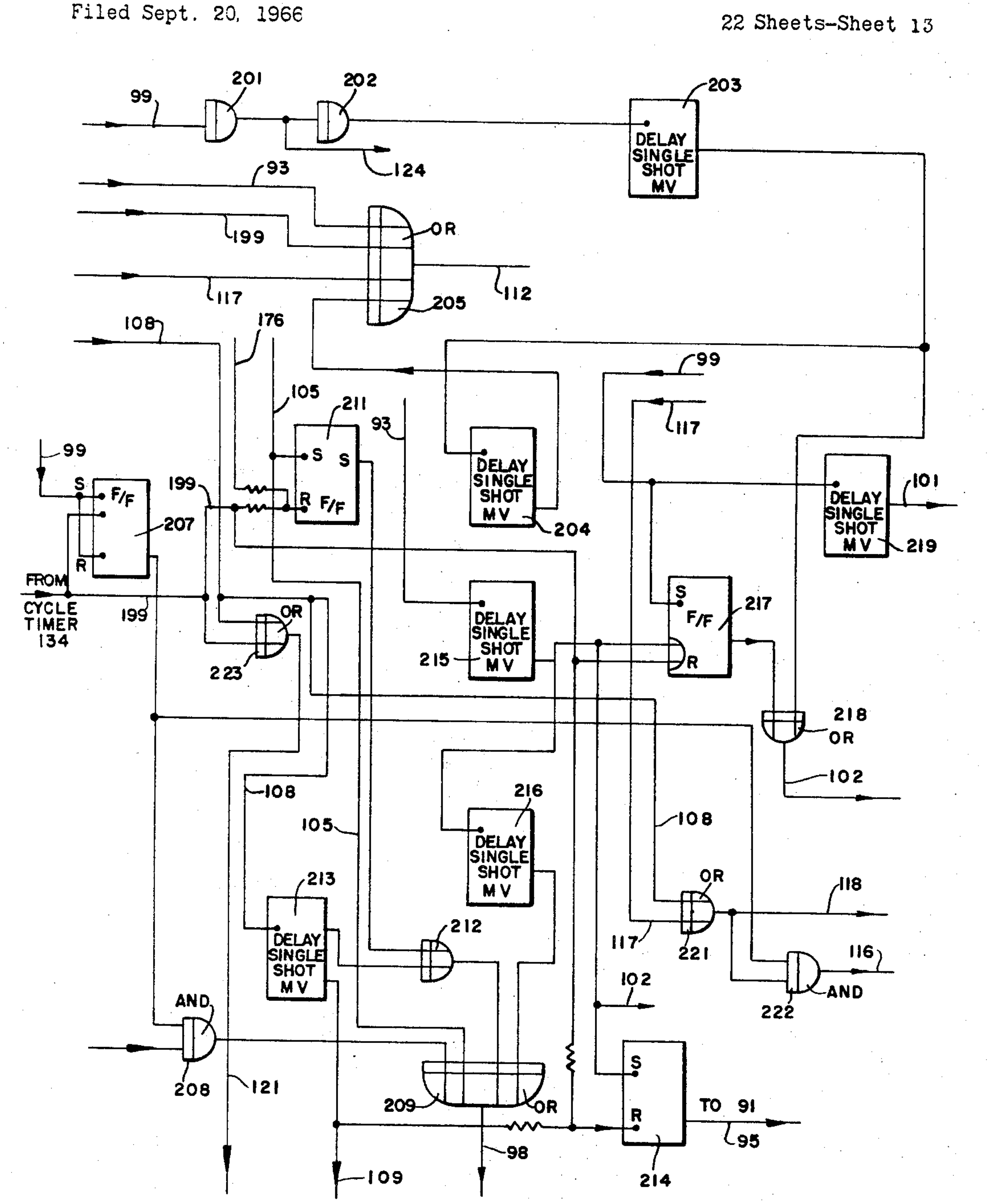
Figure 13:
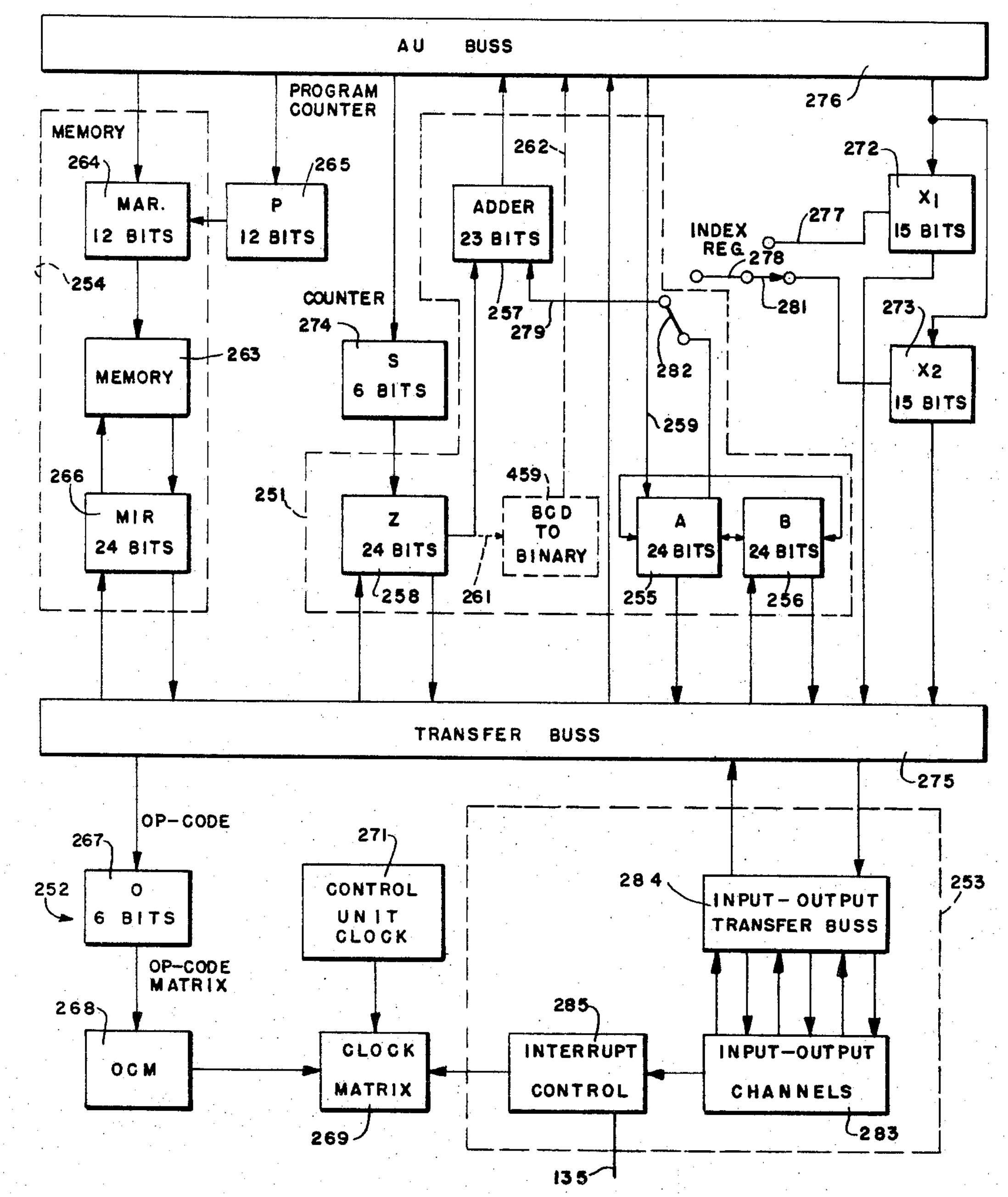
Figure 14:
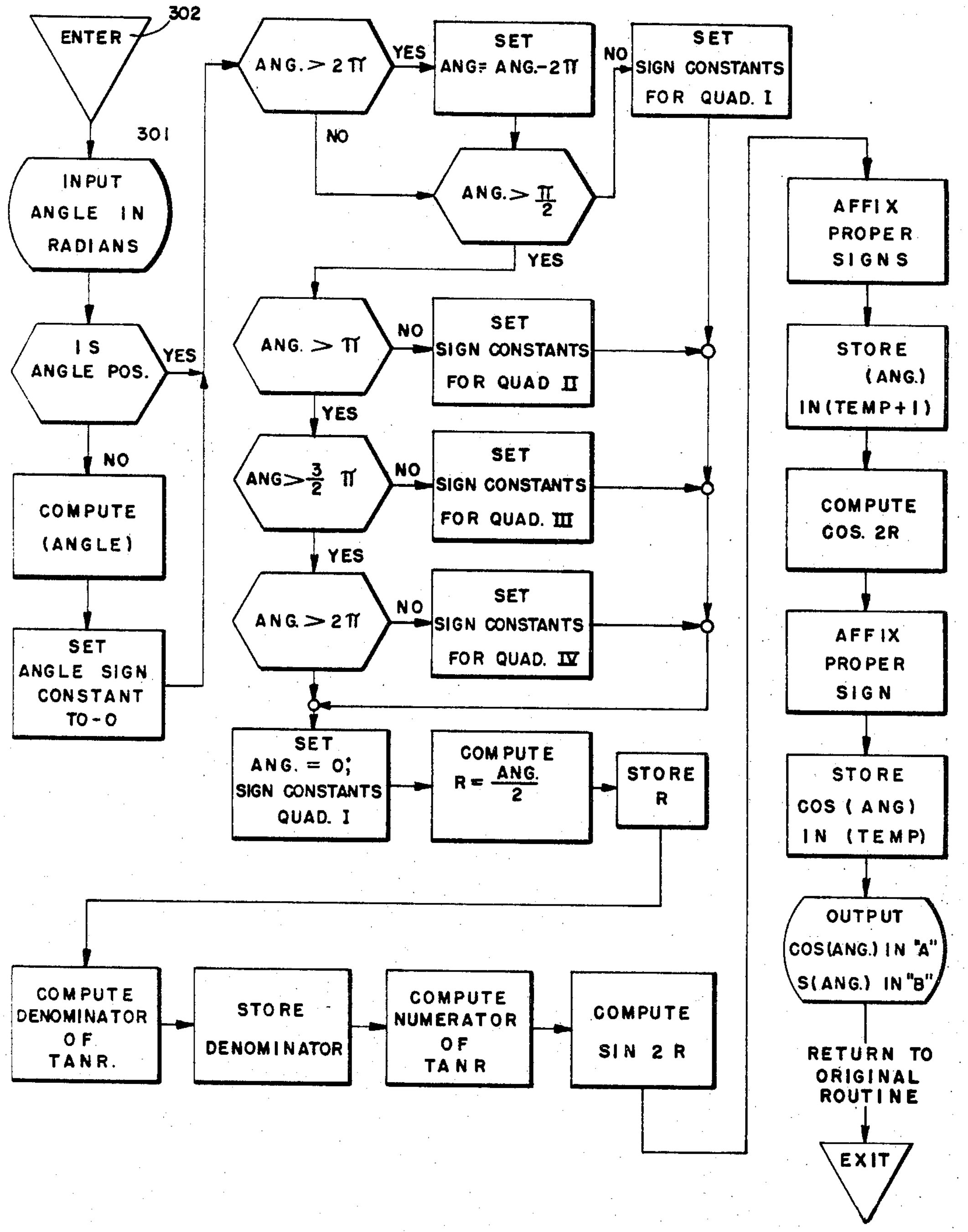
Figure 15A:
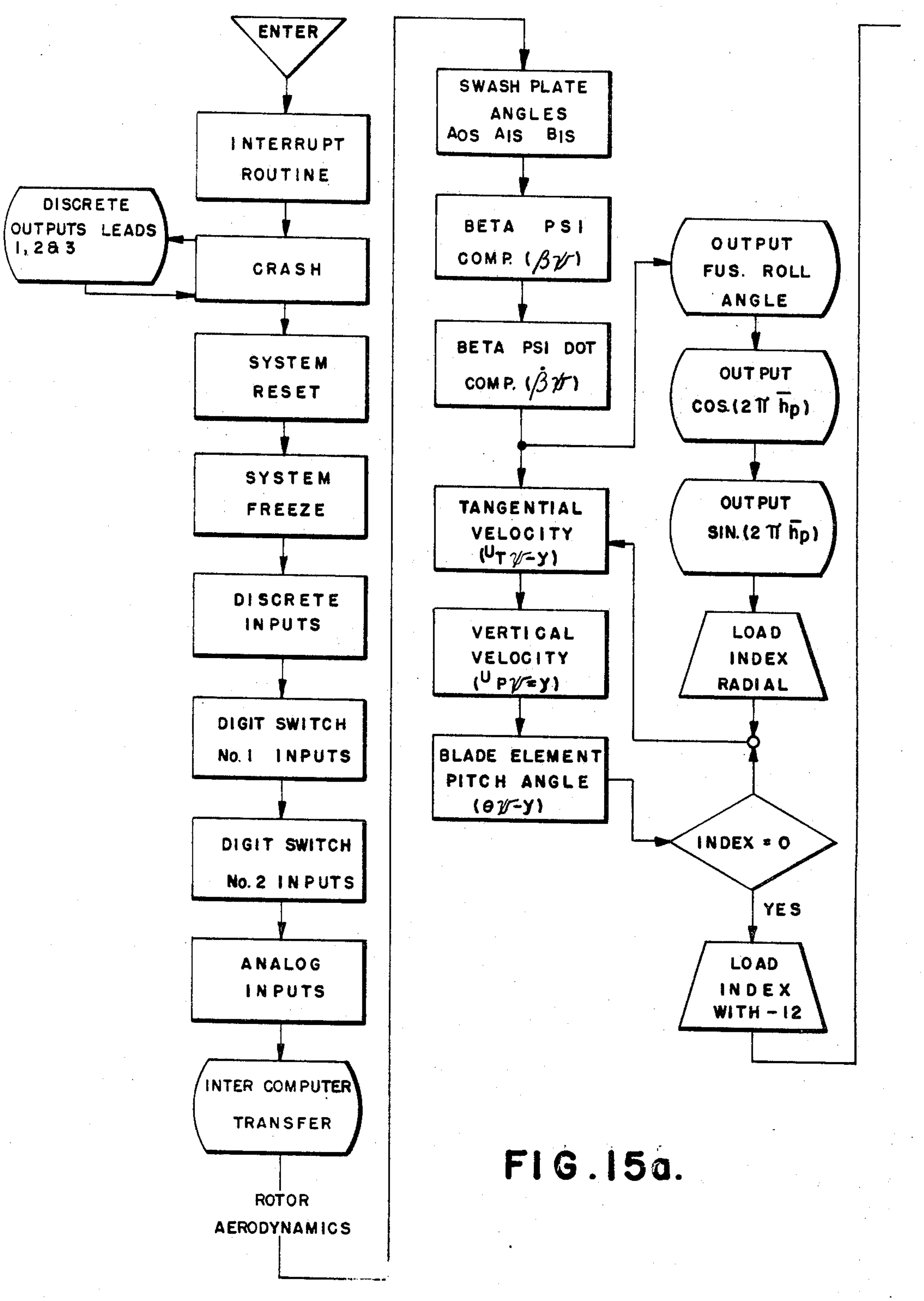
Figure 15B:
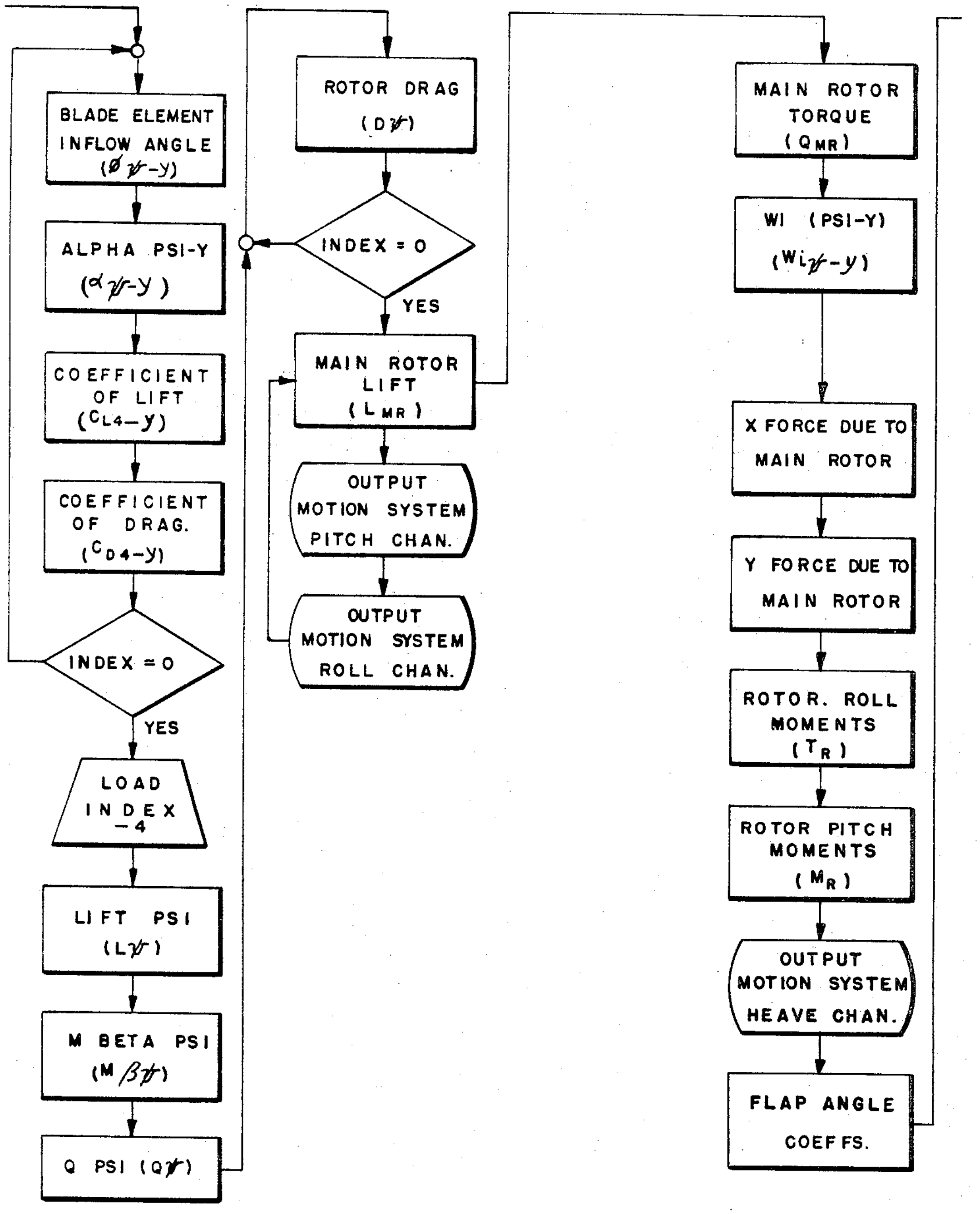
Figure 15C:
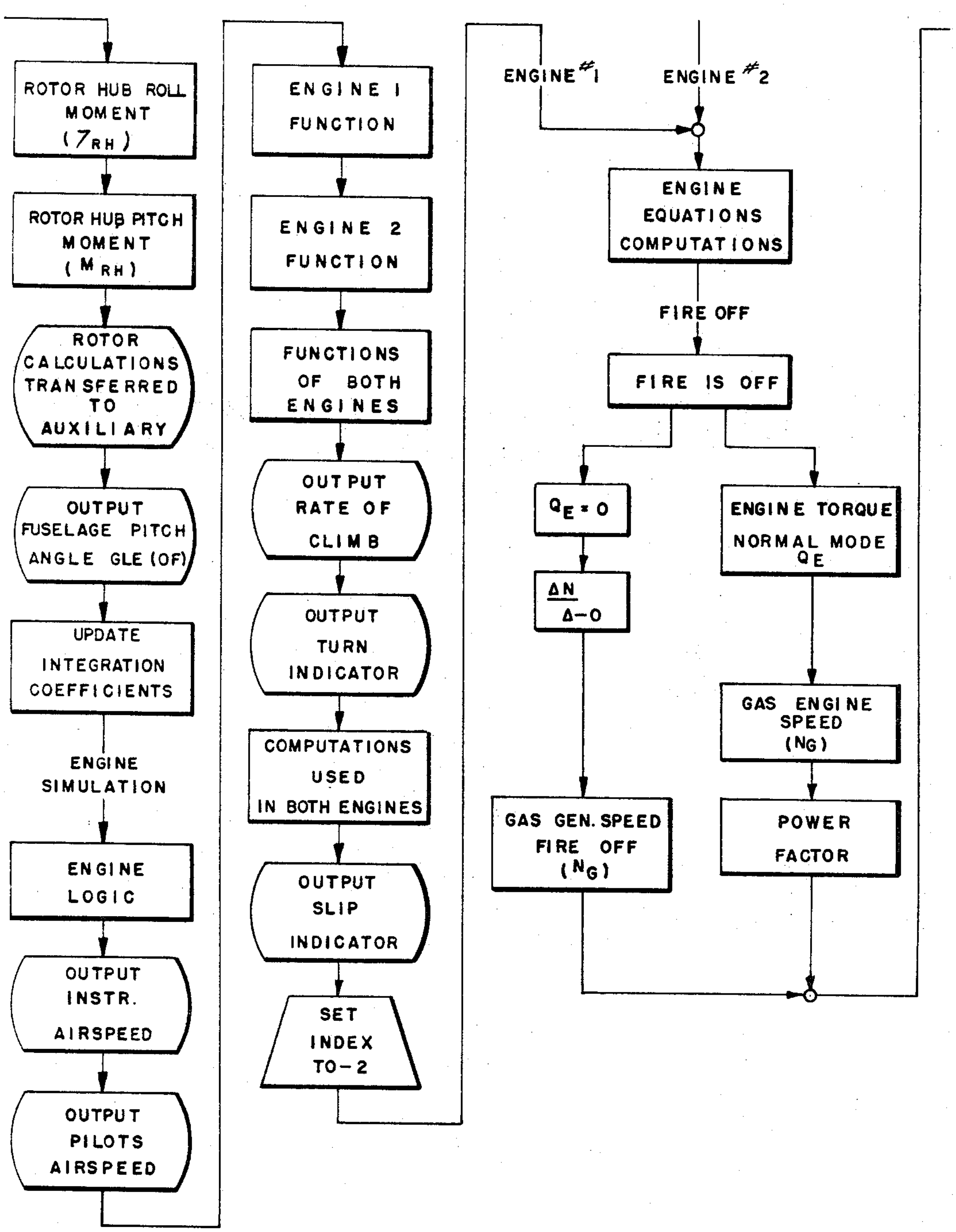
Figure 15D:
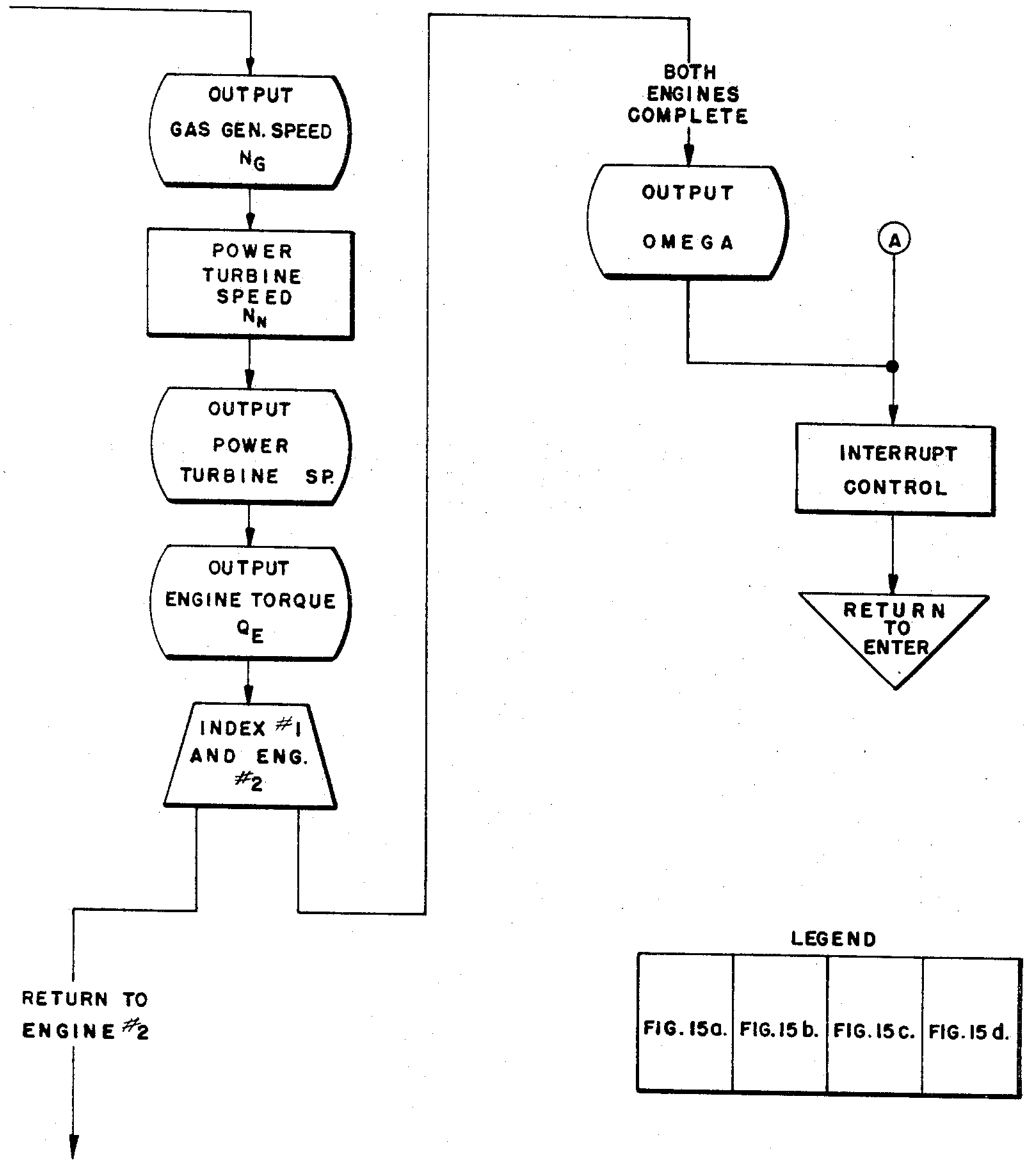
Figure 16A:
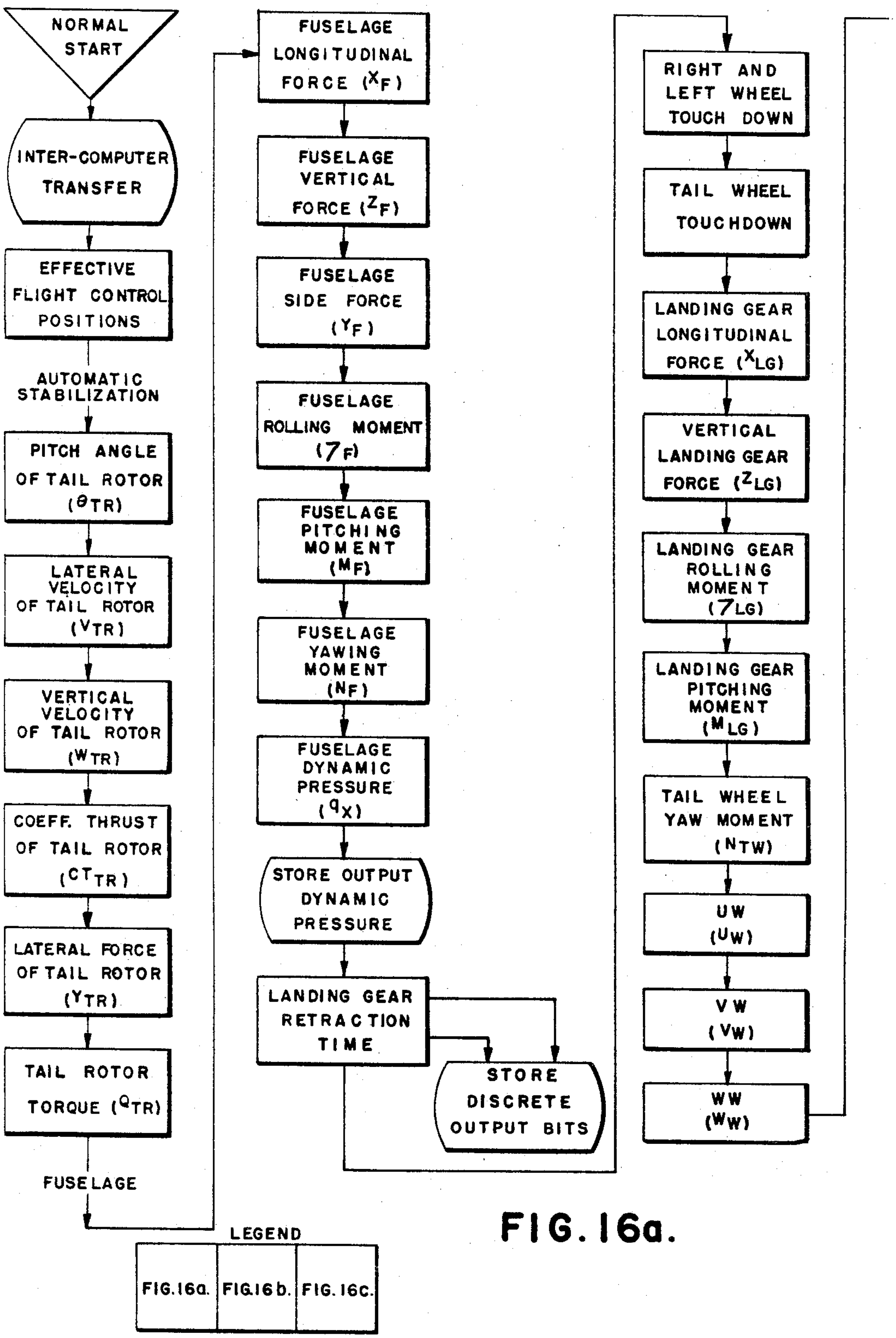
Figure 16B:
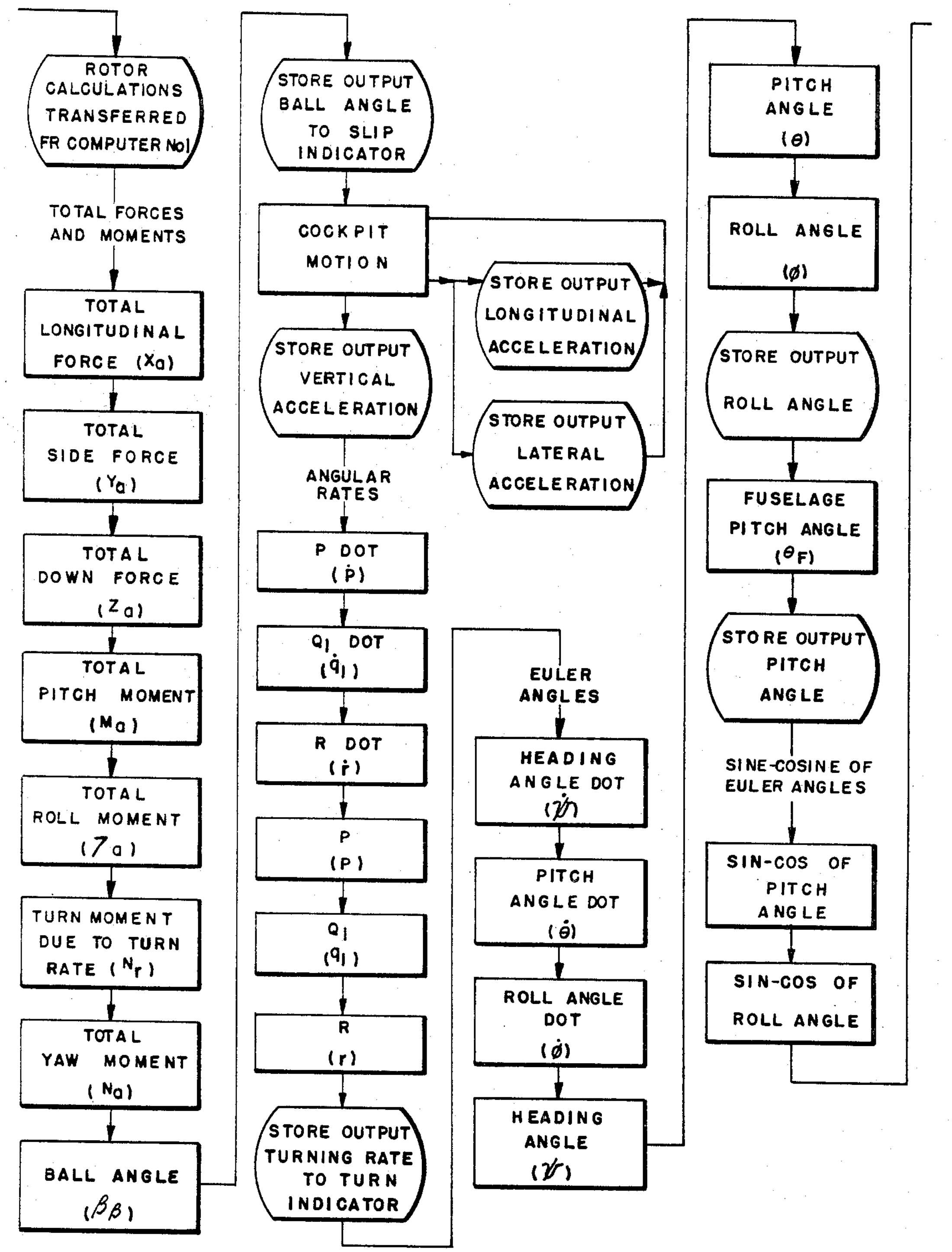
Figure 16C:
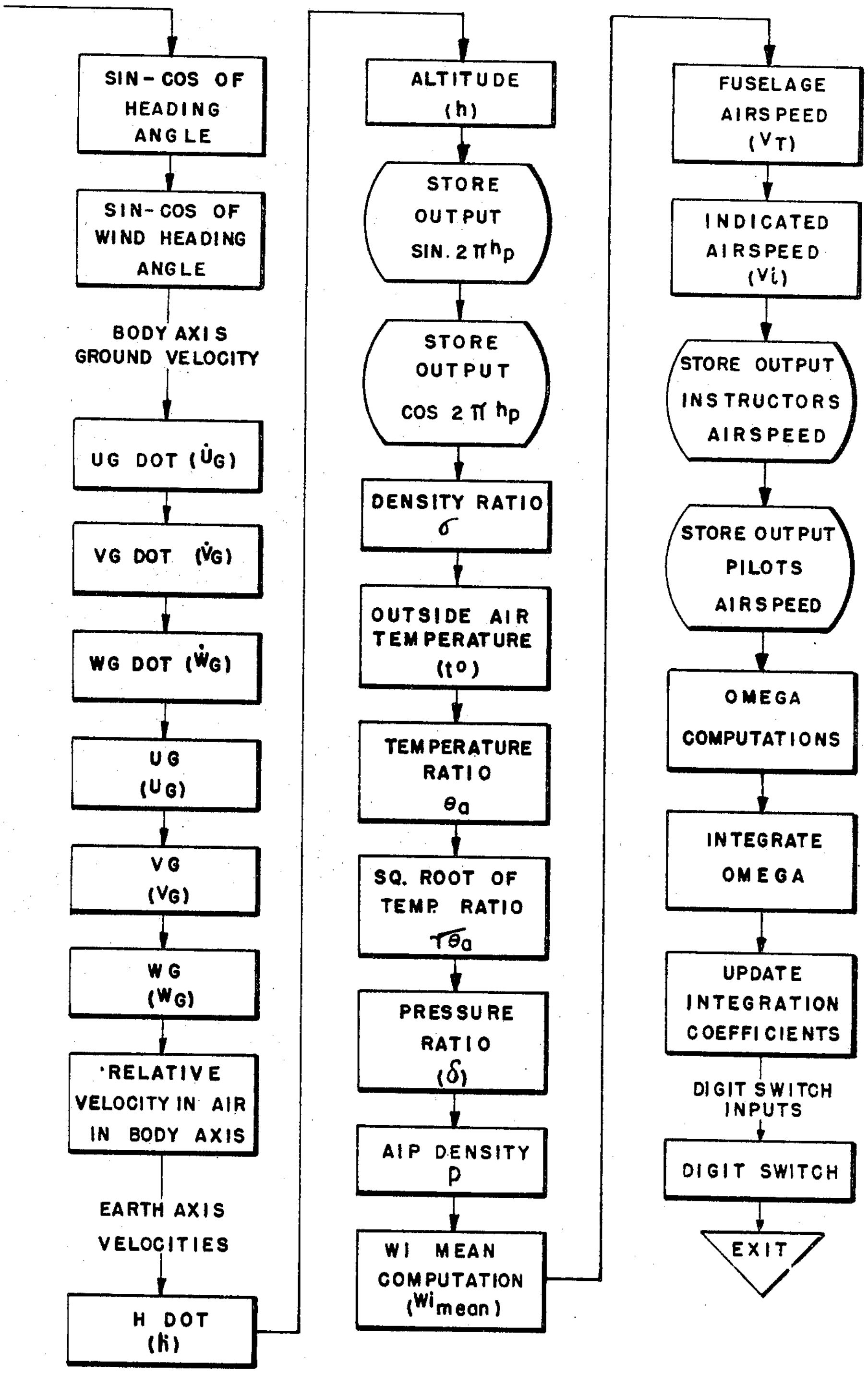

FIGURE 5 diagrammatically illustrates the position of the twelve radial and azimuth stations about the main rotor, which stations are utilized in simulating the forces and moments in the computer utilized with the present invention;

FIGURES 6A–6C diagrammatically illustrate the construction of the helicopter simulator of the present invention, showing the student's station, the instructor's station, and the data processor;

FIGURE 7 is an illustration of the instrument panel at the student's station;

FIGURES 8A and 8B, together, form a block diagram illustrating the computer and the interface for coupling information between the computer and the student's station and the instructor's station;

FIGURES 9A and 9B, together, are the circuit diagram of the input gating network utilized in the interface;

FIGURE 10 is a circuit diagram of the discrete input selector utilized in the interface;

FIGURE 11 is a circuit diagram of the logic timer utilized in the interface;

FIGURE 12 is a circuit diagram of the input-output control circuit utilized in the interface;

FIGURE 13 is a block diagram of the main and auxiliary computers utilized;

FIGURE 14 is a flow diagram illustrating the manner by which the computer determines the sine and cosine of angles;

FIGURES 15A–15D, together, comprise the flow diagram of the computer program of the main computer for the single rotor helicopter simulation; and FIGURES 16A–16C, together, are the flow diagram of the auxiliary computer program for the single rotor simulation.

Before describing the construction and mode of operation of the helicopter trainer of the present invention, consideration will be given to the construction of an actual helicopter, the method of flying a helicopter, and the forces and moments occurring in a real helicopter.

*Construction of an actual helicopter*

Figures 1, 2:
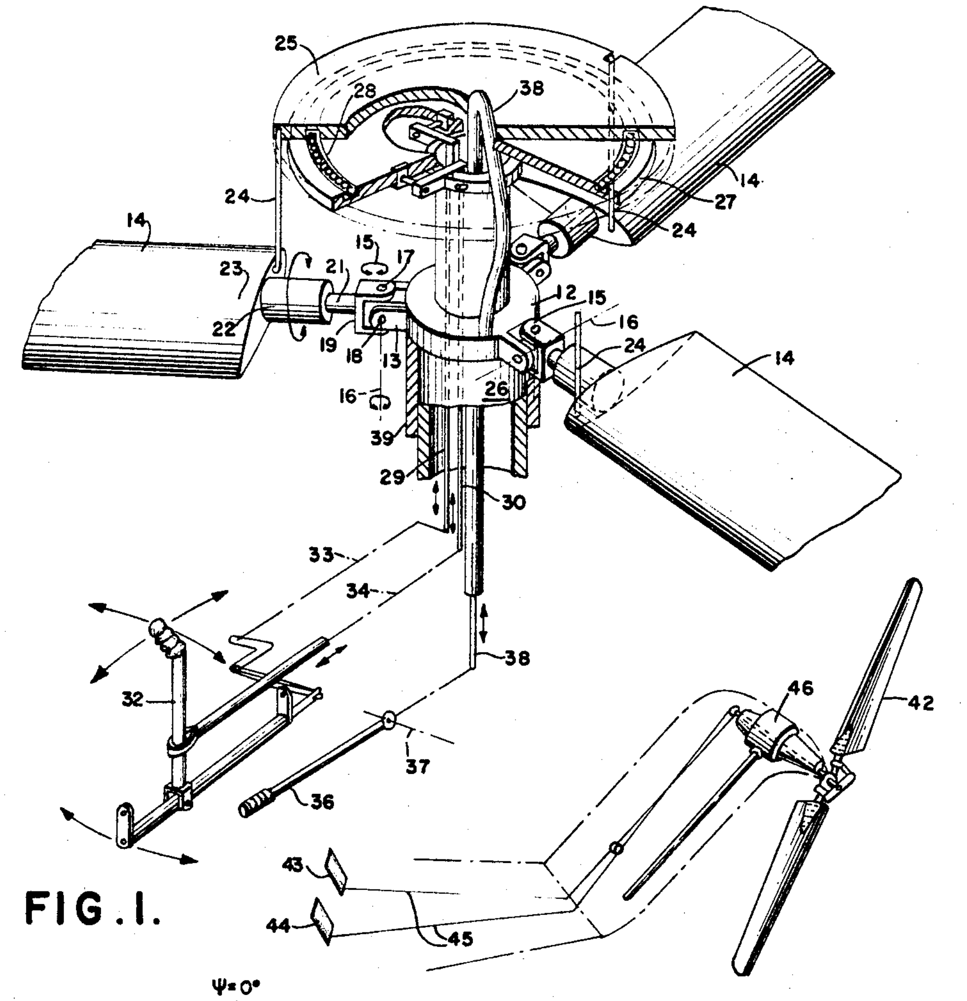
FIGURE 1 is a diagrammatic illustration of the manner in which the main rotor of an actual helicopter moves and the mechanism for controlling the position of the rotor blades.
FIGURE 2 is a diagrammatic showing of the tail rotor of an actual helicopter and the control mechanism therefor.

Reference is now made to FIGURE 1 of the drawings, wherein there is illustrated the main rotor and control linkages for a real helicopter, in schematic form. The helicopter shown is of the three-bladed type, wherein rotor 11 includes spider 12 having three equiangular legs 13. Each of main rotor blades 14 is coupled to a separate leg 13 via three hinges, each of which is mounted in a different plane, thereby enabling rotation of the blades in any direction relative to the remainder of rotor 11.

Lag or drag hinge 15 and flapping hinge 16 comprise pins 17 and 18, respectively, which are mounted in the vertical and horizontal planes at the ends of spider legs 13. Blade 14 is free to rotate about the horizontal axis of flapping hinge 16 but rotation about the vertical axis of lag hinges 15 is restricted by a mechanical damper, not shown. In consequence, blade 14 exerts a very small flapping hinge moment on spider 12 and the lag hinge moment can be substantially ignored for simulation purposes. Lag hinge 15 and flapping hinge 16 are mounted for rotation on U-shaped bar 19, that is fixedly attached to shaft 21. Shaft 21, extending radially from spider leg 13, is connected to the root end of blade 14 through torsional coupler 22. Torsional coupler 22 enables blade 14 to be rotated in the horizontal plane at right angles to the axis of flapping hinge 16. Thereby, rotor 11 is free to rotate about a generally horizontal axis, referred to torsion hinge 23.

The leading edge of each rotor blade 14 is fixedly connected to one end of a push bar 24, the other end of which is fixedly connected to rotating swash plate 25. Swash plate 25 rotates with rotor 11 as the rotor is driven by shaft 26 from the main rotor turbine system. Swash plate 25 is coupled to nonrotatable, but tiltable, ring 27 via ball bearing assembly 28.

Ring 27 is tilted in any direction by two parallel push bars 29 and 30 coupled thereto along orthogonal lateral axes and coupled to the helicopter lateral control stick 32 via linkages 33 and 34, respectively. Stick 32 is coupled to push rod 29 via linkage 33 so that pushing the stick in the right direction, as indicated on the drawing, causes push rod 29 to lift the side of ring 27 to which it is attached, while the opposite result occurs if stick 32 is moved to the left. Similarly, pushing stick 32 forward translates push rod 30 upwardly to tilt the front end of ring 27 downwardly. Hence, it is seen that pushing stick 32 to the right causes the average position of blades 14, as they rotate, to be shifted downwardly to the right, whereby sideward flight in the righthand direction occurs. By the same reasoning, pushing stick 32 forward causes the average position of blades 14, as they rotate, to be tilted downwardly in the forward direction to effect forward flight of the helicopter craft. By moving stick 32 forward, and tilting swash plate 25 forward, the pitch of blades 14 is decreased when the blades are above the rearward portion of ring 27 and the blade pitch is increased when the blades are on the forward side of the ring.

Vertical control of the helicopter is effected through collective pitch stick 36 that is pulled upwardly and pushed downwardly relative to horizontally disposed axis 37, about which the stick rotates. Movement of stick 36 causes vertical translation of shaft 38, that runs interiorly of main rotor shaft 26, to spider 12. For purposes of illustration, shaft 26 is shown as being coupled to sleeve 39, depending downwardly from spider 12, whereby the spider is translatable in the vertical direction, by virtue of its connection to shaft 38. As the pilot pulls collective pitch stick 36 upwardly, rod 38 is translated downwardly to pull rotor assembly 11 in the same direction. Because rotor 11 has been drawn downwardly, and a fixed distance remains between blades 14 and swash plate 25 by virtue of fixedly mounted rods 24, the baldes are now at a greater average pitch during each cycle of rotation. In consequence, pulling up on collective pitch stick 36 results in vertical upward flight of the helicopter. In an opposite manner, the average pitch of blades 14 is decreased by pushing downwardly on collective pitch stick 36 and descent of the helicopted results.

Since an increase or decrease in the average or collective pitch of blades 14 increases or decreases the power requirements for the craft due to drag, an automatic servo-system, not shown, is provided so that the engine throttle is adjusted in a manner to maintain constant engine power. The desired value for engine power is preset by the pilot by means of speed selector controls, not shown, that are mounted on the forward wall of the cabin. Two throttle controls are provided, one for each of the two turbines driving shaft 26. After initial adjustment by the pilot of the desired power from the two engines, the throttle controls are not normally varied; only if one of the motors malfunctions is the hand throttle for the other motor usually changed.

In a helicopter having one main, horizontally mounted rotor, a torque is produced tending to rotate the craft about its center of gravity. The moment is counteracted by means of the vertically mounted tail rotor 42, FIGURE 2. Directional control, as distinguished from control of sideward flight, is accomplished on single rotor helicopters by changing the pitch, hence the thrust, of tail rotor 42 via activation of rudder pedals 43 and 44, at the pilot's station, through linkages 45. Linkage 45 includes differential gear 46, responsive to compression of pedals 43 and 44, and is coupled to a rocking hinge and pitch arm for variably increasing and decreasing the pitch angle of rotor 42.

In a tandem rotor helicopter having two horizontally mounted rotors of the type illustrated in FIGURE 1, pitch control is obtained by differentially changing the collective pitch of the two rotors in response to activation of a longitudinal cyclic pitch stick. In response to movement of the cyclic pitch stick, the average pitch of the blades of one rotor is increased while the pitch of the blades of the other rotor is decreased. Directional control of the tandem craft is in response to activation of the rudder pedals which cause differential changes in lateral cyclic pitch of the two rotors.

Figure 3:
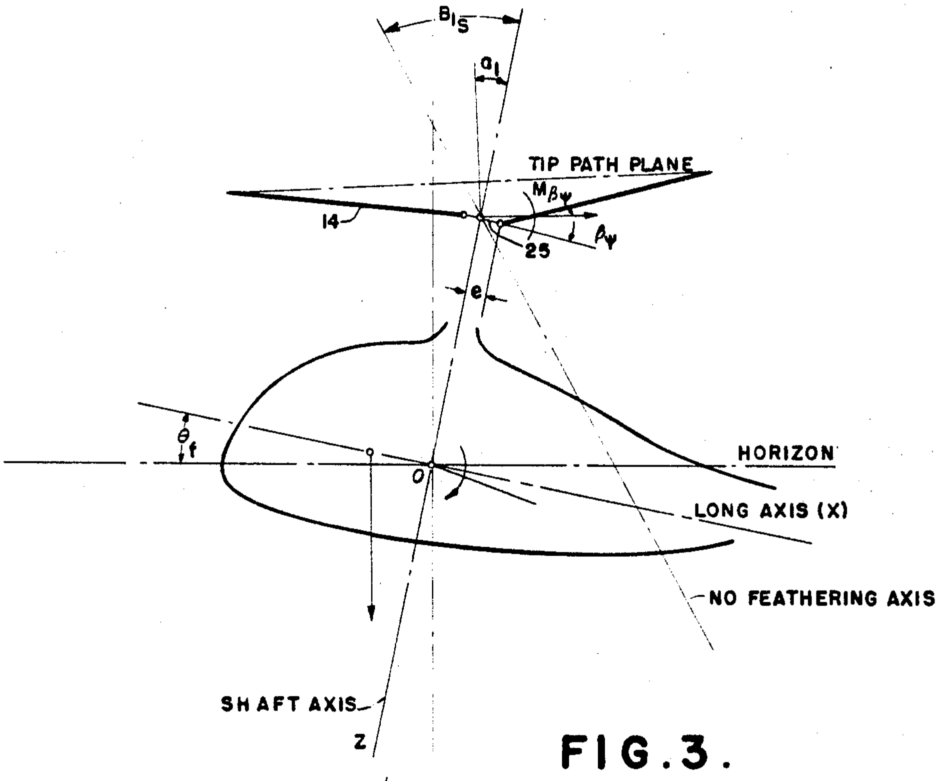
FIGURE 3 is a side view of a helicopter, illustrating the coordinate axes and identifying some of the symbols utilized.
Figure 4:
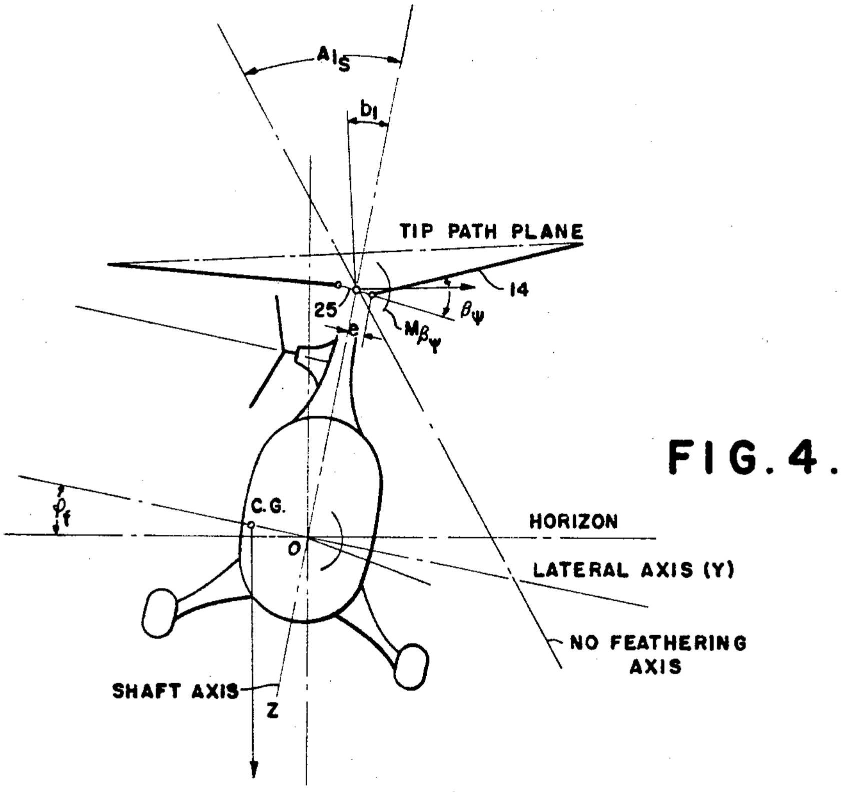
FIGURE 4 is a front view of a helicopter, illustrating two pairs of coordinate axes and showing some of the symbols utilized.

To provide a better understanding of the coordinate system employed and indicate some of the angles utilized, reference is made to FIGURES 3 and 4, side and front views respectively of a single rotor helicopter of the type being simulated. From FIGURES 3 and 4, it is seen that the longitudinal, transverse and vertical axes of the helicopter are denominated as X, Y and Z, respectively, and that the fuselage pitch and roll angles are denoted as $\theta_f$ and $\varphi_f$, respectively. The heading angle of the craft, with respect to the Y axis, is referred to as $\psi_f$. The longitudinal angle, $B_{1s}$, of main rotor swash plate 25, which lies in a plane parallel to the plane defined by the tip path of blades 14, is measured as the angle between the main rotor axis and the "no feathering" axis of the blades, while the main rotor lateral swash plate angle, $A_{1s}$, is the angle in the Y–Z plane between the shaft axis and the no-feathering axis. The no-feathering axis is defined as the axis through the center of the rotor perpendicular to a plane in which the blade angle remains constant. The no-feathering plane differs from the plane of the blade rotation only when the blade angle is being cyclically varied, i.e., when swash plate 25 is not orthogonal to shaft 26. The angles $A_{1s}$ and $B_{1s}$ are controlled in response to movement by the helicopter pilot to control sidewards and forward direction of the craft in flight.

As rotor 11 turns, each of blades 14 flap at an angle, $\beta_\psi$, (the angle between the blade and the plane in which spider 13 lies), in response to a flapping moment designated as $M_{\beta\psi}$. The flapping moment occurs because the blade is remotely located from shaft 26 about which it turns. Displacement of blade 14 from shaft 26 also results in the dissimilarity between the forces exerted on the leading and trailing blades, resulting in differences between the pitch angles of blades 14 as they advance and retreat, to complicate the analytical analysis required for helicopter simulation.

Many other factors, besides those specifically mentioned and illustrated in FIGURES 3 and 4, must be considered in simulating the movement, forces and moments of a helicopter. These factors, and the symbols therefor, are defined in detail infra. In general, it can be stated that forces occurring along the X, Y and Z axes, are related to a symbol having an X, Y or Z therein, while moments concerned with roll, pitch and yaw generally include their symbol a $\varphi$, $\theta$ or $\psi$, regardless of whether the force or moment occurs in response to fuselage or rotor action.

Because the motion, hence moments and forces associated with rotor movement are constantly varying, it is necessary to strobe the forces and moments produced by the rotor at a plurality of discrete times when utilizing a digital computer for simulation purposes. Strobing is particularly important with a digital computer because such a computer is inherently incapable of continuous solution of mathematical expressions. In particular, a digital computer is incapable, generally, of actual integration, but relies upon algorithms for this purpose, and requires a finite time for addition, subtraction and multiplication, as well as function generation.

Because of these factors, the simulation technique of the present invention employs a plurality of strobe points or stations at discrete locations about the rotor. At each station the forces and moments due to blade lift are computed. In the particular embodiment disclosed twelve discrete points or stations are selected about the rotor where rotor forces and moments are computed. As indicated by FIGURE 5, four stations are located on each of three different radii from shaft 26 of the five blade helicopter being simulated. The four azimuth positions are selected as 0°, 90°, 180° and 270°, where 0° coincides with the longitudinal axis of the helicopter, in the direction forward from the main rotor. In FIGURE 5, the terms $y_1$, $y_2$ and $y_3$ represent the radial distances of the three radial positions from the flap hinge that is located a distance, $e$, from shaft 26. In general, the subscript $\psi-y$ indicates a blade position at one of the twelve stations. The subscript notation 0–3, for example, indicates the particular station located along the circle a distance of $(y_3+e)$ from rotor 26 at azimuth location $\psi=0$.

In response to calculating the forces and moments at each of the twelve stations of FIGURE 5, the total rotor moment and force are derived by averaging the contribution of the several stations together. In actual practice, it has been found that this averaging process results in a very accurate simulation, if a sufficiently large number of computations is made during each revolution of rotor 11, which occurs every one-third of a second. The simulator of the present invention is designed so that it samples the forces and moments at each of the twelve points once every 62.5 milliseconds, a period that has been found to be satisfactory from actual experience.

*General trainer organization*

Reference is now made to FIGURES 6 and 7 of the drawings which respectively illustrate the general organization of the trainer of the present invention and the indicators presented to the individual being trained to fly a helicopter. Student station 50 comprises collective pitch stick 51 that is rotatable about pivot point 52, and cyclic pitch stick 53 that can be driven forward and aft, as well as side to side. Rudder pedals 54 and 55 are positioned to be driven by the feet of the trainee and are coupled via differential gear 58 to output shaft 59. Rotatable knobs 56 and 57 simulate speed selector levers for engines No. 1 and No. 2 of a two-turbine helicopter. Collective pitch stick 51, cyclic pitch stick 53, rudder pedals 54 and 55, as well as knobs 56 and 57, are positioned in precisely the same manner as the corresponding controls of a real single main rotor helicopter, whereby the trainee pulls stick 51 upwardly and pushes it downwardly with his left hand and translates cyclic pitch stick 53 in the longitudinal and lateral directions with his right hand.

Each of the simulated controls, except the rudders, is coupled to the pointer of a potentiometer that has its opposite terminals energized by positive and negative D.C. potentials. Thereby, there are derived D.C. analog voltages having amplitudes and polarities indicative of the direction and magnitude for each of the simulated aerodynamic controls, except the rudders, which the helicopter trainee performs.

Because rudder pedals 54 and 55 are coupled through differential gear 58 to output shaft 59, the rudder voltage provides an indication as to whether pedal 54 or 55 is depressed and the magnitude to which the depressed pedal is activated.

In addition to the aerodynamic simulated controls described, the student station is provided with a plurality of means for developing discrete, rather than analog, signals in response to the trainee's operation preparatory to and during a simulated flying mission. In particular, push buttons are provided for deriving on-off type signals indicative of the trainee having activated the ignition button for engine 1, activated the ignition button for engine 2, activated the landing gear to its up position, activated the landing gear to its down position, and locked the tail wheel. Each of these discrete inputs is coupled through a separate manually activated switch, whereby a positive D.C. voltage is supplied to the output terminal of the switch when the trainee has activated the particular button, and no voltage is derived when the button is not depressed.

To set input parameters into the system and monitor the trainee's performance, instructor station 60 (FIGURES 6*b* and 6*c*) is provided. Instructor station 60 includes potentiometers 61, 62 and 63 having sliders that are set by the instructor to indicate the torque for engine No. 1, engine No. 2 and the outside air temperature, respectively. In response to movement of the potentiometer sliders, D.C. analog voltages of positive polarity are derived as a percentage of the voltage existing across the potentiometers. Sliders for potentiometers 61 and 62 are normally maintained in a position midway between the positive supply voltage level and ground potential. Only when the instructor simulates a malfunction in engine oil pressure are the sliders of potentiometers 61 and 62 varied to be in proximity with the ground connection.

Instructor station 60 also includes a plurality of digital inputs representing barometric pressure, as tens, units, tenths and hundredths inches of mercury; field elevation, in units, tens, hundreds and thousands of feet; wind direction, in units, tens, and hundreds of degrees; and wind velocity, in units and tens of miles per hour. The instructor introduces each order of the aforementioned parameters into the system by activating one key out of ten keys on a conventional keyboard. In response to selection of one of the keys, a signal is derived in binary form, whereby, for example, barometric pressure is represented by four words, each of which has four bits. The conversion from decimal to binary is automatically performed within the instructor's console through a device presently available on the market and known as a Digiswitch.

In addition to the numeral quantities introduced by the instructor through the 13 sets of Digiswitches and the three potentiometers, the instructor is capable of activating a plurality of command switches 65*a*, 65*b*, 66 and 67 (FIGURE 6*b*). Switches 66 and 67 selectively derive on-off type signals, indicated by the presence or absence of positive voltages at their output, in response to activation of controls denominated as freeze and reset craft to ground. Switches 65*a* and 65*b* are respectively activated when the instructor desires to determine how the student will react in the event of a failure in the ignition systems of the helicopter motors one and two. The instructor activates button 66 when he realizes that the student has manipulated the aerodynamic controls in such a manner as to cause the craft to crash or become unstable. Activation of switch 66 freezes operation of the system and prevents any further movement of the aerodynamic controls by the student from effecting future system operation. The instructor activates reset craft to ground switch 67 after the student has caused the craft to "crash," or after the instructor has frozen system operation and desires the student to commence take-off once again.

The nine analog, four binary coded decimal, and seven discrete signals deriving from instructor's station 60 and student station 50 are supplied to data processor unit 70 (FIGURE 6*b*). In data processor unit 70, the analog signals are converted to digital values and supplied to a digital computer which is programmed to simulate the aerodynamic equations of the helicopter which the student is being trained to fly. The computer, in response to the analog, discrete and digital signals from stations 50 and 60, generates digital output signals indicative of the motion of the helicopter and of the performance of the engines thereof. The digital output data, that are number indicating signals, are supplied to a digital to analog converter from which signals are derived, indicating the helicopter performance. These signals are supplied back to the student station, as well as to instructor station 60, to activate the dial indicators illustrated in FIGURE 7.

A number of other analog signals are also derived from data processor 70 to activate motors 71, 72 and 73. Motors 71–73 are coupled to the cabin that comprises the student station to move the cabin about in a manner to simulate roll, heave and pitch of a helicopter undergoing actual flight. Motor 71 rotates the cabin about the longitudinal axis of the simulated craft while motor 73 rotates the cabin about the lateral axis of the simulated craft. Motor 72 raises and lowers the cabin to simulate the effects of vertical ascent and descent.

In addition to the analog outputs, data processor 70 derives six discrete signals indicative of the landing gear being up or down, touchdown of the landing gear to ground and three conditions that cause a crash. The up and down landing gear indicating signals are derived in response to the student activating the landing gear up and down switches, while the touchdown indicating signal is generated in response to the signals computed by data processor 70 and the discrete input regarding landing gear from student station 50. In contrast, the three crash signals are derived from the aerodynamic equations solved by the computer to indicate that the craft: descended to the ground at an excessive speed, descended with an improper attitude, and had excessive velocity while on the ground. Lamps 74, FIGURE 7, at the student's indicator panel, are responsive to the six on-off type signals derived from data processor 70 to indicate the conditions specified. Each of the other indicators at the student station panel illustrated in FIGURE 7 is of the dial type wherein a needle or ball, responsive to the magnitude of the analog output of data processor 70, is deflected to provide an indication of the parameter computed and simulated.

*Broad data processor considerations*

Reference is now made to FIGURE 8 of the drawings, wherein data processor 70, FIGURE 6, is illustrated in broad flow diagram form. Data processor 70 includes digital computers 81 and 82 having magnetic core memories of 8,192 words and 4,096 words, respectively. Computers 81 and 82 are interconnected with each other so that they operate synchronously, with transfer of data between the computers at determined time intervals within an operating cycle of the data processor.

Main and auxiliary computers 81 and 82 periodically compute all of the necessary responses for simulation during computation periods of 62.5 milliseconds. During each computation period the input signals generated by the student and instructor are sampled to control the computer output so that only slight changes in the computed responses generally occur between adjacent computation periods. Two computers are utilized to calculate all of the variables necessary in a time sufficiently short to provide accurate real time simulation of helicopter performance. If the computers do not go through a new computation period at a rate of at least the order of ten times a second, it has been found that adequate simulation may not be achieved.

Computers 81 and 82 are arranged to operate simultaneously on each bit of different 24 bit words. The 24 bit words are stored either as binary data or binary instructions in the memories of computers 81 and 82. Each data word occupies the entire 24 bits of each memory location, the first bit designating the sign or polarity of the data word, while the remaining 23 bits indicate the numerical value of the particular data being considered. In contrast, the 24 bits of an instruction or command word are arranged in a specific fashion to denote particular commands and operations to be performed. Bits 1–3 modify the basic address field of the command word with an indirect address or index address change, bits 4–9 are the command code, and bits 10–24 are the memory address of the data to be operated on by the particular command. In other words, bits 4–9 indicate whether a particular data word is to be added, subtracted, multiplied, etc.; bits 10–24 indicate which data word is to be added, subtracted or multiplied, and bits 1–3 selectively indicate if a word located at an address in the memory different from the address indicated by bits 10–24, is to be added, subtracted, multiplied, etc.

*Interface*

Because the computer functions with 24 bit binary words and the simulator inputs are either analog signals, binary coded decimal signals from the Digiswitches, or discrete on-off signals, the interface system of FIGURE 8 must be employed.

The interface of FIGURE 8 interconnects the input signals with a main digital computer 81 and an auxiliary digital computer 82, respectively having memories of 8,192 and 4,096 words. The nine analog, seven discrete and four binary coded decimal signals are invariably coupled through the interface to main computer 81 and some of the signals are thence transferred selectively to auxiliary computer 82. All necessary data is re-transferred back from auxiliary computer 82 to main computer 81 from where it is supplied as output signals to the indicators of FIGURE 7 and motors 71, 72 and 73, FIGURE 6.

The nine analog input signals from the instructor and signal stations 50 and 60 are fed on nine separate parallel input leads comprising bus 83 to a bank of nine analog switches 84. Each of the nine switches 84 is selectively energized in response to select signals derived from address decoder circuit 85, which select signals are coupled to the switching networks via the nine leads comprising bus 86. Thereby, one of the nine analog input signals to analog switches 84 is fed via line 87 to the input of analog-to-digital converter 88. Analog-to-digital converter 88 is responsive to a reference voltage on lead 89 and provides a binary data output signal on twelve parallel leads connecting the converter with input gating network 91. The binary data signals on the twelve parallel leads comprising bus 92 between converter 88 and gating circuit 91 represent, in binary form, the magnitude of the analog input selected by switching bank 84.

Signals are coupled via the twelve leads comprising bus 92 from converter 88 to gating circuit 91 only after a complete conversion operation has taken place in the converter. When the conversion has been effected, converter 88 derives an "end of conversion" signal on lead 93. The end of conversion signal is coupled through input-output control network 94 to input gating network 91 via lead 95. The signal on lead 95 enables input gating circuit 91 to couple the twelve bit data word fed to it by bus 92 to the parallel input channel 96 of main computer 81. Input channel 96 comprises twenty-four separate flip-flops, each of which is responsive to and stores temporarily a binary bit on one of the twenty-four data leads comprising bus 97, connecting circuits 91 and 96 with each other.

Prior to coupling the binary data between circuits 91 and 96, input flip-flops in parallel input channel 96 are enabled in response to energization of lead 98, that is connected between input-output control circuit 94 and parallel input channel 96. The signal on lead 98 is generated by input-output control network 94 in response to the end of conversion pulse derived on lead 93 by analog-to-digital converter 88 after each analog input has been converted to binary form.

Each twelve bit data indicating word from converter 88 is supplied by parallel input channel 96 to a specific location of the main computer 81 data memory address. Control of the location in computer 81 for the data word is in response to internally derived program signals. The input word erases the word previously stored for the same input parameter, whereby the various inputs to computer 81 are continuously updated. In the same manner, words in the memory of auxiliary computer 82 are continuously updated. In consequence, both computers function as a real time computer continuously solving problems related with differing and variable inputs.

Once the binary data word associated with a particular analog input coupled through switch bank 84 has been stored in the main computer 81 memory, the main computer derives an output control pulse on lead 99. The signal on lead 99 is coupled through input-output control network 94 to output leads 101 and 102, respectively coupled to analog-to-digital converter 88 and address decoder circuit 85. The signal on lead 102 advances the address in address decoder circuit 85 to enable a switch in analog switch bank 84 different from the switch that was activated during the preceding time interval when one of the nine analog inputs was coupled to converter 88. Thereby, a different one of the switches in switch bank 84 to lead 87 and the input of analog-to-digital converter 88 is energized and another analog input is sampled. Analog-to-digital converter 88 is then enabled, via the pulse coupled to it on lead 101, to accept the new analog input signal and initiate a further conversion cycle. During the interval when address decoder circuit 85 was being transferred from the first to the second address, the signal on lead 101 cleared the registers in converter 88, thereby resetting them to zero so that the new conversion would be effected without regard to previous conversions.

In the manner described, each of the nine analog input signals on bus 83 is sequentially applied to converter 88 and stored at a different address in the memory of main computer 81. After the ninth word has been stored in the memory of main computer 81, the main computer derives an output signal on lead 103, which output signal is coupled to an input terminal of discrete input selector network 104. The signal on lead 103 is coupled through discrete input selector network 104 to input-output control network 94 via lead 105. Input-output control network 94 routes the signal on lead 105 to lead 98 and thence to parallel input circuit 96 in main computer 81.

The signal on lead 98 enables the twenty-four flip-flops connected to bus 97 so that the main computer is now ready to receive the seven discrete inputs. The seven discrete input bits, indicative of the status of various on-off inputs at the instructor and student stations, are selectively binary ones and zeros at seven bit locations in one twenty-four bit word and are coupled via the seven leads comprising bus 106 in parallel to input gating circuit 91. The discrete input word is transferred through input gating circuit 91 to bus 97 and input circuit 96 of main computer 81, in response to activation of one of the five leads in bus 107, connecting the selector circuit to input gating circuit 91.

In response to the seven bits representing the discrete input word being fed into the flip-flops of parallel input channel 96, the computer input channel circuit derives a pulse on lead 108. The pulse on lead 108 is coupled through input-output control circuit 94 to lead 109 and advances the state of a register included in discrete input selector 104, whereby a different one of the leads in bus 107 is enabled. Input selector circuit 104 is then energized via a signal on lead 103 from computer 81 after the discrete data word in the flip-flops of parallel input channel 96 has been stored in an appropriate location in the main computer 81 memory. In response to the signal on lead 103, selector circuit 104 energizes a second one of the five leads in bus 107.

Energization of the second one of the leads in bus 107 couples the first binary coded word, which includes sixteen bits indicative of the four decimal orders of barometric pressure, into input gating circuit 91. In toto, fifty-two leads comprising bus 411 are connected to input gating circuit 91 to indicate the values of the four binary coded decimal signals from the Digiswitches at instructor station 60, FIGURE 6. Each of the four binary values for each order of the various parameters produced by the Digiswitches is applied to a different one of the leads in bus 411.

After the sixteen binary bits of the four Digiswitches for barometric pressure have been coupled through input gating network 91 to parallel input channel 96 via bus 97, in the manner described supra for the seven discrete inputs on leads 106, a signal is again derived on lead 108. The signal in lead 108 is coupled through input-output control network 94 to lead 109, whereby the third lead of bus 107 can be energized in response to a pulse being derived on lead 103 after the barometric pressure word has been loaded into the appropriate memory address of main computer 81. In the manner indicated, the second, third and fourth Digiswitch words, indicative of the instructor inputs for field elevation, wind direction and wind velocity, of sixteen, twelve and eight bit lengths, respectively, are fed to separate locations in the main computer memory. While the four Digiswitch input words are sixteen, sixteen, twelve and eight bits in length, respectively, and each data word is twenty-four bits in length, it is understood that the remaining bits of each word are filled with binary zeros.

After all of the analog, discrete and Digiswitch input signals have been stored in predetermined addresses in the memory of main computer 81, an inter-computer transfer, i.e., a transfer between the memories of computers 81 and 82, is accomplished. The inter-computer transfer removes the Digiswitch input words from the memory locations of main computer 81 to the main computer parallel output channel 111 in response to an internally derived control pulse from the main computer.

Parallel output channel circuit 111 includes twenty-four parallel flip-flops for transferring the twenty-four bits of a data word between computers 81 and 82. The twenty-four parallel output flip-flops in channel 111 are enabled to receive the Digiswitch words from the memory in response to a signal on lead 112 from input-output control circuit 94. The enable pulse on lead 112 had previously been coupled through input-output control network 94 in response to the end of conversion signal on lead 93 from analog-to-digital converter 88.

As the first Digiswitch word is coupled into the parallel output channel 111 flip-flops, it is immediately transferred to output buffer 113, which comprises twenty-four parallel high speed flip-flops. The data stored in output buffer 113 is transferred on twenty-four parallel lines comprising bus 114 to twenty-four flip-flops in parallel input channel 115 of auxiliary computer 82. The parallel flip-flops in circuit 115 have previously been enabled to receive the first Digiswitch word in response to a signal on lead 116. The signal on lead 116 was derived by input-output control network 94 in response to parallel output channel network 111 of main computer 81 having been enabled by the signal on 112. The enabling signal for auxiliary computer input channel 115 is derived on lead 117, coupling output main computer channel 111 with input-output control network 94.

In response to the transfer of the first twenty-four bit Digiswitch word in the flip-flops of parallel input channel 115 to an appropriate auxiliary memory location, the parallel input channel 115 derives a pulse on lead 117. The pulse on lead 117 is coupled through input-output control network 94 to lead 118, that connects output buffer 113 with control circuit 94 to reset the buffer flip-flops to the initial, all binary zero state. The pulse on lead 117 is also coupled through input-ouput control network 94 to lead 112, thereby again enabling the flip-flops in parallel output channel 111 of main computer 81 to be responsive to internally derived data. Parallel output channel 111 now responds to the second twenty-four bit Digiswitch word and transfers it to a predetermined memory location in auxiliary computer 82. In the manner described, the third and fourth Digiswitch words are transferred between main and auxiliary computers 81 and 82. After the four Digiswitch words, in binary coded decimal form, are stored in appropriate memory locations in auxiliary computer 82, the auxiliary computer converts these binary coded words into binary notation, in a conventional manner, controlled by the auxiliary computer internal program.

Prior to conversion of the Digiswitch words from binary coded decimal to binary form by auxiliary computer 82, auxiliary computer 82 had transferred data computed during the previous 62.5 millisecond computation period back to main computer 81. At the end of the previous computation period, after the transfer was complete, the twenty-four parallel binary flip-flops comprising parallel output channel 119 of auxiliary computer 82 were enabled in response to a signal on lead 121 so that they could receive data from the auxiliary computer internal memory. The signal on lead 121 was derived by input-output control network 94 in response to the main computer parallel input channel 96 being set to a standby condition, which is reached after the last Digiswitch word has been coupled into the main computer memory.

When the last Digiswitch word has been coupled into the main computer 81 memory, the main computer output channel 111 derives a pulse on lead 108, which pulse is coupled through input-output control circuit 94 to lead 121, to enable the flip-flops in output channel 119 of auxiliary computer 82. Auxiliary computer 82 is programmed at this time to transfer the data it computed, e.g., aerodynamic characteristics, during the previous computation period to the twenty-four flip-flops of its parallel output channel 119. The binary word in the auxiliary computer 82 output channel is fed via the twenty-four data leads comprising bus 122 to buffer 113 which routes it into the main computer parallel input channel 96 via the twenty-four leads comprising bus 123, input gating circuit 91 and bus 97. After a word has been transferred from auxiliary computer 82 to main computer 81, the main computer input channel derives a pulse on lead 108 to reset buffer 113 back to the initial state. In the manner described, a multiplicity of twenty-four bit words, indicative of the variables computed by auxiliary computer 82 during the previous computation period, is transferred from the auxiliary computer to main computer 81. There has now been described the manner in which data is loaded into main computer 81 from student and instructor stations 50 and 60 and transferred from main computer 81 to auxiliary computer 82, and vice versa, during each 62.5 millisecond computation period.

After all of the data transfers for a computation period have been effected, computers 81 and 82 initiate a computation cycle. During the computation cycle, data words are supplied to the main computer parallel output channel network 111 as the various computations occur within main computer 81. The data output words supplied to channel 111 are coupled to output buffer 113. Buffer 113 is assumed to be in a reset condition in response to input-output control circuit 94 coupling a rest pulse to lead 118. The pulse on lead 118 is generated in response to lead 117, between main computer output channel 111 and input-output network 94, being energized by each receipt of a data word by output channel 111.

The binary word stored in output buffer 113 is now routed to address decoder 85 and digital-to-analog converter 123. The seven bits in the word indicative of the computed function, e.g., indicated air speed, are supplied to address decoder 85 while the twelve bits indicative of the value of the function are supplied to converter 123.

Steering the output of buffer 113 to address decoder 85 and digital-to-analog converter 123 is in response to an output control pulse derived on lead 99 by main computer 81. The pulse on lead 99, derived internally of main computer 81 by the program, is coupled through input-output control network 94 to leads 102 and 124, thence to address decoder 85 and digital-to-analog converter 123.

The seven address bits coupled to decoder 85 from buffer 113 control the registers in the decoder to select one of the twenty-three sample and hold amplifiers in the bank of sample and hold amplifiers 125. Digital-to-analog converter 123 converts the twelve binary bits applied to it by buffer 113 to an analog signal utilizing the well-known weighted resistor converter approach which requires a reference voltage, such as exists on lead 89. The analog voltage derived by converter 123 is supplied to the selected sample and hold amplifier in amplifier bank 125, whereby an analog signal is derived on one of the twenty-three output leads comprising bus 126.

The signals on bus 126 can be assumed to be constant over the entire 62.5 millisecond computation period of the data processor and vary in relatively small step increments from period to period. The analog outputs on bus 126 are supplied to the current responsive meters in FIGURE 7 and to motors 71, 72 and 73, whereby the trainee is provided with an accurate indication of his performance and with craft movement simulating roll, heave, and pitch.

Functions that are computed in auxiliary computer 82 and that are supplied to student or instructor stations 50 and 60 are coupled to digital-to-analog converter 123 via main computer 81. The inter-computer transfer between auxiliary computer 82 and main computer 81 for such data is accomplished in precisely the manner indicated supra for the inter-computer transfer occurring at the beginning of each computation period. The computed data from auxiliary computer 82 is transferred from the main computer parallel output channel 111 to output buffer 113 by program pulses derived internally of main computer 81. Main computer 81 also transmits pulses on lead 99 enabling address decoder 88 and digital-to-analog converter 123 for the functions computed by auxiliary computer 82. Conversion of the data words stored in output buffer 113 for output purposes is thus the same regardless of the origination of the particular function being supplied by the data processor to the external simulator devices, i.e., the manner in which analog information is ultimately derived for output purposes is the same whether the information originated in main computer 81 or auxiliary computer 82, once the data has been transferred back to the main computer.

After each of the data words for the twenty-three analog signals has been supplied to sample and hold amplifiers 125 and all other functions required of the computer have been completed, but prior to completion of a 62.5 millisecond computation period, main computer 81 derives three output signals on three parallel output leads forming bus 127. The signals on bus 127 are supplied in parallel to indicators 74, FIGURE 7, to provide the instructor and trainee with visual indications that the landing gear is: up and locked; down and locked; or in a "touchdown" state.

The interface includes two discrete inputs, additional to those already considered, which are derived on parallel leads 128. The inputs on leads 128 are on-off type signals responsive to control switches at instructor station 60 and are indicative, respectively, of (1) the instructor freezing the system at the existing state, whereby the student can make no changes in the simulated aircraft operation, and (2) a reset to ground or initial condition state. The freeze signal is energized by the instructor when he feels that the student has energized the simulated controls in a manner to cause the craft to become unstable or assume a crash condition that cannot be avoided. Freezing the computer enables the instructor to indicate to the student that the craft would be malfunctioning. The reset discrete input is energized by the instructor after he has completed his explanation of the problem to the student, whereby the craft can be returned to an initial position on the ground and flying is not resumed in the air in an unstable mode.

Sense line logic circuit 129 responds in sequence once during each computation period to the signals on instructor control leads 128. In response to the freeze signal, circuit 129 couples a pulse via a selected one of the two leads 131 to sense line input circuit 132 of main computer 81. In response to the freeze signal being coupled into sense line circuit 132, the flip-flops in the main computer parallel input channel network 96 and parallel output channel 111 are bypassed by the computer program. Thereby, the further application of data through the interface to the internal circuitry of the computer is prevented and the values applied to the meters of FIGURE 7, as well as the visual indicators 74 thereof, are frozen. In response to the reset signal being coupled to sense line logic network 125, selected variables are set to predetermined values, the normal calculations are skipped and the effects of control input signals from the student station are ignored. The variables are set to values such that the simulated helicopter is returned to the initial position, located on the landing field.

Sense line logic circuit 129 is responsive once during each computation period to a signal derived by discrete input selector 104 on lead 133. Discrete input selector 104 responds to output pulses deriving from main computer 81 on lead 103 to couple selectively the two inputs on leads 128 to sense line input 132 of main computer 81.

The remaining component in the interface is cycle timer 134 that derives an interrupt signal once every 62.5 milliseconds. The interrupt signal is coupled via output lead 135 from cycle timer 134 to main computer 81 to cause the computer to initiate a new computation cycle once every 62.5 milliseconds. Thereby, main computer 81 continuously operates through the same operating cycle and is reprogrammed each 62.5 milliseconds. Cycle timer 134 also couples signals to discrete input selector 104 and input-output control network 94. The signals supplied by cycle timer 134 to discrete input selector 104 and input-output control network 95 occur during differing portions of each 62.5 millisecond computation period to control the flow of signals through circuits 94 and 104 in the manner required to effect some of the coupling functions referred to supra.

Consideration is now given to certain of the specific circuits in the interface between main computer 81 and auxiliary computer 82 and the input and output apparatus. Those circuits which are described specifically are the ones which are unconventional and for which the circuit diagram cannot be readily ascertained by those skilled in the art from the functional description given.

*Gating circuit 91*

Input gating circuit 91, FIGURES *9a–9b*, comprises a matrix of AND gates 141 simultaneously connecting all of the bits in a particular word to the twenty-four leads 97 between the input gating circuit and parallel input channel 96 of main computer 81. Seven vertically arranged columns 142–148 of AND gates are provided, the columns being respectively responsive to: the enable barometric pressure Digiswitch word (the first Digiswitch word) on the second lead in bus 107; the enable field elevation Digiswitch signal (the second Digiswitch word) on the third lead in bus 107; the enable wind direction Digiswitch signal (the third Digiswitch word) on the fourth lead in bus 107; the enable wind velocity Digiswitch signal (the fourth Digiswitch word) on the fifth lead in bus 107; and the enable output buffer lead 149. The manner in which each of the enable signals is derived is described supra, with the exception of the enable output buffer signal on lead 149.

The enable output buffer signal on lead 149 is derived by NOR gate 151 in response to the enable signals on lead 95 and each of the enable signals in bus 107. If any of the inputs to NOR gate 151 is in a binary one enable state, a binary zero disable signal is derived on lead 149. If, however, none of the inputs to NOR gate 151 is in a binary one state, NOR gate 151 derives a binary one signal on lead 149, whereby each of the AND gates in column 148 is enabled. Thereby, any data coupled into the AND gates in column 148, via the twenty-four leads between output buffer 113 and the input gating circuit, is coupled through the input gating circuit to the twenty-four input leads 97 of main computer 81 in response to a binary one from NOR gate 151.

Since parallel input channel 96 of main computer 81 has the twenty-four flip-flops thereof enabled by the signal on lead 98 only at predetermined selected times, one of which is when an inter-computer transfer is occurring, and the others being when the remaining enable inputs to input gating circuit 91 are energized, data is transferred from output buffer 113 through input gating circuit 91, via the AND gates in column 147, only during an inter-computer transfer from auxiliary computer 82 to main computer 81. The input on lead 98 to parallel input channel 96 of main computer 81 is not energized when data is being transferred from main computer 81 to auxiliary computer 82 so that the possibility of recirculating data from parallel output channel 111 of main computer 81 through buffer output 113 and input gating circuit 91 is obviated.

In the circuit diagram for input gating network 91, FIGURES 9*a*–9*b*, it is to be understood that similarly denominated horizontally extending leads from each of columns 142–148, are connected to the same input lead in the bus comprising the twenty-four data lines 97. In consequence, the twelve bits deriving from analog-to-digital converter 88 on bus 92 are supplied to leads 1–12 of bus 97 during the period when lead 95 is energized. The seven discrete binary on-off type inputs on leads 106 are coupled to leads 1–7 in bus 97 during the interval when the first lead in bus 107 is energized. Similarly, the sixteen bits required to express the hundredths, tenths, units and tens orders of barometric pressure set in by the instructor on the barometric pressure Digiswitches are coupled to leads 1–16 of bus 97 when the second lead in bus 107 is energized; leads 1–16 of bus 97 are energized when the third lead in bus 107 is a binary one; leads 1–12 of bus 97 are energized during the interval when the fourth lead in bus 107 is energized; and leads 1–8 in bus 97 are energized when the fifth lead in bus 107 is a binary one. Because each of the enable signals is always a binary one during a different time interval, only one of the binary input words fed to input gating circuit 91 is coupled to parallel input channel 96 of main computer 81 at a time.

*Discrete input selector 104*

Input selector 104, the circuit diagram of which is illustrated specifically in FIGURE 10, comprises five gated flip-flops 161–165. Each of gated flip-flops 161–165 has five inputs, namely, set level control input 166, A.C. set input 167, A.C. set input 168, A.C. reset input 169, and reset level control input 170. Two outputs are derived from each of flip-flops 161–165, specifically, set output 172 and reset output 173. Level control inputs 166 and 170 permit gating of set and reset information on leads 167 and 169, respectively, while a pulse on the set input lead 168 is invariably fed to the flip-flop, i.e., does not require gating.

Gated flip-flops 161 and 162 are respectively responsive to the outputs of main computer 81 indicative of the main computer being ready to accept discrete inputs and Digiswitch inputs. Flip-flops 163–165 are cascaded with each other and the outputs of flip-flop 162, whereby the four flip-flops comprise a shift register.

At the beginning of each 62.5 millisecond operating cycle of the computer, cycle timer 134 couples a pulse to discrete input selector 104 via lead 175. The pulse on lead 175 is coupled in parallel to each of flip-flops 161–165 and resets the flip-flops to an initial condition of reset. Thereby, the flip-flops 161–165 are always assured of starting from the same initial state.

To generate the "start discrete input selector" signal on lead 105, at the beginning of each discrete input cycle, main computer 81 is programmed to be fed a pulse on lead 103 for energizing OR gate 174, whereby a pulse is coupled via lead 105 to input-output control circuit 94. The pulse coupled to circuit 94 enables a gate therein, described infra, whereby the following pulse generated by main computer 81 on lead 108 causes a pulse to be derived on lead 109.

The pulse on lead 109 occurs simultaneously with another pulse derived by main computer 81 on lead 103. The combination of pulses on lead 103 and advance discrete input word lead 109 causes gated flip-flop 161 to be energized into the set state, whereby an output is derived on lead 173. The output from the set terminal of flip-flop 161 is coupled to the discrete input enable lead of input gating circuit 91, FIGURE 9. In consequence, each of the AND gates in column 143 is enabled and the seven binary bits in the discrete input word are fed into the parallel input channel 96 of main computer 81.

After main computer 81 has stored the discrete input signals in the program memory location, it derives binary one signals on leads 108 and 103. In response to the signal on lead 108, input-output control network 94 generates a binary one signal on "advance discrete input word" lead 109. Since the leads 103 and 109 are now energized with binary ones, flip-flop 162 is energized to the set state. Thereby, a binary one signal is derived at terminal 173 by flip-flop 162 and the binary coded bits representing barometric pressure, coupled to the AND gates in column 144, FIGURE 9, are fed to parallel input channel 96 of main computer 81. The AND gates in column 143, FIGURE 9, indicative of the discrete inputs, are not now enabled because of the ground bias applied to lead 170 simultaneously with the binary one signal on lead 109. The combination of the ground bias on lead 170 and a binary one signal on lead 109, that is coupled to lead 169, without a binary one signal on input lead 168 of flip-flop 161, causes flip-flop 161 to be reset. With flip-flop 161 reset, the AND gates in column 143 are disabled, thereby preventing the discrete input signals from being coupled into the main computer 81.

In response to the binary bits in the first Digiswitch word, indicative of barometric pressure, being stored in main computer 81 the computer derives another output signal on lead 108, which signal results in a binary one being transmitted via lead 109 to discrete input selector 104. The binary one signal now occurring on lead 109 rests flip-flop 162 and sets flip-flop 160 in response to the gating action from the set and reset outputs 173 and 172 of flip-flop 162, whereby the second Digiswitch word, indicative of field elevation, is coupled into main computer 81. In the manner described, flip-flops 164 and 194 are selectively energized to the exclusion of all other flip-flops to gate selectively the Digiswitch words indicative of wind direction and wind velocity, to the gates in columns 146 and 147.

Energization of flip-flop 165 to the set state energizes lead 176 with a binary one, coupled between discrete input selector 104 and input-output control network 94. The derivation of a binary one signal on lead 176 closes a gate in input-output control network 94, whereby pulses are no longer coupled from output lead 108 of main computer 81 to "advance discrete input word" lead 109, and flip-flops 162–165 are frozen.

Because the Digiswitch data inserted by the instructor relates only to initial condition, i.e., to conditions existing on the ground at the tme the trainee begins the "flight," it is necessary to sample and store the binary data deriving from the switches only once during each training operation. In order to reduce the operations performed by the computer, and eliminate repetitive coupling of the Digiswitch inputs to the computer memory, the net output of flip-flop 165 is coupled to the reset input of conventional, ungated flip-flop 177. The set input to flip-flop 177 is from a switch (not shown) on the instructor pan*l. The switch is activated by the instructor prior to each "flight" by the trainee to feed a binary one input to the set terminal of flip-flop 177. In response to the binary one input to the set terminal of flip-flop 177, the reset output thereof, terminal 178, is activated to the binary zero state. The binary zero deriving from terminal 178 of flip-flop 177 is reversed in value by inverter 179 and coupled as a binary one to main computer 81 via a lead of bus 131.

The binary one signal on the lead of bus 131, connected to inverter 179, directs the computer program to gate the Digiswitch words into memory. In response to the binary one signal on the lead connected to inverter 179, main computer 81 causes lead 103 to energize selector 104 for the next 62.5 milliseconal computation period. During the next computation cycle, when the Digiswitch information is loaded into the computer memory, flip-flops 162–165 are energized and a binary one signal is derived on lead 133, resetting flip-flop 177. Flip-flop 177, now being reset, causes a binary zero to be transmitted by inverter 179 to computer 81, whereby during the next 62.5 millisecond computation cycle, the Digiswitch lead in bus 103 is not energized and the computer program skips over the Digiswitch inputs.

Sense line logic circuit 129, in addition to including flip-flop 177 and inverter 179, includes NOR gating circuits 181 and 182, respectively responsive to binary one signals generated by reset button 67 and freeze button 66 at instructor station 60. If either button 66 or 67 is energized, one of NOR gates 181 and 182 feeds a signal to sense line input 132 of main computer 81 via appropriate leads in bus 131.

*Cycle timer 134*

Cycle timer 134, FIGURE 11, comprises fourteen binary flip-flop stages 191 cascaded with each other to provide a frequency division of $2^{13}$ for the 102.4 kilocycle per second rectangular wave deriving from oscillator 192. The first four stages of the counter, i.e., the first four cascaded flip-flops 191, comprise a free-running counter while the remaining ten stages 191 form a reset counter.

Outputs from $2^3$, $2^8$, $2^{11}$ and $2^{12}$ flip-flop stages of the counter are combined in AND gate 193, the output of which is coupled to the set input of gated flip-flop 194. The gate input of flip-flop 194 is responsive to the rectangular waves deriving from the $2^2$ flip-flop 191 counter stage. By connecting gated flip-flop 194 to the output of AND gate 193 and the $2^2$ stage of the counter, the gated flip-flop derives a rectangular pulse having a duration of 39 microseconds once every 62.5 milliseconds. The 39 microsecond pulse generated by gated flip-flop 194 on its set output lead is coupled via lead 135 to the cycle interrupt input of main computer 81 to reinitiate a computation cycle in the main computer once every 62.5 milliseconds.

The set output of gated flip-flop 194 is also coupled in parallel to rest AND gates 195 and 196. The 39 microsecond pulse fed by flip-flop 194 to reset gates 195 is combined with a 30 microsecond pulse derived by an output of delay, single shot multivibrator 197, having its input responsive to the $2^0$ stage of the counter. Multivibrator 197 derives a positive going wave nine microseconds after the receipt of its input of a similarly going wave from the first flip-flop 191 in the counter. The 30 microsecond output pulse from delay multivibrator 197 is combined with the output of gated flip-flop 194 in AND gate 195, whereby the AND gate derives the 30 microsecond positive pulse that resets each of the counter stages $2^4$–$2^{13}$ to the initial reset or binary zero state. Thereby, each of stages $2^4$–$2^{13}$ is ready to receive pulses during a new computation cycle.

The output of gated flip-flop 194 coupled to AND gate 196 is combined with the output of clock 192 and a signal from main computer 81. The signal from main computer 81 comprises a positive voltage level, the leading edge of which is derived when all of the main computer computations have been performed and all of the data has been outputted. The positive voltage level is generated by the computer on lead 198 until the trailing edge of the cycle interrupt signal on lead 135 occurs. In response to the cycle interrupt signal trailing edge, the positive level on lead 198 terminates and gate 196 is disabled.

During the interval when gate 196 is enabled in response to the binary one signals on leads 135 and 198, approximately 5 pulses from clock source 192 are coupled through gate 196 to input-output control network 94 and discrete input selector 104 via lead 199. The pulses coupled to control network 94 and selector network 104 via lead 199 reset the flip-flops therein to the reset state.

*Input-output control network 94*

Reference is now made to FIGURE 12 wherein the circuit diagram for input-output control network 94 is illustrated.

The analog-to-digital and digital-to-analog control pulse deriving from main computer 81 on lead 99 is coupled through inverting gate 201 to lead 124 that extends to digital-to-analog converter 123. The binary one signal deriving from inverter gate 201 is also fed to inverter 202 from whence it is coupled to the input of delay, single shot multivibrator 203.

The output of delay multivibrator 203, the leading edge of which occurs approximately 10 microseconds subsequent to the leading edge of its input, is coupled in parallel to the inputs of single shot delay multivibrator 204 and OR gate 218. The binary one signal supplied to delay multivibrator 203, indicative of main computer 81 ordering either an analog-to-digital or digital-to-analog conversion, is shaped by delay multivibrator 204, from whence it is coupled to one of the inputs of OR gate 205. OR gate 205 is also responsive to the binary one signals on leads 93, 117 and 199, indicative respectively of: end of an analog-to-digital conversion; readiness of input channel 96 of main computer 81 to receive input data; and the beginning of a new computation cycle period. In consequence, OR gate 205 supplies a binary one signal to enable output channel 111 of main computer 81 whenever any one of the five mentioned events, signified by a binary one at the gate input, occurs.

To perform an inter-computer transfer from main computer 81 to auxiliary computer 82, a binary one signal is derived on the inter-computer transfer lead of bus 99. The signal on the inter-computer transfer lead is coupled to both the set and reset inputs of flip-flop 207 so that the first signal applied to flip-flop 207 by the lead in bus 99 transfers the state of the flip-flop to reset. The reset output of flip-flop 207 is combined in AND gate 208 with the signal from parallel output channel 119 of auxiliary computer 82, which is indicative of the auxiliary computer output channel being ready to feed information via leads 122 to buffer 113. In consequence, AND gate 208 derives a binary one signal when main computer 81 indicates that it is ready for an inter-computer transfer and auxiliary computer 82 indicates that it is in a position to couple data from its parallel output channel 119 to output buffer 113.

The binary one output of AND gate 208 is coupled through OR gate 209, the output of which is connected to lead 98. It is to be recalled that lead 98 carries a signal to the parallel input channel 96 of main computer 81, to ready the input channel to receive data on bus 97. OR gate 209 also feeds a binary one signal from lead 105 to the main computer parallel input channel via lead 98. The binary one signal on lead 105 indicates that a discrete input operation is ready to commence, as derived from discrete input selector 104.

The binary one signal on lead 105 is also applied to the set input of flip-flop 211, the reset input of which is responsive to the "stop discrete input" signal on lead 176, as derived from discrete input selector 104, as well as the cycle timer reset pulse on lead 199. The set output of flip-flop 211 is applied as one input to AND gate 212, the other input of which is responsive to the enabled output of one-shot delay multivibrator 213. Delay multivibrator 213 is enabled to derive a binary one pulse of predetermined width in response to the binary one signal on lead 108 from input channel 96 of the computer 81. The occurrence of a binary one on lead 108 indicates that input channel 96 is ready to receive information, whereby delay multivibrator 213 generates a binary one to allow the binary one occurring from the set state of flip-flop 211 to be passed through OR gate 209 to input lead 98 of main computer 81, via AND gate 212.

At all times, other than during the brief interval following application of a binary one at its input terminal, a binary one output appears on the disable output lead of delay multivibrator 213 and is coupled via lead 109. This discrete input selector 104 advances the states of flip-flops 161–165 of input selection 104 in response to each transition of delay MV 213 from the enable to disable state. The disable output lead of the latter is also coupled to the reset input of flip-flop 214, along with periodically occurring output of cycle timer 134 on lead 199.

The set input of flip-flop 214 is responsive to the disable output of delay single shot multivibrator 215, the input of which is responsive to the occurrence of a binary one signal on "end of analog-to-digital conversion" lead 93. In consequence, flip-flop 214 is driven to its set state whenever analog-to-digital converter 88 has completed converting an analog signal to a digital value and is reset in response to a new discrete word being fed through input gating network 91 to input channel 96 of main computer 81. The reset output of flip-flop 214 is supplied to input gating circuit 91 via lead 95 to enable the contents of analog-to-digital converter 88 to be fed through the input gating circuit while the set input of flip-flop 214 is supplied as an enabling signal via lead 102 to address decoder 85. The enabling signal on lead 102 steps address decoder 85 to the next analog switch which is to be closed to allow the passage of analog signal to converter 88.

The disable output of delay multivibrator 215, after suitable delay and reshaping by single shot delay multivibrator 216, is coupled through OR gate 209 to lead 98, from whence it is applied to input channel 96 of main computer 81. The signal on lead 98 enables input channel 96 to receive the parallel binary input on bus 97.

The disable output of delay multivibrator 215 is coupled to the reset input of flip-flop 217, along with the cycle reset output from timer 134 on lead 199. The set input of flip-flop 217 is responsive to the occurrence of a binary one signal on the lead in bus 99 that indicates main computer 81 is ready to receive pulses from analog-to-digital converter 88. In consequence, the reset output of flip-flop 217 carries a binary one signal only when the main computer 81 is ready to receive a new digital word from analog-to-digital converter 88. The binary one reset output of flip-flop 217 is combined with the binary one enable output of delay multivibrator 203, FIGURE 12, in OR gate 218 of FIGURE 12. The output of OR gate 218, coupled with the enable input for address decoder 88, i.e., the input for the decoder which steps it from one address to the next, is activated only when main computer 81 is prepared to: receive a new word from analog-to-digital converter 88 or supply an output word that is ultimately fed to digital-to-analog converter 123.

The signal on the lead in bus 99, indicative that main computer 81 is ready to receive a new word from converter 88, in addition to being supplied to the set input of flip-flop 217, is delayed for 28 microseconds by single shot delay multivibrator 219. The leading edge of the disable output of delay multivibrator 219 starts analog-to-digital converter 88 through a new conversion operation and is coupled to the converter via lead 101.

Input-output control network 94 includes OR gate 221 which derives a binary one output in response to either main computer 81 output channel 111 being ready to supply a signal to buffer 113 or the main computer input channel 96 being ready to receive a word from input gating network 91. OR gate 221 is directly responsive to binary one signals on leads 117 and 108 to derive a binary one on output lead 118 in response to either of the stated conditions.

Control network 94 also includes AND gate 222 which supplies a binary one signal to auxiliary computer 82 input channel 115 via lead 116. The binary one output of AND gate 222 is indicative of main computer 81 being ready to output information from output channel 111 simultaneously with the main computer being ready to effect an inter-computer transfer, as indicated by the presence of a binary one on the inter-computer transfer lead of bus 99. The inter-computer transfer signal is supplied to the input of AND gate 222 via the reset output of flip-flop 207, while the output indicating signal is applied directly and to the AND gate via lead 117.

The remaining output of input-output control network 95, on lead 121, is derived by combining the reset signal from cycle timer 134, on lead 199, with the signal on lead 108, indicative that main computer 81 input channel 96 is ready to receive information. The signals on leads 199 and 108 are supplied to OR gate 223, the output of which is connected to lead 121 that connects input-output control circuit 94 with output channel 119 of auxiliary computer 82. In response to a signal on lead 121, auxiliary computer 82 is apprised of the fact that main computer 81 is ready to receive information from it.

*Circuits of main computer 81 and auxiliary computer 82*

Each of computers 81 and 82 is preferably of the commercially available general purpose type, having approximately the same circuitry and differing in that the memory of main computer 81 has an 8,192 word capacity while auxiliary computer 82 has a memory capacity of 4,096 words. Two computers are desirably employed because of the requirement that a large number of computations and operations be performed in the relatively short time interval of 62.5 milliseconds. While main computer 81 is going through a computation cycle for certain parameters of the helicopter, auxiliary computer 82 is going through other computations. The computations performed in auxiliary computer 82 are transferred back to main computer 81 upon the completion of both computation cycles to enable additional parameters to be computed in the main computer.

In the trainer actually constructed, each of main computer 81 and auxiliary computer 82 is a general purpose computer, Model DDP–24, comercially manufactured by Computer Control Company, Inc. The method of operation and organization of the Model DDP–24 Computer Control Company, Inc., computer are described in a Reference Manual published by the Computer Control Company, and bearing a date of 1963. While the Model DDP–24 computers were utilized, it is to be understood that other general purpose digital computers may be employed for main computer 81 and auxiliary computer 82.

To familiarize the reader with the general construction of the Model DDP–24 computer, reference is now made to FIGURE 13 of the drawings. In discussing FIGURE 13, reference is made to main computer 81, but it is to be realized that the construction of auxiliary computer 82 is exactly the same except for the above-noted difference in the memory capacities.

Main computer 81 includes four main sections, namely: arithmetic unit 251, control unit 252, input-output unit 253 and memory unit 254. Each of units 251, 253 and 254, is shown on FIGURE 13 in dotted lines, while control unit 252 extends over such a large portion of the figure as to make enclosure thereof impractical; hence, each of the structures not shown in the dotted boxes is incorporated as part of control unit 252.

Arithmetic unit 251 comprises twenty-four bit A register 255, the main arithmetic register of the computer, and auxiliary or B register 256 wich also has a twenty-four bit capacity. Registers 255 and 256 are interconnected with each other and the output of main register 255 is a bus of twenty-three parallel leads that are connected to the inputs of adder 257.

Adder 257 has a twenty-three bit input, to enable addition and subtraction of two twenty-three bit words and provide an output having twenty-four bits, the most significant of which indicates a carry. The other input to adder 257 is the twenty-three lead bus at the output of twenty-four bit Z register 258. Z register 258 responds to words from memory 254 and applies these words to adder 257 where they are combined with the contents of A register 255 to effect addition and subtraction. After an algebraic operation of addition or subtraction, the signals on the twenty-four parallel output leads of adder 257 are fed back to the input of A register 255 via lead 259 to replace the signal formerly in the A register.

For multiplication, the multiplier loaded in A register 255 is transferred into B register 256 while the multiplicand is transferred from memory 254 to Z register 258. Adder 257 combines the contents of registers 256 and 258, and by successive addition, derives a word having a length equal to the sum of the bits of the words in registers 256 and 258. The output of adder 257 is supplied to B register 256 but overflow occurs because B register 256 only has a capacity of twenty-four bits. As the overflow bits, i.e., the most significant order bits, are derived, they are transferred from auxiliary register 256 to main register 255. After a complete multiplication operation has been concluded, there are twenty-four bits in each of registers 255 and 256 and the bits in the main register 255 are considered as the answer while those in register 256 are of such a small value relative to the magnitude of the largest order in the main register as to enable them to be discarded, generally.

To divide a data word stored in the A and B registers by a word selected from memory 254, successive subtractions are performed by adder 257 of the double length word in registers 255 and 256 as controlled by the divisor word in register 258. The resulting output of adder 257 is divided into a quotient that is stored in auxiliary register 256 and a remainder that is placed into main register 255. The quotient and remainder words replace the words formerly stored in registers 255 and 256 and the quotient is transferred to main register 255 or to a memory location, as directed by the programmer.

Because of the necessity for converting the binary coded decimal Digiswitch signals to binary, auxiliary computer 82 is provided with a subroutine for binary coded decimal to binary conversion. For a binary coded decimal to binary conversion, the memory word being converted is coupled into Z register 258 and into the logic circuits of converter 459, shown in dotted lines because it is only a part of auxiliary computer 82. Switch 261, interconnecting converter 459 with Z register 258, is closed by an instruction from the program during the initial computation cycle, whereby the Digiswitch values are converted to binary form. The binary signal deriving from converter 459 is fed via leads 262 and 259 to the input of main register 255 to replace the former contents of that register.

Memory section 254 of computer 81 includes a magnetic core storage section 263 that includes 8,192 words, each of which has a twenty-four bit length. Magnetic memory 263 is responsive to the outputs of twelve bit information register 264, which controls where, i.e., at what address, the data is to be stored in memory. Address register 264 is responsive to the count stored in program counter 265, part of control unit 252, which is incremented by one each time a new command is fetched from memory 254. In the event of the memory jumping from one address to another rather than proceeding in order, program counter 265 is loaded with the memory location to which the program is to jump.

Magnetic core matrix 263 is also coupled with twenty-four bit information register 266. Information register 266 controls the flow of data words, as contrasted with instruction words, between the core matrix 263 and arithmetic unit 251. In addition, memory information register 266 controls the flow of data and instructions between control unit 252 and input-output unit 253.

Control unit 252 comprises program counter 265, previously mentioned, as well as operation code register 267 that has a six bit capacity, operation code matrix 268, clock matrix 269, control clock 271, index registers 272 and 273, each of which has a fifteen bit capacity, six bit shift counter 274, transfer bus 275 and AU bus 276. In addition, at times Z register 258 can be considered as part of control unit 252.

Six bit operation code register 267 contains the operation code, i.e., the indication of what operation is to be performed such as addition, subtraction, etc., for the instruction being performed, the index bit and the indirect address bit. In other words, operation code register 265 stores bits 4–9 of an instruction word or bits 1, 2 and 3 of an instruction word, recalling that bit 1 is the indirect addressing bit, bits 2 and 3 are index bits, and bits 4–9 indicate the operational code to be performed. The six bits deriving from register 267 are coupled to clock matrix 269 via a gating structure comprised of operational code matrix 268. Matrix 268 decodes the operation bit outputs into signals to control coupling of pulses from clock 271 to the various circuits of the computer via matrix 269.

Fifteen bit index register 272 is utilized to change the effective address of a particular instruction word. If the instruction word operation code bits 4–9 specify indexing, the contents of index register 272 are added to the fifteen address bits of the instruction word, i.e., bits 10–24. This operation is performed by coupling the output of index register 272 to adder 257 vial leads 277, 278 and 279, as well as switches 281 and 282. Switches 281 and 282 are controlled in response to the program during times when arithmetical operations are not required. The signal deriving from adder 257 is thus an indication of the next memory address to be operated on by the computer.

Input-output control unit 253 comprises parallel input channel 96, as well as parallel output channel 111, FIGURE 8. All information being supplied to and from the computer, including programming information indicative of the equations to be solved and the coefficients of those equations, is transferred into the computer via input-output channels 283 and input-output transfer bus 284. In addition, cycle interrupt signal 135, generated in response to the periodically occurring output of cycle timer 134, FIGURE 8, is coupled to interrupt control 285. In response to the interrupt control 285 output, clock matrix 269 derives a signal to reinstitute a computation cycle.

Information indicative of the equations to be solved, as well as of the constant coefficients in those equations, is initially supplied to memory 263 by an external six bit tape, not shown. The six parallel bits on the tape are supplied by input-output channels 283, input-output transfer bus 284, transfer bus 275 and memory information register 266, to specific locations for memory 263 through a loading process into A register 255. Six bits are read from the input tape at a time and coupled through circuits 283, 284 and 275 and AU bus 276 to locations in A register 255. Four shifts of the tape, each feeding six parallel binary bits to the computer, are required to fill the contents of A register 255. In response to the contents of A register 255 being filled, the program on the paper tape derives a signal to instruct transfer of the twenty-four bits in A register 255 into a specific location in core array 263. The process is continued in the manner described until all of the data required for simulating the performance of the particular helicopter is loaded into the computer.

*Common subroutines of the computers*

Consideration is now given to computations and operations that are performed a multiplicity of times in computers 81 and 82. The computers are programmed to perform these operations in a manner to avoid excess computation times, simplify digital computation, minimize storage requirement, and eliminate scale factors as much as possible on the inputs.

After considering many different approaches to integration, a calculation that must be performed by numerical analysis in digital computers, it was determined that the so-called Mod Gurk $0_{33}$ integration technique would serve satisfactorily for the 62.5 millisecond computation period of the digital helicopter simulator of the present invention. The Mod Gurk $0_{33}$ integration conforms with:

$$x_n = ax_{n-1} + bx_{n-2} + cx_{n-3} + h(d\dot{x}_{n-1} + e\dot{x}_{n-2} + f\dot{x}_{n-3}) \quad (1)$$

where:

$a$=1.146208
$b$=0.201087
$c$=0.054879
$d$=1.641586
$e$=−1.008013
$f$=0.275097
$h$=0.0625 seconds
$x_n$=integrated value of the function for the computation cycle being considered
$x_{n-1}$, $x_{n-2}$, $x_{n-3}$=integrated value of the function for first, second and third preceding computation cycles, respectively,
$\dot{x}_{n-1}$, $\dot{x}_{n-2}$, $\dot{x}_{n-3}$=value of the function for the first, second and third preceding cycles, respectively.

To consider the manner in which the computer solves Equation 1, it will be assumed that there are stored in memory 254 values commensurate with each of the factors in the equation. The values of the constants $a$, $b$ . . . $h$ are supplied to the computer during the initial program read-in cycles, while the values of $\dot{x}_{n-1}$, $\dot{x}_{n-2}$, $\dot{x}_{n-3}$ for the three previous cycles were computed or ascertained directly from inputs, as the case may be for a particular variable, and the values of $x_{n-1}$, $x_{n-2}$, $x_{n-3}$ for the three previous cycles were computed in response to the values of the constants and the values of $\dot{x}_n$. In determining the value of $x_n$, it is also initially assumed that A register 255 has loaded therein the previously computed value of $x_{n-1}$. Memory 263 is instructed to read out the address for coefficient $a$ and the arithmetic unit 251 is cycled through a multiplication operation. Upon the completion of the multiplication operation, register 255 stores the twenty-four most significant bits in the product $ax_{n-1}$. Memory 254 is then instructed to read the stored value of $x_{n-2}$ into auxiliary register 256 and the value of coefficient $b$ into Z register 258. Arithmetic unit 251 initiates a multiplication operation in the same manner as described supra. The twenty-four most significant bits of the product derived, as they are fed from register 256 into main register 255, are added to the previously stored value of $ax_{n-1}$ in the main register. In the manner described, each of the products is formed and added, giving the total value of $x_n$. The value of $x_n$ is returned to a specific location in memory matrix 263 where it is stored for further computations in the cycle being considered and during the succeeding next three computation cycles.

The computed value of $x_n$ replaces the value of $x_{n-3}$ in memory, i.e., the computed value of $x_n$ is stored at the same location as $x_{n-3}$ and remains stored at the same location during the three computation cycles in which it is utilized. To adjust the values of the coefficients so that they will be multiplied with the correct memory locations, the coefficients are shifted to new memory locations. To consider a specific example, the vale of $a$, associated with the value of $x_{n-1}$ during the previously considered computation cycle, is transferred to a memory location where it will be multiplied with the value stored in the memory for $x_{n-3}$ during the previous computation cycle. Since, however, the value of $x_{n-3}$ has been replaced with the value of $x_n$ the correct multiplication will be effected.

The computer is programmed to maintain the varying values, i.e., the values of $x$ and $\dot{x}$ in static locations, and the values of the coefficients in dynamic or changing locations because of the considerably larger number of functions that must be integrated than the values of the coefficients. By maintaining the variable values in static memory locations and the coefficient values in dynamic locations of memory 263, the computer memory is simplified and addressing problems are obviated.

The coefficient values are shifted from one place in memory to another under the control of index register 272. The fifteen address bits supplied to register 272 are derived from the initial program and the index register is advanced from one location to the next in response to instructions from memory matrix 263. The new address word deriving from index register 272 for each new dynamic location of the coefficients is supplied through transfer bus 275 and memory information register 266 to the selected memory location in array 263.

To compute the values of sine $\theta$ and cosine $\theta$, where $\theta$ is an angle in radians, the value of $\theta$ is halved to obtain $\theta=2R$. The sine 2R and cosine 2R are computed as:

$$\sin 2R = \sin \theta = \frac{2 \tan R}{1+\tan^2 R} \quad (2)$$

$$\cos 2R = \cos \theta = \frac{1-\tan R}{1+\tan^2 R} \quad (3)$$

Tangent R is obtained from Equation 4 as:

$$\tan R = \frac{K_C R - K_B R^3}{K_A - K_9 R^2 + K_8 R^4} \quad (4)$$

where $K_A$, $K_B$, $K_C$, $K_8$ and $K_9$ are predetermined constants.

Equations 2, 3 and 4 result in computations for sine $\theta$ and cosine $\theta$ that are accurate to in excess of six decimal places, accuracy greater than required to enable the simulator of the present invention to work satisfactorily.

The manner in which the computer functions to determine sine $\theta$ and cosine $\theta$ can best be understood by referring to the flow diagram of FIGURE 14. The angle whose sine and/or cosine is to be calculated is fed from memory matrix 263 via transfer bus 275 to A register 255, as indicated by input symbol 301 and enter symbol 302. The coefficients in Equation 4 are arranged for an angle in the first quadrant, i.e., between 0 and $\pi/2$ radians, so that the angle, if it is not in the first quadrant must be normalized back to the first quadrant.

Initially, the polarity of the angle, whether it is positive or negative, is determined by examining the sign of the most significant bit in register 255. If the magnitude of the most significant bit in register 255 is a binary one, as determined by a comparison logic circuit for the most significant bit in adder 257, it is determined that the angle is negative. Adder 257 determines if the most significant bit is positive or negative by forming a binary half adder function between the most significant bits stored in A register 255 and Z register 258, the Z register having been loaded with a binary one from memory 263 for the positive and negative determination. If the result of the half adder operation for the most significant bit in adder 257 indicates that the angle is negative, the absolute value of the angle is computed and the constants in Equation 4 are established for an angle lying between 0 and $-\pi/2$ radians. If the angle has a minus value, the constants in Equation 4 are prefixed with appropriate values reversed in polarity from the values indicated.

After a determination has been made that the angle being considered is positive or negative, it is next ascertained whether the angle is greater or less than $2\pi$ radians. In order to effect this comparison, the word stored in A register 255 is subtracted from a value $2\pi$ that memory 263 previously supplied to Z register 258. The most significant digit of the subtraction operation, as derived by adder 257, is utilized for making the determination as to whether the angle is in excess of $2\pi$ radians. If the most significant digit deriving from adder 257 has a binary one value, indicative of a negative subtraction operation and the angle being less than $2\pi$ radians, another subtraction operation is initiated to ascertain whether the angle is greater than $\pi/2$ radians. If, however, the angle is greater than $2\pi$ radians, the subtraction result deriving from adder 257 is coupled back to A register 255. The operation for determining whether the angle now stored in register 255 is greater or less than $2\pi$ radians is continued successively until a binary one bit is derived from the most significant digit output of adder 257.

When the most significant bit deriving from adder 257 has a binary one value, it is ascertained that a computation cycle for determining sine and cosine can be initiated. After the angle has been normalized so that it has a value less than $2\pi$ radians, it is determined whether or not the angle lies in the first quadrant, i.e., whether it is greater than $\pi/2$ radians. If adder 257 determines that the angle is in the first quadrant, positive values for the sine and cosine answers are immediately established. On the other hand, if the angle is in excess of $\pi/2$ radians, the value stored in A register 255 is subtracted from the value of $\pi$ radians now transferred from memory 263 to Z register 258. If the subtraction operation in adder 257 now indicates that a negative result occurs, an indication is provided that the angle lies in the second quadrant, and the sine answer is provided with a positive value while the cosine answer is affixed with a negative value. In the manner described, the computer determines whether the angle lies in the third or fourth quadrant by effecting successive subtractions if it is not determined that the angle was in the first or second quadrant. Once it is ascertained in which quadrant the angle lies, the program automatically skips to set the sign constants for quadrant one. The quadrant information is utilized to affix the signs of the computed sine, cosine and tangent values.

The computer is now ready to solve for the value of tangent R. Solving for tangent R is accomplished by dividing the angle stored in register 255 by two. The resulting division operation, as it appears in register 255, is returned to a specific location in memory matrix 263. Arithmetic unit 251 then resorts to the memory locations in matrix 263 wherein the values of $K_A$, $K_9$, $K_8$ and R are stored to derive the denominator for tangent R. The denominator of tangent R, as determined by Equation 4, is returned to a location in memory 263 from A register 255, at which time the values of $K_B$, $K_C$ and R are supplied from matrix 263 to arithmetic unit 251 for computing the numerator of tangent R.

The value of tangent R remains in A register 255 and is utilized to compute the value of sine $2R=\theta$ in accordance with Equation 2. The most significant polarity indicating bit of the word now stored in A register 255 is ascertained by combining the signals indicative of the polarity of and quadrant of $\theta$. The word in A register 255 is then returned to a temporary location in memory 263, i.e., a location in which a word can be stored for non-permanent use during the particular computation cycle.

After the sine of $\theta$ has been stored in the temporary location in memory matrix 263, cosine $2R=\text{cosine } \theta$ is computed by arithmetic unit 251 in accordance with Equation 3. Upon completion of the computation cycle, the sign of the cosine value is determined and fed into the most significant bit location in the A register 255. The cosine indicating word in A register 255 is coupled into a temporary memory location, different from the temporary location where the sine word is stored.

After the sine and cosine words have been stored in the temporary locations of matrix 263, the computer delivers a command to output the sine and cosine values to output channels 283. Because nondestructive read-out techniques are employed in memory 263, the temporary locations for storing the sine and cosine values may be utilized in the succeeding computations.

*Function generation*

Many of the functions generated by the computer of the present invention are nonlinear and, hence, must be approximated in a digital computer by a plurality of straight lines. Where two straight line approximations of a particular function intersect, a break point is formed. To determine the value of the function for a particular numerical quantity, the quantity or argument is loaded into A register 255 from a location in memory matrix 263. Index register 272 is also loaded with the number of break points minus one in the function being considered. Once index register 272 is loaded, the computer executes a jump to table look-up routine.

The table look-up routine compares the value of the argument stored in A register 255 with the break point values stored in memory 263. In response to the output of adder 257 indicating that the break point value exceeds the argument value, a control pulse is derived from AU bus 276 to instruct transfer of the argument from A register 255 to B register 256. In addition, the control pulse from bus 276 causes memory 263 to feed information to index register 272, which information is indicative of: the break point value that caused the control pulse; the immediately preceding break point; the slope of the straight line joining the break points; and the interception point of the straight line on the abscissa, in an $X$–$Y$ coordinate plot. Arithmetic unit 251 then commences solution of the equation $y=mx+b$ to determine the value of the function for the particular argument originally stored in A register 255.

All the functions for the particular argument being considered are solved sequentially so that once the first function $f_1$ of the argument is ascertained, the second function, $f_2$, of the same argument is ascertained utilizing a repetitive operation. Each of the computed function values is returned to a specific location in memory matrix 263 while the argument is returned to A register 255 until all of the functions thereof are computed.

*General consideration of the simulator equations*

In many of the equations utilized in the digital computer of the present helicopter simulator, straightforward equations that normally would result with the development of the multi-discrete station approach for calculating the forces and moments of the helicopter rotor are not utilized. Instead, the equations have been modified to provide simplification of digital computation, faster digital computation, reduced storage requirements and elimination of certain scaling factors on the inputs.

The most straightforward approach to compute the fuselage forces and moments $X_f$, $Y_f$, $Z_f$, $7_f$, $M_f$ and $N_f$ is to determine the fuselage angle of attack, $\alpha_f$, fuselage sideslip angle, $\theta_f$, and dynamic pressure, $q$. In the present digital flight trainer, however, these forces and moments are computed as functions of the fuselage velocities, U, V and W, in the X, Y and Z coordinate directions, respectively. By relying upon the fuselage velocities, the need for arc-tangent operations, which are very time-consuming in digital computers, and require a large number of table look-ups for function generation, is eliminated.

Utilizing the straightforward approach, the coefficient of lift for the rotor at each of the twelve stations, $C_{L\psi-y}$, the coefficient of drag at each of the twelve stations, $C_{D\psi-y}$, and the blade element torque, $Q_\psi$, would require the use of a plurality of complex functional relationships involving nonlinear terms. In the digital helicopter simulator of the present invention, it has been found that these complex functions can be replaced with straight line functions having a plurality of break points. The errors introduced by approximating the functions with straight line segments are not appreciable and result in greater accuracy than would be achieved if the longer computation period required for exact functional representation were employed. The same observations were made in regard to calculating the coefficient of thrust of the tail rotor, $C_{T_{TR}}$.

In calculating the coefficient of thrust for the tail rotor, a linear equation was evolved having the form of:

$$C_{T_{TR}}=(A-B)(1+D) \quad (5)$$

where:

$A=0.0368\theta_{TR}$ when $\theta_{TR}\leq 0.0977$
$A=-0.006+0.0974\theta_{TR}$ when $\theta_{TR}>0.0977$ $$B=f\left(\frac{.314+K_v\theta_{TR}}{2\text{-}32\text{-}1}\right)(3.52V_{TR}+1.925K_vV^2_{TR})10^{-6}$$

$K_V=-1$ when $V_{TR}<0$
$K_V=1$ when $V_{TR}\leq 0$ $$D=.01465(W_{TR}+U_{TR})f\left(\frac{\theta_{TR}}{2\text{-}32\text{-}3}\right)$$

| $(.314+K_v\theta_{TR})$ | $f(.314K_v\theta_{TR})$ ( 2-32-1 ) |
|---|---|
| $\leq$.122 | 0.0 |
| $\geq$.279 | 1.0 |

| $\theta_{TR}$- | $f(\,^\circ_{TR})$ (2-32-3) |
|---|---|
| -.0838 | 1.0 |
| .000 | 1.0 |
| .077 | .96 |
| .318 | .24 |

While these expressions may appear complex, they are relatively simple compared to the straightforward expressions involving seven nonlinear functions. The nonlinear functions form intermediate variables that must be evaluated to form additional implicit functions. The function derived for the coefficient of the rear rotor thrust, in a single main rotor helicopter, reduces the storage requirements of the computer and saves computation time considerably. The number of tables required is reduced from 19 to 4.

Dynamic pressure, $q$, as such, is not computed directly in the present simulator. It is, instead, determined by functions of the three fuselage velocities, U, V, W and $\rho$, air density, as:

$$q=\tfrac{1}{2}\rho(U^2+V^2+W^2) \quad (6)$$

The dynamic pressure along the longitudinal axis of the craft is computed, however, as:

$$q_x=\tfrac{1}{2}\rho U^2 \quad (7)$$

The dynamic pressure along the $x$ or longitudinal axis of the craft is utilized in computing engine windmilling in both the single and tandem rotor operating modes of the present system.

The usual approach for computing indicated air speed, $V_i$, is as a function of fuselage angle of attack, $\alpha_f$, and fuselage sideslip, $\beta_f$. Since $\alpha_f$ and $\beta_f$ are not determined in the digital computer, however, the value of $V_i$ has been reformulated as:

$$V_i=\sqrt{\sigma}f\left(\frac{U}{V_T}\right) \quad (8)$$

which for the particular single rotor helicopter being simulated is formulated as:

$$V_i=\sqrt{256.8\sqrt{\sigma}\left[-114.285\frac{f\left(\frac{U}{2\text{-}221\text{-}1}\right)}{V_T}+f\left(\frac{U}{2\text{-}221\text{-}2}\right)\right]} \quad (9)$$

where:

| $U$ | $f\frac{U}{2\text{-}221\text{-}1}$ | $f\frac{U}{2\text{-}221\text{-}2}$ |
|---|---|---|
| 0 | 0.000 | 0.000 |
| 60 | .024 | .182 |
| 120 | .206 | .490 |
| 180 | .583 | .798 |
| 240 | 1.000 | 1.000 |

$V_T$=true velocity, and
$\sigma$=air density ratio.

*Mode of computer operation for single rotor simulation*

A description of a complete operating cycle of the entire system, during one computation cycle for the single rotor simulator, will now be described with the aid of the flow diagram of FIGURE 15. The flow diagram includes many subroutines which will be explained in conjunction with Boolean algebra equations.

The first operation during each computation cycle of the computer is to pulse the computer into activation with a cycle interrupt signal on lead 135. As indicated supra, the cycle interrupt signal deriving from timer 134 also generates a signal to reset the interface circuitry.

Once the cycle interrupt signal has started the computer, the computer determines whether the simulated helicopter is in a crash condition in accordance with the Boolean algebra equation, where + and · indicate OR and AND, respectively:

CRASH=$(\theta_f>K_1)$ (Tail Wheel Touchdown)
+$(|\varphi_f|<K_2)$ (Right Wheel Touchdown+Left Wheel Touchdown)+$(\dot{h}<K_4)$ Right Wheel Touchdown+Left Wheel Touchdown+Tail Wheel Touchdown)
+$(|U_G|>101$ ft./sec.)·(Any Wheel Touchdown)
+$(|V_G|>7.8$ ft./sec.)·(Any Wheel touchdown) (10)

Main computer 81 solves Equation 10 by comparing the values of fuselage pitch and roll angles, as well as fuselage rate of change of climb, $\theta_f$, $\varphi_f$ and $\dot{h}$, respectively, for the previous computation cycle, as stored in memory 254, with the values of constants $K_1$, $K_2$, $K_3$ and $K_4$ that are also stored in memory. Of course, the values of the constants K are preloaded into memory by the tape program and the values given are for the particular helicopter being simulated, namely the SH–3A. The computer breaks down the Boolean function into three separate parts, relating to attitude, rate of descent and ground lateral velocity, $V_g$, as well as ground longitudinal velocity, $U_g$.

To carry out these functions, the computer first determines if either or any of the left, right, or tail wheels is in a touchdown condition. Determination of any of the wheels being in a touchdown position is accomplished by feeding the binary signals indicative thereof from memory matrix 263 to the leastmost significant bit positions of A register 255 and binary zeros to each of the other bit locations in register 255. Z register 258 is loaded with binary zeros in each of its positions by a command signal from transfer bus 275.

Adder 257 then combines the contents of A register 255 with the contents of Z register 258 at each bit position thereof separately in accordance with the exclusive OR function. In consequence, if a binary one appears in any of the first three bits in register 255, adder 257 derives a binary one signal in that position. For each bit position the contents of Z register 258 and A register 255 are alike, adder 257 derives a binary zero. The twenty-three bit word deriving from adder 257 is supplied back to A register 255. If a binary one appears in none of the bit positions in A register 255, an indication is provided that a crash condition cannot exist and the computer proceeds to the next operation.

If, however, the register 255 has stored therein a binary one at any bit position a signal is coupled back to memory 263 via transfer bus 275 to jump into the crash determining subroutine.

In the subroutine, the first step is to determine if the absolute value of $U_g$, ground longitudinal velocity of the helicopter, is greater than a constant value, 101 feet per second for the SH–3A helicopter being specifically considered. The comparison is made by supplying A register 255 with the memory word indicative of the value of $U_g$ and the complement of the constant to Z register 258. The contents of A register 255 and Z register 258 are combined in adder 257, the most significant bit position output of which indicates whether the complementing operation resulted in a positive or negative result. If the complementing operation resulted in a negative result, a binary one is in the most significant bit position of adder 257 and is returned to the same location in A register 255. The most significant bit position of A register 255 is now examined and if it is a binary one, an indication is provided that the helicopter is in a crash condition. The binary one signal is coupled through transfer bus 275 to input-output channels 285 and a discrete output is derived on one of the six leads in bus 127. The signal on bus 127 is supplied to one of the indicator lamps 74 on the trainee's panel, as well as to a crash indicator in the instructor's panel.

If the most significant bit position in register 255 resulting from the comparison of $|U_g|$ being greater than a constant is a binary zero, the computer proceeds to the next operation, determining whether the absolute value of $V_g$, ground lateral velocity, is greater than a predetermined constant equal to 7.8 feet per second in the specific helicopter being simulated. If $|V_g|$ is greater than 7.8 feet per second, the computer activates the same lead in bus 127 as was activated for the comparison of $|U_g|$ being greater than 101 feet per second. The comparison is performed in precisely the same manner indicated supra for $U_g$.

If the computer determines that $|V_g|$ is less than 7.8 feet per second, it commences with the investigation to determine if the helicopter being simulated is at an abnormal attitude while one of the wheels is in a touchdown condition. It also proceeds to the investigation of abnormal attitude if a determination of a crash condition resulting from excessive ground longitudinal and lateral velocity occurs.

The first step in determining an abnormal attitude condition is to ascertain if $\theta_f$, fuselage pitch angle, is greater than a predetermined angle, 17° for the SH–3A helicopter being considered. The comparison is made in precisely the manner described supra, and if it results in a determination that $\theta_f$ is greater than 17°, a second lead in bus 127 is activated to apprise the trainee and instructor that the helicopter is in a crash condition as a result of abnormal attitude. If $\theta_f$ is less than 17°, the computer goes to the next step where it examines the memory locations wherein binary signals indicative of right and left wheel touchdown are stored. If either of the wheels is in a touchdown condition, the computer again determines if $\theta_f$ is greater than 17°. If $\theta_f$ is greater than 17° during this operation, the second lead in bus 127 is activated to indicate that the helicopter is in a crash condition due to abnormal attitude while it is on the ground.

If neither the right nor the left wheel being simulated is in a touchdown condition or if $\theta_f$ is less than 17° and one of these wheels is in a touchdown condition, the computer determines if a crash condition results because of excessive rate of descent with one of the three wheels on the ground. The excessive rate of descent ascertainment is made by comparing $\dot{h}$, rate of descent, with a constant value of −8.3 feet per second. If the helicopter being simulated is descending at a rate greater than 8.3 feet per second and one of the wheels thereof is on the ground, the most significant bit position in register 255 has a binary one value that is coupled to the third line in bus 127. The signal on the third lead of bus 127 activates a further visual indicator on the instructor's panel to provide an indication that the craft has crashed as a result of excessive rate of descent with one of the wheels in touchdown.

If the helicopter being simulated is in a crash condition due to any of the three factors mentioned, a binary one is stored in a particular location in memory 263 indicative of this fact. This address is sampled at a later time during the computation cycle and if a binary one signal is stored in the address, the computer operation is frozen and subsequent action on the part of the trainee has no effect on the computer and the signals it supplies to the monitoring and motion equipment. The instructor is apprised of the cause of the crash because one or more of his three crash indicating lamps is activated so that he can proceed with remedial action with regard to the trainee. If the helicopter is not in a crash condition, the computer proceeds to the next step in the program.

The next step in the program is to reset selectively the system to the initial condition of the helicopter on the ground if the instructor has supplied a reset signal to the computer via switch 67, FIGURE 6. The reset signal causes the memory addresses associated with: fuselage roll angle, $\varphi_F$; ground velocities in the longitudinal, lateral and vertical directions ($U_g$, $V_g$ and $W_g$, respectively); flap angle coefficients of the rotor $a_{0s}$, $a_{1s}$ and $b_{1s}$; rate of roll ($p$), rate of pitch ($q_1$), and rate of craft turning ($r$), all to be equal to zero. In addition, the system reset command causes: the pitch angle of the fuselage, $\theta_F$, to be set to a constant value of −0.0072°; the motion system for student station 50 to be returned to a neutral position, and the height of the cockpit above the field to be set to a predetermined constant value, which for the SH–3A is 5.7 feet. If switch 67 has not been activated, or has been reset, the program proceeds to the next program step, system freeze.

In the system freeze condition, the computer examines the flag derived during the crash subroutine and stored in memory 254 indicative of whether the helicopter crashed. If the memory indicates that a crash condition has occurred, or if the instructor has activated switch 66 to provide a discrete input to the computer to freeze the operation thereof, the freeze mode is entered. In the freeze mode, all computations remain at their last computed value, no data is supplied to the computer, but the computer continues to supply signals every 62.5 milliseconds to the various outputs. Hence, the instruments continue to read the values that they had at the time of a crash or at the time that the instructor decided that a conference with the trainee was in order. If the system is not being reset, or is not in a freeze condition, the computer initiates a normal computation cycle.

The first operation in a normal computation cycle is to supply the seven discrete inputs to predetermined locations in memory of main computer 81.

The first step in supplying the seven bit discrete input word to an address in memory 254 of main computer 81 is to determine if the flip-flops of input-output channels 283 are ready to receive data. If these flip-flops are not ready to receive data, they are reset by a control pulse derived from input-output transfer bus 284. Once the flip-flops in input-output channels 283 have been reset, the interface, FIGURE 8, is reset by supplying a control pulse from main computer 81 to cycle timer 134. The interface now gates the seven discrete input bits forming the discrete input word into a predetermined address in the main computer memory.

Upon completion of the discrete input bits being stored in memory, the thirteen Digiswitch input words are supplied to discrete locations in memory 254 of main computer 81, provided the memory does not contain the initial conditions. If initial conditions have already been established and the helicopter is being "flown" the Digiswitch information is not supplied to the computer, as indicated supra in conjunction with FIGURE 12, whereby computer cycle time is reduced.

If the instructor has energized the insert switch so that the initial conditions established by the Digiswitches are fed into the computer, the flip-flops of input-output channels 283 are reset to receive the Digiswitch data. Because the Digiswitch information is included in five separate words, five different addresses in memory 254 of main computer 81 are required for storage purposes. Gating the five words into memory is accomplished by setting index register 272 to the address five less than the address of the fifth Digiswitch word. Index register 272 thereby feeds the first Digiswitch word, indicative of barometric pressure, in binary coded decimal for hundredths, tenths, units and tens orders, to a predetermined memory location. Upon completion of the storage operation, index register 272 is advanced by a count of one so that the next Digiswitch word is stored at the following memory address. In the manner described, each of the four Digiswitch words is supplied to a different ascending memory address, differing by one. For example, memory address 23 stores the sixteen bits required to define, in binary coded decimal, barometric pressure in hundredths, tenths, units and tens; memory address 24 stores the binary coded decimal word to define field elevation in units, tens, hundredths and thousandths; memory word 25 stores, in binary coded form, the value of wind direction in units, tens and hundredths; and memory address 26 stores the binary coded decimal signals to define wind velocity in tens and hundredths of miles per hour.

After the Digiswitch data has been stored in the appropriate memory locations, or if the initial data inserting switch is off, the computer is now ready to begin accepting the binary signals indicative of the analog inputs. The first step in receiving the digital signals indicative of the values of the analog signals, is to load index register 272 with an address nine less than the address of the last analog signal. In consequence, the first analog input is supplied to a memory location in main computer 81 that is nine places removed from the address at which the last analog signal is stored. The analog input is supplied to the main computer and in accordance with signals stored therein by the initial program tape, is scaled, i.e., the binal point is appropriately inserted, after a determination that the input-output channels 283 are ready to receive the input.

After the analog signal has been supplied to the computer, the interface is reset and a determination as to whether index register 272 has returned to the zero state is made. If the index register is not back to zero, a one is added to the contents thereof and another analog word is supplied to the memory at the location indicated by memory register 265 minus the reading of index register 272. The operation continues until each of the nine analog inputs has been fed to a different address in memory 263, which addresses are displaced from each other by ascending values of one. Once index register 272 has returned to the zero value, whereby the analog word is supplied to memory 263 at the address indicated by memory register 264, the computer is ready to effect an inter-computer transfer.

In an inter-computer transfer, data may be transferred from main computer 81 to auxiliary computer 82, or the main computer can receive data from the auxiliary computer. The data transferred by the main computer to the auxiliary computer are: binary signals indicative of the analog inputs; Digiswitch inputs; miscellaneous data, and the seven discrete inputs. The data supplied to the main computer by the auxiliary computer are: binary signals indicative of the analog outputs; data required by computations of the main computer, and discrete outputs. The signals transferred between the computers and the direction of transfer are indicated by Table I:

TABLE I.—INPUTS FROM AUXILIARY COMPUTER

*Analog outputs*

Instructor's Indicated Airspeed
Pilot's Indicated Airspeed
Rate of Climb
Turn Indicator
Slip Indicator
Fuselage Pitch Angle
Fuselage Roll Angle
Motion System Pitch Channel
Motion System Roll Channel
Motion System Heave Channel
Dynamic Pressure
Sin (2π* HB BAR)
Cos (2π* HP BAR)
Outside Air Temperature

*Data from auxiliary computer*

Longitudinal Pitch Control Position
Lateral Pitch Control Position
Collective Pitch Control Position
Directional Control Pedal Position
Height Above Sea Level
Dynamic Pressure on X Axis
Height Above Field
Rolling Rate
Pitching Rate
Longitudinal Speed Along X Axis
Lateral Velocity
Vertical Velocity
Roll Angle of Fuselage
Pitch Angle of Fuselage
Absolute Lateral Velocity (V)
Absolute Longitudinal Velocity (U)
Rate of Climb
Turning Rate
Indicated Airspeed
Ball Angle
Ground Speed in X Body Axis Direction (change)
Lateral Ground Velocity (change)
Vertical Ground Velocity (change)
Ground Speed in X Body Axis Direction
Lateral Ground Velocity
Cos Heading Angle
Sin Heading Angle
Effective Position of Cyclic Pitch Control Fore and Aft
Effective Position of Cyclic Pitch Control Laterally
Effective Position of Collective Pitch Control
Effective Position of Directional Control Pedals
Torque of Tail Rotor
Pressure Ratio
Square Root of Temperature Ratio
Temperature Ratio
Pressure Altitude
Air Density Average Induced Velocity of Rotor
True Velocity
Rotor Speed
Environment, Temperature
Longitudinal Force of Aircraft Axis
Lateral Force of Aircraft Axis
Aircraft Axis Rolling Moment
Pitching Moment About the Plane Y Axis
Turning Moment About Z Axis
Left and Right Landing Gear Force
Force of the Tail Wheel

*Discrete outputs from auxiliary*

Discrete Output Bits 1–7

OUTPUT DATA TO AUXILIARY COMPUTER

*Analog inputs*

Speed
Free Air Temperature
Rudder Pedal Position
Collective Stick Position
Lateral Cyclic Stick Position
Fore and Aft Cyclic Stick Position

*Digiswitch inputs—Miscellaneous data*

Engine 1 Torque
Engine 2 Torque
System Reset Flag
Flag to Reset Digiswitch No. 1 Input

*Discrete inputs*

Transferring data between main computer 81 and auxiliary computer 82 and vice versa is performed in the manner described, supra, during the interface discussion. The computers transfer the specified data under the control of index registers 272. The data to be transferred is located in successive memory addresses so that loading the index registers with the number of transfers to be effected in each direction controls read out of the word in memories 254. For example, index registers 272 in each of computers 81 and 82 is set to a count of −73 when data is transferred from the auxiliary to the main computer. Memory address register 264 in auxiliary computer 82 indicates the address of the memory in the auxiliary computer of the last word to be transferred to the main computer. In contrast, address register 264 of main computer 81 has stored therein the address at which the last word received by it from auxiliary computer 82 is to be stored. As the transfer operation is being performed, each of the index registers 272 in the main and auxiliary computers is advanced by a count of one upon each transfer operation. Hence, successive memory addresses in auxiliary computer 82 are transferred to successive, but different, addresses in main computer 81.

After all of the data has been transferred from auxiliary computer 82 to main computer 81 and vice versa, as required for a particular computation cycle, the computer is ready to commence calculating the moments and forces due to the aerodynamic effects of the rotor. In the computations which describe the forces and moments developed by the main rotor, it is assumed that: (1) the motion of a rotor blade relative to the space in which it rotates may be represented by the motion of the blade at fixed points in the course of its revolution; and (2) the span lengthwise distribution of lift along a blade at a given azimuth position can be represented by allowing the magnitude of lift at given radial points to represent the lift for some fixed increment, i.e., the distribution of lift along a portion of a blade can be represented by finding the lift at a predetermined point along that portion.

Utilizing these assumptions, a number of azimuth stations is chosen, with a plurality of discrete radial stations along each azimuth, as indicated by FIGURE 5. In FIGURE 5, it will be recalled that four azimuth stations, equally spaced at 90° about the rotor hub, and three radial stations at each azimuth position, are provided, totaling twelve stations altogether. For the single rotor helicopter being considered, the radial or $y$ stations are designated as: $y_1=9.9$ feet, $y_2=21.8$ feet, and $y_3=28.1$ feet, while the azimuth or psi stations are located at $\psi_1=0$, $\psi_2=90°$, $\psi_3=180°$ and $\psi_4=270°$.

Various rotor parameters are computed at each azimuth station or at each blade element station. A blade element station is indicated as $\psi$—$y$, generally as a subscript. In an equation containing $y$, cosine $\psi$ and/or sine $\psi$, the equation must be computed as many times as necessary to include all required combinations. Thus, an equation will be utilized three times for a variable of $y$ alone; four times for sine $\psi$ and/or cosine $\psi$ alone, and twelve times if both $y$ and sine $\psi$ and/or cosine $\psi$ are included. In many of the equations, the factor $e+y$ appears, which indicates the hub radial distance plus the distance from the flap hinge to the center of the shaft turning the rotor.

Because the azimuth angles at which the blade stations are located are equally displaced from each other, and four azimuth stations are employed, the computations involving sine $\psi$ and cosine $\psi$ are greatly simplified and involve any values of 0, +1 and −1. These values are preprogrammed into the computer memory by the tape. In addition, the memory stores the values of $y$, $e+y$ (for each of the three radial locations), blade angle twist at each of the radial locations, $\theta_{1y}$, and the inflow distribution factor at each of the three radial positions, $W_{1y}+W_{imean}$.

The first factors computed in determining the aerodynamic effects of the rotor are the swash plate angles, $A_{0s}$, $A_{1s}$ and $B_{1s}$, indicative of collective swash plate angle, lateral swash plate angle and longitudinal swash plate angle, respectively, see FIGURES 3 and 4. The values of the swash plate angles are computed in response to the effective control positions at student station 50 of: collective pitch stick 51, cyclic pitch stick 53 in the fore and aft directions, and cyclic pitch stick 53 in the lateral direction ($\delta_{\theta ce}$, $\delta_{\theta Fe}$, and $\delta_{\theta Le}$). The equations for computing the swash plate angles are:

$$A_{0s}=.588\delta_{\theta_{ce}}+.126 \qquad (11)$$

$$A_{1s}=.507\delta_{\theta_{Le}}-.057\delta_{\theta_{ce}}+.184\delta_{\theta_{Fe}}$$

$$B_{1s}=.127\delta_{\theta_{Le}}-.014\delta_{\theta_{ce}}-.738\delta_{\theta_{Fe}}$$

Once the values of $A_{0s}$, $A_{1s}$ and $B_{1s}$ have been ascertained and stored in appropriate addresses of memory 254, the computer is advanced to the next step wherein the values of $\beta_\psi$, and $\dot{\beta}_\psi$, the blade flap angle and blade flap velocity at each of the four azimuth positions are computed. From the flapping coefficients, $a_{0s}$ (rotor coning angle), $a_{1s}$ (rotor longitudinal cyclic flapping coefficient), and $b_{1s}$ (lateral cyclic flapping coefficient), computed during the preceding computation cycle, the values of $\beta_\psi$ at each station are determined in accordance with:

$$\beta_0=a_{0s}-a_{1s}\cos\psi-b_{1s}\sin\psi \qquad (12)$$

Because of the 90° displacement between the four azimuth stations, Equation 12 is simplified to be:

$$\beta_0=a_{0s}-a_{1s}.\ \beta_{90°}=a_{0s}-b_{1s} \qquad (13)$$

$$\beta_{180°}=a_{0s}+a_{1s};\ \beta_{270°}=a_{0s}+b_{1s}$$

at the four azimuth stations, $\psi=0$, $\psi=90°$, $\psi=180°$ and $\psi=270°$. Main computer 81 determines the four values of $\beta_\psi$, and stores them in memory 254. After the value of $\beta_\psi$ has been calculated, $\dot{\beta}_\psi$ is determined in accordance with:

$$\dot{\beta}_\psi=\Omega(a_{1s}\sin\psi-b_{1s}\cos\psi) \qquad (14)$$

Equation 14 is simplified to:

$$\dot{\beta}_{0°}=\Omega b_{1s};\ \dot{\beta}_{90°}=\Omega a_{1s};\ \dot{\beta}_{180°}=-\dot{\beta}_{0°} \qquad (15)$$

$$\dot{\beta}_{270°}=-\dot{\beta}_{90°}$$

After the value of $\dot{\beta}_\psi$ for 0° has been calculated, it is supplied to two different locations in memory. Hereafter, the azimuth indications are indicated solely by the numerical value of the angle and the degree symbol is excluded; e.g., $\dot{\beta}_{0^\circ}$ is hereafter written as $\dot{\beta}_0$. In one memory location, the most significant bit indicates the computed polarity of $\dot{\beta}_0$, while in the other memory location the most significant bit has a sign opposite to that computed for the polarity of $\dot{\beta}_0$. Hence the value stored in the other memory location is indicative of $\dot{\beta}_{180}$. In the same manner, the value of $\dot{\beta}_{270}$ is calculated in response to $\dot{\beta}_{90}$.

Upon completion of the computation and storage of the values of $\dot{\beta}_\psi$ in each of the four azimuth positions, the computer program is stepped to ascertain the value of the blade tangential velocity at each of the twelve blade stations, $U_{T_{\psi-y}}$. The value of the tangential velocity at each of the twelve stations is computed in response to the velocities of the fuselage in the X and Y coordinate directions, U and V, as well as the rotor rotational velocity, $\Omega$, as:

$$U_{T_{\psi-y}}=(e+y)\Omega+V\cos\Psi+U\sin\Psi \quad (16)$$

Equation 16 can be simplified into a set of twelve equations, one for each rotor station, in a manner similar to that by which Equations 12 and 14 were simplified to provide Equations 13 and 15. The solution of the twelve equations defining $U_{T_{\psi-y}}$ is simplified by computing the values of tangential velocity at each of the four azimuth positions for each radial location simultaneously. This approach is utilized because the product $(e+y)\Omega$ is the same at each of the four azimuth stations on the same radius. Once of the value of $(e+y)\Omega$ has been computed it is merely necessary to add or subtract the values of V or U to determine the value of $U_{T_{\psi-y}}$.

After the values of $U_{T_{\psi-y}}$ are computed, the program advances to the next step where the computed value of the fuselage roll angle, $\varphi_F$, that was determined by auxiliary computer 82 during the preceding computation cycle and transferred to a specific location in the memory 254 of main computer 81, is read out. The value of the fuselage roll angle signal, $\varphi_F$, is supplied to digital-to-analog converter 123, in the manner indicated supra, where it is converted into an analog signal that is coupled to the roll indicator on the student's panel, FIGURE 7. After the value of $\varphi_F$ has been supplied to the appropriate sample and hold amplifier in network 125, main computer 81 is ready to supply binary signals indicative of cos $2\pi h\overline{p}$ and sin $2\pi h\overline{p}$ to digital-to-analog converter 123. The magnitudes of cos $2\pi h\overline{p}$ and sin $2\pi h\overline{p}$ are utilized to control the position of the indicator needle for the altimeter of the trainee's instruction panel. The altitude information, cos $2\pi h\overline{p}$ and sin $2\pi h\overline{p}$, was computed by auxiliary computer 82 during the preceding cycle and was transferred to the memory of main computer 81 during the inter-computer transfer operation.

After the fuselage roll angle and altitude information have been fed from computer 81 to converter 123, the program loads index register 272 with a $-3$. The index register setting of $-3$ enables the common portions of the equations involving the vertical component of blade velocity at each of the twelve stations, $U_{P_{\psi-y}}$, to be computed simultaneously and stored in temporary locations in memory 254. The equation for solving $U_{P_{\psi-y}}$ is:

$$U_{P_{\psi-y}}=W-W_{i\psi-y}-y\dot{\beta}_\psi+(e+y)(q_1\cos\Psi+p\sin\Psi)-\beta_\psi(U\cos\psi-V\sin\psi) \quad (17)$$

Equation 17 is solved in response to the input quantities: $\beta_\psi$ and $\dot{\beta}_\psi$, flap angle and rate of change of flap angle; U, V and W, the fuselage velocities in the X, Y and Z fuselage axes; $p$ and $q_1$, the rate of roll and pitch of the fuselage; and $W_{i_{\psi-y}}$, the air flow velocity at each of the twelve stations. Once the values of $U_{Py-0^\circ}$ have been computed, index register 272 is stepped to a value of $-2$ and the computation is repeated for $\psi=90°$, to determine the three values of $U_{Py-90^\circ}$. In the manner described, the computations are repeated for $\psi=180°$ and $\psi=270°$. Upon completion of the computation for $U_P$ for $\psi=270°$, the index register is back to a zero state and the program continues.

The computer 81 program is now advanced so that pitch angle at each of the twelve blade element stations, $\theta_{\psi-y}$, is computer. Each of the twelve values of $\theta_{\psi-y}$ is calculated in response to the stored values of the swash plate angles, $A_{0s}$, $A_{1s}$ and $B_{1s}$, as well as the three values of blade twist, $\theta_{1y}$, and the zero and unit representations of cos $\psi$ and sin $\psi$. $\theta_{\psi-y}$ is thus determined as:

$$\theta_{\psi-y}=A_{0s}-A_{1s}\cos\psi-B_{1s}\sin\psi-\theta_{1y} \quad (18)$$

As each of the twelve values of $\theta_{\psi-y}$ is computed, the value is transferred from A register 255 to a designated memory location. After the last value of $\theta_{\psi-y}$ has been calculated and stored, the computer program advances to the next series of computation.

The next operation in the computer program is to load index register 272 with a value of $-12$. With index register 272 so loaded, the computer is ready to initiate computation of: (1) the angle of air inflow at each of the twelve blade element locations, $\varphi_{\psi-y}$; (2) blade azimuth and spanwise distribution of angle of attack at the twelve blade locations, $\alpha_{\psi-y}$; (3) the blade coefficient of lift at each of the twelve stations, $C_{L_{\psi-y}}$; and (4) the blade coefficient of drag at the twelve stations, $C_{D_{\psi-y}}$. The computer solves the equations for these four parameters in sequence for each of the twelve blade stations, i.e., the values of $$\varphi_{0^\circ-y_1},\ \alpha_{0^\circ-y_1},\ C_{L_{0^\circ-y_1}},\text{ and } C_{D_{0^\circ-y_1}}$$

are computed in sequence and $\varphi_{0^\circ-y_2}$ is computed after $$C_{D_{0^\circ-y_1}}$$

Upon the completion of the coefficient of drag computation at a particular station, index register 272 is stepped to a lower negative number and computation of $\varphi_{\psi-y}$ for the succeeding azimuth and radial station proceeds. The operation continues for each of the twelve stations in sequence until index register 272 is returned to the zero state.

The parameters, $\varphi_{\psi-y}$, $\alpha_{\psi-y}$, $C_{L\psi-y}$, and $C_{D_{\psi-y}}$, are computed in a single loop in succession because the values computed for one variable are utilized in computing the next, as an inspection of the equations reveals. The angle at which air flows into the blade at each station, $\varphi_{\psi-y}$, is computed in accordance with:

$$\varphi_{\psi-y}=\frac{U_{P_{\psi-y}}}{U_{T_{\psi-y}}} \quad (19)$$

The inputs for the solution of $\varphi_{\psi-y}$ are derived from the stored values of $U_{P_{\psi-y}}$ and $U_{T_{\psi-y}}$, the vertical and tangential velocities of the blade at each of the twelve stations, previously computed during the computation cycle being presently considered.

Once the air inflow angle at a particular one of the twelve blade stations has been computed, the computer program, under the control of counter 265, is stepped to the solution of the blade angle of attack, $\alpha_{\psi-y}$, at the same blade station as the computation just terminated for $\varphi_{\psi-y}$. The angle of attack quantity is computed by retrieving the value of pitch angle for the station being considered, $\theta_{\psi-y}$, from memory and combining it with the value of $\varphi_{\psi-y}$ located in A register 255 in accordance with:

$$\alpha_{\psi-y}=\theta_{\psi-y}+\varphi_{\psi-y} \quad (20)$$

The resultant summation is returned to memory matrix 263 and also is stored in A register 255.

The computer now proceeds to calculate coefficient of lift at each of the twelve stations, $C_{L_{\psi-y}}$, in accordance with:

$$C_{L_{\psi-y}}=7.6209\ \alpha_{\psi-y},\ \text{if}\ |\alpha_{\psi-y}|\leq .12570679\ (a)$$

$$C_{L_{\psi-y}}=(3.81045|\alpha_{\psi-y}|+.479)\frac{\alpha_{\psi-y}}{|\alpha_{\psi-y}|},\ \text{if}\ .12570679<|\alpha_{\psi-y}|.23383\ (b)$$

$$C_{L_{\psi-y}}=1.37\frac{\alpha_{\psi-y}}{|\alpha_{\psi-y}|},\ \text{if}\ |\alpha_{\psi-y}|\geq .23383\ (c) \qquad (21)$$

Equation 21 includes two break points, at values of $\alpha_{\psi-y}=0.12570679$ and $\alpha_{\psi-y}=0.123383$. The computer first determines if the value of $\alpha_{\psi-y}$ stored in A register 255 is less than the value of the first break point. If so, Equation 21(*a*) is utilized to compute the coefficient of lift at the particular blade station being considered. If, however, the value of $\alpha_{\psi-y}$ is greater than the first break point the computer determines if it is greater than the second break point. If it is less than the second break point, the value of coefficient of lift for the particular blade station being considered is computed in accordance with Equation 21(*b*). If it is found that the value of $\alpha_{\psi-y}$ is greater than the value of the second break point, the computer determines the value of $C_{L_{\psi-y}}$ in accordance with Equation 21(*c*).

The computer program now steps to consider the solution of the coefficient of drag at a particular blade station, $C_{D_{\psi-y}}$. The coefficient of drag is computed in accordance with:

When $$|\alpha_{\psi-y}|<f\frac{U_{T_{\psi-y}}}{2\text{-}143\text{-}1}$$

$$C_{D_{\psi-y}}=f\frac{U_{T_{\psi-y}}}{2\text{-}143\text{-}2}+f\frac{U_{T_{\psi-y}}}{2\text{-}143\text{-}3}|\alpha_{\psi-y}| \qquad (22a)$$

or .01, whichever is greater.

When $$|\alpha_{\psi-y}|\geq f\frac{U_{T_{\psi-y}}}{2\text{-}143\text{-}1}$$

$$C_{D_{\psi-y}}=f\frac{U_{T_{\psi-y}}}{2\text{-}143\text{-}4}+f\frac{U_{T_{\psi-y}}}{2\text{-}143\text{-}5}|\alpha_{\psi-y}| \qquad (22b)$$

or .36, whichever is smaller.

$$C_{D_{\psi-y}}\leq .36$$

The functions of $U_{T_{\psi-y}}$ which are used in the $C_{D_{\psi-y}}$ computations of Equations 22*a* and 22*b* are:

| $U_{T_{\psi-y}}$ | $f\frac{U_{T_{\psi-y}}}{2\text{-}143\text{-}1}$ | $U_{T_{\psi-y}}$ | $f\frac{U_{T_{\psi-y}}}{2\text{-}143\text{-}2}$ | $U_{T_{\psi-y}}$ | $f\frac{U_{T_{\psi-y}}}{2\text{-}143\text{-}4}$ | $U_{T_{\psi-y}}$ | $f\frac{U_{T_{\psi-y}}}{2\text{-}143\text{-}5}$ | $U_{T_{\psi-y}}$ | $f\frac{U_{T_{\psi-y}}}{2\text{-}143\text{-}3}$ |
|---|---|---|---|---|---|---|---|---|---|
| 0 | .2391 | 0 | −.134 | 0 | −.390 | 0 | 1.6789 | 0 | .5615 |
| 335 | .2426 | 480 | −.039 | 335 | −.500 | 335 | 2.2462 | 450 | .4011 |
| 450 | .1815 | 680 | −.062 | 490 | −.255 | 575 | 1.5872 | 780 | .8595 |
| 555 | .1544 | 900 | .019 | 920 | 0.0 | 780 | 1.4497 | 1,000 | 0.0 |
| 670 | .1187 | 1,023.9 | .019 | 1,023.9 | 0.0 | 1,000 | 1.0772 | 1,023.9 | 0.0 |
| 780 | .1012 | | | | | 1,023.9 | 1.0772 | | |
| 900 | .0349 | | | | | | | | |
| 1,023.9 | .0349 | | | | | | | | |

Because of the complexity of Equation 22, which includes five distinct functions of blade tangential velocity, $U_{T_{\psi-y}}$, each of which includes several break points, index register 272 is set to a value of −13 at the start of the computation. In consequence, the values stored in index register 272, indicative of the blade station being considered, are coupled to a temporary location in memory 254 prior to loading the −13 value in the register. In addition, the value of tangential velocity, $U_{T_{\psi-y}}$, at the blade station being considered is supplied to a temporary location in the memory, from the permanent location thereof, because of the frequency with which it is utilized in determining coefficient of drag. A register 255 is loaded with the value of $U_{T\ -y}$ from memory 263 for the blade azimuth and radial station being considered.

The number loaded into A register 255, indicative of $U_{T\psi-y}$, is computed as a function of $$f\frac{U_{T_{\psi-y}}}{2\text{-}143\text{-}1}$$

from the first function table of Equation 22 and utilizing linear interpolation as described supra. If it is found that $$f\frac{U_{T_{\psi-y}}}{2\text{-}143\text{-}1}$$

is greater than the absolute value of the previously computed value of $\alpha_{\psi-y}$ for the station under consideration, Equation 22*a* is solved and a determination of whether the computed value from Equation 22*a* is greater than 0.01 is made. The greater of the value from Equation 22*a* and 0.01 is stored in memory as the value of $C_{D\psi-y}$, and the program returns the temporarily stored value of the blade station being considered from memory 254 back to index register 272. If, however, the absolute value of $\alpha_{\psi-y}$ is greater than or equal to $$f\frac{U_{T_{\psi-y}}}{2\text{-}143\text{-}1}$$

$C_{D\psi-y}$ is computed in accordance with Equation 22*b*. After calculation of $C_{D\psi-y}$ in accordance with either Equation 22*a* or 22*b*, the program retrieves the temporary memory index indication and stores the computed value of $C_{D\psi-y}$ loaded in A register 255. Index register 272 is then examined to determine if the computation of $\varphi_{D\psi-y}$ for another blade station should be made or if all calculations involving $\varphi_{\psi-y}$, $\alpha_{\psi-y}$, $C_{L\psi-y}$, and $C_{D\psi-y}$, have been performed.

If index register 272 indicates that all four of these parameters at each blade station have been calculated, it is reloaded with a count of −4. After loading index register 272 with a count of −4, the quantities of $U^2_{T\psi-y}$ are calculated for each of the twelve blade positions and stored in temporary memory locations different from the locations where $C_{L\psi-y}$, $C_{D\psi-y}$, $U_{T\psi-y}$ are stored. These values, as stored in the temporary addresses of memory 254, are utilized in all of the equations involving azimuth blade parameters: lift at each of the four azimuth positions, $L_\psi$; flapping moment at each of the four azimuth positions, $M_{\beta\psi}$; rotor torque at each of the four azimuth positions, $Q_\psi$; and drag at each of the four azimuth stations, $D_\psi$. The computer now sequentially solves each of the equations for the four parameters at one of the four azimuth stations, then goes on to solve the equations at a second azimuth station, etc.

After the solution of drag at a particular azimuth station has been computed, index register 272 is advanced by a count of one and the computer again determines the values of the blade parameters, but this time at a different azimuth position. The cycle continues until each of the four azimuth position blade parameters has been solved, at which time index register 272 is returned to a zero count.

The equations for solving the blade parameters at the four azimuth stations are:

$$L_{\psi}=\rho\left[7.733 U_{T}^{2} C_{L}|_{(\psi-y_1)}+8.395 U_{T}^{2} C_{L}|_{(\psi-y_2)}+1.969 U_{T}^{2} C_{L}|_{(\psi-y_3)}\right] \quad (23)$$

$$M_{\beta_{\psi}}=\rho\left[78.88 U_{T}^{2} C_{L}|_{(\psi-y_1)}+176.9 U_{T}^{2} C_{L}|_{(\psi-y_2)}+56.50 U_{T}^{2} C_{L}|_{(\psi-y)}\right] \quad (24)$$

$$Q_{\psi}=\rho\left[78.54 U_{T} U_{P} C_{L}|_{\psi-y_1}-73.02 U_{T}^{2} C_{D}|_{\psi-y_1}+190.0 U_{T} U_{P} C_{L}|_{\psi-y_2}-180.3 U_{T}^{2} C_{D}|_{\psi-y_2}+60.42 U_{T} U_{P} C_{L}|_{\psi-y_3}-106.2 U_{T}^{2} C_{D}|_{\psi-y_3}\right] \quad (25)$$

$$D_{\psi}=\rho\left[6.435 U_{T}^{2} C_{D}|_{\psi-y_1}-6.872 U_{T} U_{P} C_{L}|_{\psi-y_1}+9.340 U_{T}^{2} C_{D}|_{\psi-y_2}-8.741 U_{T} U_{P} C_{L}|_{\psi-y_2}+3.380 U_{T}^{2} C_{D}|_{\psi-y_3}-2.046 U_{T} U_{P} U_{L}|_{\psi-y_3}\right] \quad (26)$$

It is noted that each of the Equations 23–26 for blade parameters at the four azimuth stations involves the sum of a plurality of products. Each product is designated as, for example:

$$AB|_{\psi-y_1} \quad (27)$$

In Equation 27, the vertical line indicates that both factors A and B are considered at radial position $y_1$ and at the azimuth station being considered in the computation. In particular, if $\psi=0°$, the values of A and B are values computed for A and B at the station having an azimuth of 0° and a radial location of $y_1$. Throughout the remainder of the disclosure the inclusion of a vertical line followed by a $\psi-y$ subscript indicates that each of the factors is being considered at a particular blade location.

Once rotor drag, $D_{\psi-y}$, has been computed for the last azimuth location, the program advances to the step wherein main rotor lift, $L_{MR}$, is computed. The total lift of the main rotor of a single helicopter, $L_{MR}$, is computed from the sum of the individual azimuth station lifts, multiplied by the ratio of the number of blades comprising the rotor with the number of azimuth stations, in the presently considered example the ratio is 1.25. The ratio is multiplied by a function involving height of the craft above the ground, craft velocity in the vertical direction, and true velocity of the craft, respectively H, W and $V_T$. The equation for computing the total lift of the main rotor is:

$$L_{MR}=\frac{5}{4}[L_0+L_{90}+L_{180}+L_{270}]\left[1+.665 f\frac{H}{2\text{-}139\text{-}1}\cdot f\frac{H}{2\text{-}139\text{-}2}\right] f\frac{W}{2\text{-}139\text{-}3} \quad (28)$$

| $H$ | $f\frac{H}{2\text{-}139\text{-}1}$ | $V_t$ | $f\frac{V_t}{2\text{-}139\text{-}2}$ | $W$ | $f\frac{W}{2\text{-}139\text{-}3}$ |
|---|---|---|---|---|---|
| 1 | 1.000 | 0 | 1.0 | −20 | 1.0 |
| 5 | .782 | 33 | .4 | 20 | 1.0 |
| 17 | .301 | 100 | 0 | 50 | .65 |
| 30 | .060 | 288 | 0 | 200 | .65 |
| 45 | .000 | | | | |

In solving Equation 28, the functions $$f\frac{H}{2\text{-}139\text{-}2},\ f\frac{V_T}{2\text{-}139\text{-}2}$$

and $$f\frac{W}{2\text{-}139\text{-}2}$$

are first determined and stored. After each of the three functions has been determined, an appropriate scale factor is applied thereto. After determining the value of $$f\frac{H}{2\text{-}139\text{-}2}$$

the computer feeds the signal indicative of the location of pitch motor 73 to digital-to-analog converter 123. Once the main rotor lift has been computed and stored in temporary memory, the computer derives the output signal for controlling movement of motor 71, that provides simulated roll motion to the student station 50.

Following computation of main rotor lift $L_{MR}$, the program steps to the next operation, determining the torque of the main rotor, $Q_{MR}$. Main rotor torque is derived by summing the torques at the individual azimuth stations, $Q_{\psi}$, and multiplying the resultant sum by the ratio of the number of blades to the number of azimuth stations (1.25), in accordance with:

$$Q_{MR}=\frac{5}{4}(Q_{0°}+Q_{90°}+Q_{180°}+Q_{270°}) \quad (29)$$

The computer is now advanced to solve the equation for the velocity of the air flowing through each of the twelve blade element locations, $W_{i\psi-y}$. To solve the equation for $W_{i\psi-y}$, the fuselage velocities in the X and Y coordinate directions, U and V, respectively, and the mean or average velocity over the entire rotor, i.e., rotor disk, $W_{i_{mean}}$, are supplied from the memory to the arithmetic unit. The inflow velocity at each of the twelve blade element locations is computed in accordance with:

$$W_{i_{\psi-y}}=W_{i_{mean}}\left(\frac{W_{i_y}}{W_{i_{mean}}}\right)\left(1+\frac{yU}{5300}\cos\psi-\frac{yV}{5300}\sin\psi\right) \quad (30)$$

| $y$ | $\frac{W_{i_y}}{W_{i_{mean}}}$ |
|---|---|
| $y_1$ | .671 |
| $y_2$ | 1.330 |
| $y_3$ | .880 |

After the values of $W_{i\psi-y}$ have been computed, the program is advanced to the next step wherein the force along the longitudinal axis of the helicopter due to the main rotor is computed.

The force along the X axis due to the main rotor, $F_{XR}$, is computed as a function of flap angle, $\beta_{\psi}$; lift, $L_{\psi}$, and drag, $D_{\psi}$, and the ratio of the number of blades to the number of azimuth stations, 1.25. The value for the force in the X direction due to the main rotor is expressed as:

$$F_{XR}=\frac{5}{4}\sum_{\psi}(\beta_{\psi}L_{\psi}\cos\psi-D_{\psi}\sin\psi) \quad (31)$$

which can be simplified with the twelve station rotor simulation to:

$$F_{XR}=\frac{5}{4}(\beta_0 L_0-D_{90}-\beta_{180}L_{180}+D_{270}) \quad (32)$$

After $F_{XR}$ has been computed, the program advances the computer so that the force, $F_{YR}$, due to the main rotor in the Y direction, i.e., transverse to the longitudinal axis and along the horizontal approximately, is computed as a function of flap angle, $\beta_{\psi}$, lift, $L_{\psi}$; drag, $D_{\psi}$, and the ratio of number of blades to the number of azimuth stations, 1.25. The general expression for computation of the force in the Y direction due to the main rotor is:

$$F_{YR}=\frac{5}{4}\sum_{\psi}(-D_{\psi}\cos\psi-\beta_{\psi}L_{\psi}\sin\psi) \quad (33)$$

which simplifies to:

$$F_{YR}=\frac{5}{4}(-D_0-\beta_{90}L_{90}+D_{180}+\beta_{270}L_{270}) \quad (34)$$

Because of the relative simplicity of Equations 32 and 34, they are employed for computing the values of $F_{XR}$ and $F_{YR}$.

Rotor rolling moment, $7_{MR}$, and the pitching moment caused by the main rotor, $M_R$, are next computed in succession in response to the force due to the main rotor in the X and Y directions, $F_{XR}$ and $F_{YR}$ and main rotor lift, $L_{MR}$, as:

$$7_{MR}=7.85F_{YR} \quad (35)$$

$$M_R=-7.85F_{XR}-.073L_{MR} \quad (36)$$

After the moment due to the main rotor has been computed, the next step in the program is to supply digital-to-analog converter 123 with a signal indicative of the position of heave motor 72 which translates student station 50 in the vertical direction.

The next computer operation is to determine the rotor flap angle coefficients: coning angle, $a_{0s}$; longitudinal cyclic flapping, $a_{1s}$; lateral cyclic flapping, $b_{1s}$; as well as the derivatives of the longitudinal and lateral cyclic flapping coefficients, $\dot{a}_{1s}$ and $\dot{b}_{1s}$, respectively. The flap angle coefficients are computed from the azimuth flapping moments, $M_{\beta_{\psi}}$, at the four azimuth stations, and the fuselage roll and pitch rates, $p$ and $q_1$, respectively. The $a_{1s}$ and $b_{1s}$ coefficients are obtained by integration of $\dot{a}_{1s}$ and $\dot{b}_{1s}$, using the $0_{33}$ Mod Gurk integration routine mentioned supra. The equations for determining the flap angles and the rate of changes of the longitudinal and lateral cyclic flapping coefficients are:

$$a_{os}=\frac{\sum_{\psi} M_{\beta_{\psi}}}{3,179,728}$$

$$\dot{a}_{1s}=\frac{\sum_{\psi} M_{\beta_{\psi}}\sin\psi}{312,500}+.264844b_{1s}-.494063q_1$$

$$a_{1s}=\int\dot{a}_{1s}dt$$

$$\dot{b}_{1s}=\frac{\sum_{\psi} M_{\beta_{\psi}}\cos\psi}{312,500}.264844a_{1s}-.494063p$$

$$b_{1s}\int\dot{b}_{1s}dt \quad (37)$$

In Equation 37, the symbol $\sum_{\psi}$ indicates that the particular quantity being considered is summed for each of the four azimuth stations, so that:

$$\sum_{\psi}M_{\beta_{\psi}}=M_{\beta_0}+M_{\beta_{90}}+M_{\beta_{180}}+M_{\beta_{270}} \quad (38)$$

The $a_{0s}$, $\dot{a}_{1s}$ and $\dot{b}_{1s}$ portions of Equation 37 are reformulated as:

$$a_{os}=\frac{M_{\beta_1}+M_{\beta_2}+M_{\beta_3}+M_{\beta_4}}{3,178,728}$$

$$\dot{a}_{1s}=\frac{M_{\beta_2}-M_{\beta_4}}{312,500}+.264844b_{1s}-.494063q_1$$

$$\dot{b}_{1b}=\frac{M_{\beta_3}-M_{\beta_1}}{312,500}-.264844a_{1s}-494063p \quad (39)$$

by making the appropriate substitutions for the values of $\sin\psi$ and $\cos\psi$.

After completing the calculation of the flap angle coefficients, the computer program advances to compute successively the moments due to main rotor hub rolling and pitching, $7_{RH}$ and $M_{RH}$, respectively. The moment imparted to the craft by the main rotor hub rolling is:

$$7_{RH}=-1.315\sum_{\psi}L_{\psi}\cos\psi+230\Omega^2b_{1s} \quad (40)$$

while the moment due to pitching of the main rotor hub is:

$$M_{RH}=-1.315\sum_{\psi}L_{\psi}\cos\psi+430\Omega^2a_{1s} \quad (41)$$

The main rotor hub rolling and pitching moments are computed in response to the stored values of ligt, $L_{\psi}$, at each rotor azimuth position and rotor velocity, $\Omega$.

All of the calculations for the main rotor have now been completed for the computation cycle being considered. These calculations are transferred to auxiliary computer 82, and stored in appropriate memory locations thereof. Transferring the data between main computer 81 and auxiliary computer 82 is via the inter-computer transfer routine discussed supra. Specifically, the parameters transferred from main computer 81 to auxiliary computer 82 are:

X force due to main rotor, $F_{XR}$;
Y force due to main rotor, $F_{YR}$;
Pitching moment of main rotor hub, $M_{RH}$;
Rotor hub rolling moment, $L_{RH}$;
Main rotor pitching moment, $M_R$;
Main rotor rolling moment, $L_R$;
Lift of the main rotor, $L_{MR}$; and
Torque of the main rotor, $Q_{MR}$.

Following the inter-computer transfer operation a signal is derived for activating the pitch indicator on the trainee's panel, FIGURE 7. This operation is performed by supplying the word in the memory address associated with pitch angle of the fuselage, $\theta_F$, to digital-to-analog converter 123.

Since no further integration subroutines are utilized in the main computer during the cycle being considered, the integration coefficients of the $0_{33}$ Mod Gurk subroutine are now updated. Hence, the integration coefficients associated with a particular value during the cycle being considered are transferred to a new location in memory so that these same coefficients can be utilized during the next computation period with the variables calculated three cycles ago. This integration subroutine is discussed supra and no further expansion thereon is believed necessary regarding updating of the coefficients. The computer program is now advanced to the stage where it commences simulation of the two motors that are coupled to the main rotor drive shaft.

*Engine simulation*

Simulation of the gas turbine engine utilized in the helicopter being simulated is based on a ratio of required horsepower, ΔN, to available horsepower, D. This ratio, referred to as the power factor, *ΔN/D*, is derived as an independent variable to prevent nonlinear interpolation. In addition, and more importantly, the use of the power factor term provides positive control of the simulated engine by the trainee, as well as enabling the system to adjust easily in the transition range between idle and maximum power. The engine simulation program utilizes the power factor term to compute required engine torques and fuel flow.

The simulation program for the engine is divided into three basic parts: logic, engine functions and engine computations. The logic segment of the engine simulation program involves setting internal flags to determine which computations are to take place within any computation cycle. These internal flags are dependent upon discrete and analog inputs initiated by either the pilot or instructor, as well as digitally computed values which indicate the current status of the equations being solved. Based upon the internal flags, the computer solves certain equations involving engine torques and fuel flow.

Before any engine computations can be made, the engine logic operation must be performed. In considering the engine logic, the program runs through a series of steps associated with engine No. 1, for driving the main rotor, and then is looped back through the same series of operations of engine No. 2 that drives the same rotor shaft. In consequence, the ensuing discussion will be only for engine No. 1; it is understood that the same operations are performed for engine No. 2 immediately upon the conclusion of the operations for engine No. 1.

The first operation in the engine logic segment of the program is to determine if engine speed, $N_g$, is above 12,400 r.p.m., the velocity required to maintain normal flight. $N_g$ is compared with 12,400 r.p.m. by feeding the computed value of engine speed and the constant to the arithmetic unit from memory 254. If the arithmetic unit indicates that engine speed is less than 12,400 r.p.m., an indication is provided that the craft is not undergoing normal flight and a flag signal is derived, whereby additional action taken by the trainee has no effect on the operation of the computer. In systems wherein starting is simulated, the indication of $N_g$ being less than 12,400 r.p.m. is utilized to set a flag indicative of the helicopter being in a start mode. To simplify the description of the present invention, however, it is assumed that the helicopter has started, whereby a value of $N_g$ less than 12,400 r.p.m. is utilized to derive the flag signal.

If the engine speed is in excess of 12,400 r.p.m., the computer program proceeds to the next step. The next computer step is to ascertain if the ignition switch at the trainee station is on. If the ignition is not on, a flag is set to indicate that the fire is extinguished in the gas turbine engine being simulated. The fire-out flag is utilized to control later segments of the computer program to simulate operations different from those that would be simulated under normal flight conditions.

The next program operation is to determine the values of functions that are required to simulate engine 1 and engine 2. The functions to be determined for each engine are the same, but have different values because different input parameters are involved in the computation for each engine. In consequence, the computer does not loop successively through the processes of computing the values for first one engine and then for the second engine, but utilizes a different program for each. Since, however, the same general functions are derived for each engine, the ensuing discussion refers only to engine No. 1 and the computations for engine No. 2 are repeated, but are made for the parameters controlling the performance of engine No. 2.

The functions computed at this time in the cycle being considered are those relating to power factor, throttle setting, gas generator speed, specifically, the functions are:

TABLE II $$f\frac{\frac{\Delta N}{D}}{3\text{–}25\text{–}1},\ f\frac{\sphericalangle}{3\text{–}20\text{–}1},\ f\frac{\sphericalangle}{3\text{–}26\text{–}1},\ f\frac{\sphericalangle}{3\text{–}23\text{–}2},\ f\frac{\sphericalangle}{3\text{–}23\text{–}2}$$

$$f\frac{N_G}{3\text{–}23\text{–}7},\ f\frac{N_G}{3\text{–}23\text{–}8},\ f\frac{N_G}{3\text{–}23\text{–}5},\ f\frac{N_G}{3\text{–}23\text{–}6}$$

After each of the functions indicated by Table II has been computed for each engine, it is stored in appropriate place in memory 254 for utilization later in the engine computation. The function tables for the parameters listed in Table II are given infra, in the equations where they are employed. In Table II, the symbol "  " is indicative of a throttle setting as derived in response to the speed selector lever setting at trainee station 50.

Upon the completion of the functions indicated by Table II for each engine, the next computer program step, relating to computing functions required for both engines 1 and 2, is performed. The functions for both engines, as seen from Table III, involve values for the outside air temperature, $t°$, set into the system by the instructor through potentiometer 63 at station 60.

TABLE III $$f\frac{t°}{3\text{–}22\text{–}1};\ f\frac{t°}{3\text{–}25\text{–}3};\ f\frac{t°}{3\text{–}23\text{–}1};\ f\frac{t°}{3\text{–}23\text{–}3}$$

After the computation and storage of the four functions involving outside air temperature that are utilized later in the program for computing the torque and speed of engines 1 and 2, the stored signals in memory 254, indicative of rate of climb, degree of turn, and degree of slip, are successively fed through digital-to-analog converter 123 to three separate sample and hold amplifiers in network 125.

The program is now ready to investigate the performance of engine No. 1. The first program operation is to ascertain if the freeze flag was set in response to $N_G$, gas generator speed, being less than 12,400 r.p.m. If the freeze flag was set, the entire computation for engine No. 1 is skipped and the computer program goes to the step involved in feeding the gas generator speed, $N_G$, for the preceding computation cycle to digital-to-analog computer 123. If the freeze flag was not set, the next step is to examine the memory location where the fire-off signal is stored. If the fire in the engine being simulated is off because the trainee inadvertently turned off the ignition or the instructor removed ignition, the computation for engine torque, $Q_E$, is changed from that associated with normal flight.

The computer program is now ready to proceed with the computation of engine torque, $Q_E$, which is a function of power factor, $\Delta N/D$; engine speed, N; outside temperature, $t°$; ratio of ambient to outside pressure, $\delta$, where the ambient is presumed at sea level pressure, and an input inserted by the instructor, indicative of engine performance, $$f\frac{INST}{3\text{–}22\text{–}3}$$

Specifically, the equation for engine torque is:

$$Q_E = 92{,}678\frac{\Delta N}{D}\,f\left(\frac{N}{3\text{–}22\text{–}2}\right)f\left(\frac{t°}{3\text{–}22\text{–}1}\right)\delta f\left(\frac{INST}{3\text{–}22\text{–}3}\right) \quad (42)$$

| $t°$ | $f\frac{t°}{3\text{–}22\text{–}1}$ | $N$ | $f\frac{N}{3\text{–}22\text{–}2}$ | $INST$ | $f\frac{INST}{3\text{–}22\text{–}3}$ |
|---|---|---|---|---|---|
| −69.4 | 1.000 | 0 | 1 | Normal | 1.0 |
| −32.0 | .951 | 14,000 | .6 | ↓ | |
| +5 | .762 | 24,260 | .42 | Decrease | |
| +15 | .700 | | | ↓ | |
| +47 | .498 | | | 0 | 0 |

In Equation 42, the instructor's function, $$f\frac{INST}{3\text{–}22\text{–}3}$$

is a linear function varying between 0 and 1, and is determined by the settings of potentiometers 61 and 62, for engines No. 1 and No. 2, respectively. Through potentiometers 61 and 62, the instructor simulates various loading and malfunction conditions on the engine performance to enable the trainee to react under varying conditions.

After engine torque has been computed, the next program step is to determine the speed of the gas generator for the engine, $N_G$, presuming that the fire is on. If the fire is off, the gas generator speed is determined directly after the fire-off condition is ascertained, and the engine torque calculation is excluded since it is zero.

With the fire on, gas generator speed, $N_G$, is computed in accordance with:

$$N_G=\left[.764\, f\frac{t^\circ}{3\text{-}23\text{-}1} f\frac{\measuredangle}{3\text{-}23\text{-}2}+ .397\, f\frac{t^\circ}{3\text{-}23\text{-}3} f\frac{\measuredangle}{3\text{-}23\text{-}4}\left(\frac{\Delta N}{D}\right)\right] 26{,}300 \quad (43)$$

| $\measuredangle$ | $f\frac{\measuredangle}{3\text{-}23\text{-}2}$ | $f\frac{\measuredangle}{3\text{-}23\text{-}4}$ | $t^\circ$ C. | $f\frac{t}{3\text{-}23\text{-}1}$ | $f\frac{t}{3\text{-}23\text{-}3}$ |
|---|---|---|---|---|---|
| 0 | 0 | 0 | −69.4 | .797 | 1.00 |
| .05235 | 0 | ------------ | +15.0 | .944 | .703 |
| .10741 | .772 | ------------ | +47.0 | 1.00 | .532 |
| .61082 | .772 | 0 | | | |
| 1.16928 | 1.000 | 1.00 | | | |
| 2.09424 | 1.000 | 1.00 | | | |

It is noted that the equation for gas generator speed with the fire on is a function of outside air temperature, $t^\circ$, throttle setting, $\measuredangle$, and power factor, $\Delta N/D$, quantities that have been previously stored in memory 254 of main computer 81.

The next step in the computer program is to determine the value of the power factor, $\Delta N/D$, with the fire on. The power factor is computed as a function of the idle speed of the power turbine, $N_{IDLE}$, a factor that is preprogrammed into the computer memory since it is a known parameter of the motor, the actual power turbine speed, N, and a function of the throttle setting by the trainee, $$f\frac{\measuredangle}{3\text{-}20\text{-}1}$$

The function is computed in accordance with:

$$\frac{\Delta N}{D}=(N_{IDLE}-N)\, f\frac{\measuredangle}{3\text{-}20\text{-}1} \quad (44)$$

| $\measuredangle$ | $f\frac{\measuredangle}{3\text{-}20\text{-}1}$ |
|---|---|
| 0 | $.0142\times10^{-3}$ |
| .140 | ------------ |
| .611 | $.0142\times10^{-3}$ |
| .977 | $\begin{cases}.476\times10^{-3}\\.065\times10^{-3}\end{cases}$ |
| 1.169 | $.476\times10^{-3}$ |
| 2.094 | $.573\times10^{-3}$ |

If the fire is off, the power factor is equal to zero.

As indicated supra, if the fire is off, the program skips the subroutines involved in the computation of engine torque, gas generator speed with the fire on, and power factor with the fire on, and derives zero values for engine torque and power factor. After setting zero values in the memory for the locations associated with engine torque and power factor, the computer determines the value of the gas generator speed with the fire off in accordance with:

$$N_G=1470\int\left[-.698\, f\frac{N_G}{3\text{-}23\text{-}7}+.0076\, q_x\right]dt \quad (45)$$

| $N_G$ | $f\frac{N_G}{3\text{-}23\text{-}7}$ |
|---|---|
| 0 | 0 |
| 2,000 | .527 |
| 12,000 | 1.0 |
| 28,062 | 1.0 |

In solving Equation 45 the value of the gas generator speed, $N_G$, is computed as a function of $N_G$ for the previous cycle and the dynamic pressure, $q_x$, of the environment through which the helicopter is presumed to be going. Of course, the $0_{33}$ Mod Gurk integration process is utilized.

The computer program now advances to the step wherein the gas generator speed, $N_G$, is supplied from memory 254 to digital-to-analog converter 125. The step of suppling gas generator speed may be reached by any one of three routes, depending on the simulated conditions. Specifically, the gas generator speed output signal can be derived immediately following computation of the functions involving both engines if the system was ordered to a freeze condition. In the alternative, when the system is in a fire-off condition for the engine being simulated, the gas generator speed is supplied subsequently to computation of the gas generator speed "fire-off" operation. The other alternative programming sequence by which provision of the gas generator speed is reached follows computation of power factor when the fire is on for the engine being simulated.

After the gas generator speed, $N_G$, signal has been fed from memory 254 to digital-to-analog converter 123, the computer program counter 265 advances to the next step wherein the speed of the power turbine, N, is computed. Power turbine speed is computed in accordance with either Equation 46 or Equation 47, depending upon its value.

$$N=\int(N_{IDLE}-N)dt \quad (46)$$

when $$N<920\Omega \text{ or } N_{IDLE}<N$$

$$N_{IDLE}=0 \text{ when fire out}$$

$$N_{IDLE}=21275\, f\frac{\measuredangle}{3\text{-}26\text{-}1} \text{ when fire on}$$

| $\measuredangle$ | $f\frac{\measuredangle}{3\text{-}26\text{-}1}$ |
|---|---|
| 0 | 0 |
| .140 | 13,650 |
| .611 | 13,650 |
| .977 | $\begin{cases}15{,}600\\18{,}200\end{cases}$ |
| 1.169 | ---------- |
| 2.094 | 21,275 |

$$N=920\Omega \quad (47)$$

Equation 46, involving an integration between the past values of power turbine speed, N, and the idle speed of the power turbine, $N_{IDLE}$, for the throttle setting, $\measuredangle$, is employed when the computed value of power turbine speed is less than 920 times the angular velocity of the rotor, (920Ω) in radians per second, or when the value of $N_{IDLE}$ is less than N. Equation 46 is computed in accordance with the $0_{33}$ Mod Gurk integration routine in response to past values of N and $\dot{N}$. If the values of N, Ω, and $N_{IDLE}$ during the computation cycle immediately preceding the one under consideration are such that Equation 46 is not utilized, the power turbine speed is computed in accordance with Equation 47.

The power turbine speed subroutine is performed by first examining the stored value of N for the immediately preceding computation cycle to determine if it is less than 920Ω, where Ω was computed during the immediately preceding computation cycle. If the comparison indicates that N is greater than 920Ω, the program stores the computed value of 920Ω in the appropriate memory location for N. If, however, N is less than 920Ω, the next step is to determine if N is greater than $N_{IDLE}$. If N is greater than $N_{IDLE}$, the value of 920Ω is fed to the memory location of N. On the other hand, if the test for $(N_{IDLE}-N)$ results in an affirmative result, N is computed in accordance with Equation 46. In computing the value of N in Equation 46, the fire-out flag is examined, and if it indicates that the fire for the engine being considered is extinguished, $N_{IDLE}$ is set equal to zero. If, however, the fire-out flag is not set, $N_{IDLE}$ is computed in accordance with function of throttle setting, as indicated.

Upon completion of the computation for the speed of the power turbine, N, the next two computer steps, involving outputting power turbine speed and engine torque, N and $Q_E$, respectively, are performed. After the engine torque signal for engine No. 1 has been supplied by memory 254 to digital-to-analog converter 123, the program directs index register 272 to be decremented by a count of one so that it is set at one. With program register 265 set at the address immediately after ouputting of engine torque and index register 272 at a count of one, the program is recycled or looped back to the operation wherein a decision is made as to whether the simulator is in a freeze condition or whether the engine is in a fire on or fire off status. The program then repeats the steps previously enumerated regarding simulation of engine No. 1, but this time for engine No. 2, utilizing the input parameters for the second engine, instead of those for the first engine.

During the computations for the second engine, the computed values of engine torque, gas generator speed and power turbine speed are derived and supplied to appropriate indicators on the trainee's panel at station 50. After torque for engine No. 2 has been supplied from computer 254 to digital-to-analog converter 123, index register 272 is reset to the zero state and the program proceeds.

The next computer program step is to read the contents of memory 254 for the value of $\Omega$, rotor speed, and supply it through digital-to-analog converter 123 to the appropriate meter at the student station 50.

The program for main computer 81 is now essentially complete and program counter 265 is advanced to a state wherein an interrupt control signal is derived. The interrupt signal is fed through transfer buss 275 to interrupt control network 285 and prevents the further coupling of pulses from clock 271 to the network. Matrix 269 prevents the coupling of pulses from clock 271 to the remainder of the computer for an interval determined by cycle timer 134, FIGURE 8, in the interface logic network. Upon receiving a pulse from cycle timer 134, the computer goes through a new 62.5 millisecond computation cycle in the manner described.

*Operation of auxiliary computer 82*

While main computer 81 is computing the forces and moments involved in simulation of the main rotor of the helicopter, computing the necessary functions for simulating the engines that drive the main rotor and supplying output signals to digital-to-analog converter 123, auxiliary computer 82 is simultaneously computing the forces and moments of the fuselage, the tail rotor and the total motion and forces that the simulated craft undergoes. At the beginning of each computation cycle, data is transferred between main computer 81 and auxiliary computer 82, as indicated by Table I, supra. During the intercomputer transfer, the necessary data required by auxiliary computer 82 for the computations it performs are transferred from computer 81 to computer 82. Also, auxiliary computer 82 feeds back to main computer 81 signals indicative of the overall motion of the craft of which the trainee should be apprised.

After the inter-computer transfer has been completed, the first step in the auxiliary computer 82 program, which is illustrated by the flow diagram comprising FIGURE 16, is to derive the effective flight control positions of collective pitch stick 52, $\delta_{\theta ce}$; the effective position of cyclic pitch stick 53 in the fore and aft direction, $\delta_{\theta Fe}$; the effective position of cyclic pitch stick 53 in the lateral direction, $\delta_{\theta Le}$; and the effective position of rudded pedals 55 and 56, $\delta_{RPe}$. To simplify the exposition, the simulator as described herein does not include an automatic stabilization unit, but is activated soley in respone to action taken by the trainee, the effective values for each of the four mentioned parameters can be considered as the values to which the trainee sets the potentiometer by movement of the various controls. Hence:

$$\delta_{\theta ce}=\delta_{\theta c};\ \delta_{\theta Fe}=\delta_{\theta F};\ \delta_{\theta Le}=\delta_{\theta L};\ \delta_{RPe}=\delta_{RP}$$

In each of the foregoing expressions the subscript *e* indicates the effective position and the lack of a subscript indicates the value fed to the data processing system by activation of the various controls by the trainee. In an embodiment constructed in accordance with the invention however, simulation of the automatic stabilization equipment was provided and the expressions for effective positions of the various controls were modified accordingly.

After computing the effective values for the four dynamic controls of the trainee, the program advances to the next step, involving computation of the tail rotor forces and moments. The tail rotor computation concerns equations for the tail rotor velocities in the lateral and vertical direction, $V_{TR}$ and $W_{TR}$; tail rotor torque, $Q_{TR}$; tail rotor coefficient of thrust, $C_{TTR}$; tail rotor side force, $Y_{TR}$, and the pitch of the tail rotor at a radial distance three quarters of the distance between is axis and tip, $\theta_{TR}$. To compute the tail rotor parameters, it is necessary to have inputs that are functions of: the helicopter fuselage velocities, U, V and W, in each of the three coordinate directions, the rate of change of the fuselage in each of the three angular freedoms, *p*, $q_1$ and *r;* air density, $\rho$; velocity of the main rotor, $\Omega$, which is proportional to the tail rotor velocity; the effective positions of the rudder pedals 55 and 56, $\delta_{RP_e}$, and the effective position of collective pitch stick 51, $\delta_{\theta ce}$.

The first parameter computed for the tail rotor simulation is the value of the tail rotor pitch angle, $\theta_{TR}$. Tail rotor pitch angle is computed as:

$$\theta_{TR}=2\delta_{RPe}+.6118\delta_{\theta ce}-.08 \qquad (48)$$

The solution of Equation 48 involves retrieving from memory 254 the computed values of effective rudder pedal position, $\delta_{RP_e}$, and collective pitch stick position, $\delta_{\theta ce}$. After the value of Equation 48 has been stored in an appropriate address in memory 254 of auxiliary computer 82, the auxiliary computer program proceeds to solve for the lateral velocity of the tail rotor, $V_{TR}$, in response to the stored values of lateral fuselage velocity, V, turning rate of the fuselage, *r*, and fuselage rolling rate, *p*, in accordance with:

$$V_{TR}=V-36.06r+2.74p \qquad (49)$$

The next step in the auxiliary computer program, once the lateral velocity of the tail rotor has been computed, is to determine the vertical velocity of the tail rotor, $W_{TR}$. Tail rotor vertical velocity is computed in response to the vertical velocity of the helicopter, W, and the pitching rate thereof, $q_1$, in accordance with:

$$W_{TR}=|W+36.06q_1| \qquad (50)$$

The next step in the computer program is to compute the coefficient of thrust of the tail rotor, $C_{TTR}$. The coefficient of tail rotor thrust is computed as the difference between two functions of the tail rotor pitch angle, designated A and B, respectively, when multiplied by a third function, D, involving tail rotor: pitch angle, $\theta_{TR}$; lateral velocity, $V_{TR}$, and vertical velocity, $W_{TR}$. The equation for tail rotor coefficient of thrust is:

$$(A-B)(1+D) \qquad (51)$$

In Equation 51, $A=0.0368\theta_{TR}$ if $|\theta_{TR}|$ is less than 0.0977 radians per second. If, however, $|\theta_{TR}|$ is greater than 0.0977 radians per second, the value of A is computed in accordance with $(0.0974\theta_{TR}-0.006)$. The determination as to whether $\theta_{TR}$, in absolute value, is greater or less than 0.0977 radians per second is made in auxiliary computer 82 in precisely the same manner as described supra for similar computations in main computer 81. The alternative programming routine in the auxiliary computer, which depends upon the absolute value of $\theta_{TR}$, is performed in auxiliary computer 82 as it is performed in main computer 81.

After the value of A has been determined, the values of B and D are successively computed as:

$$B=\left[f\left(\frac{.314+K_v\theta_{TR}}{2\text{–}32\text{–}1}\right)\right]\cdot[(3.52V_{TR}+1.925K_vV_{TR}^2)\cdot 10^{-6}]$$

where:

$$K_v=1 \text{ when } V_{TR}\geq 0$$

$$K_v=-1 \text{ when } V_{TR}\leq 0$$

$$D=.01465(U_{TR}+W_{TR})f\frac{\theta_{TR}}{2\text{–}32\text{–}3} \quad (51)$$

$$U_{TR}=|U|$$

$$-.04\leq C_{T_{TR}}\leq .04$$

| $(.314+K_v\cdot\theta_{TR})$ | $f\frac{.314+K_v\cdot\theta_{TR}}{2\text{–}32\text{–}1}$ | $\theta_{TR}$ | $f\frac{\theta_{TR}}{2\text{–}32\text{–}3}$ |
|---|---|---|---|
| .122 | 0.0 | -.0838 | 1.0 |
| | | .000 | 1.0 |
| .279 | 1.0 | .077 | .96 |
| | | .318 | .24 |

The derivation of functions in auxiliary computer 82 is performed in precisely the same manner as it is in main computer 81 and no further description thereof is deemed in order.

The next factor computed by auxiliary computer 82 is the lateral force, $Y_{TR}$, exerted by the tail rotor on the helicopter fuselage. The lateral force exerted on the tail rotor is computed in response to the tail rotor coefficient of thrust, $C_{T_{TR}}$; main rotor speed, $\Omega$, and the density of the air in the helicopter environment, $\rho$. Initially, the stored value of $\Omega$ is squared and the quantity $\Omega^2$ is multiplied by $\rho$ and stored in a permanent location of memory 254 of auxiliary computer 82. The product of $\rho\Omega^2$ also appears at this time in A register 255, in the arithmetic section of auxiliary computer 82. The computer then multiplies the stored value of tail rotor coefficient of thrust, $C_{T_{TR}}$, with the constant 73,025 that was initially fed to the auxiliary computer 82 memory 254 in response to the initial programming operation. The product is indicative of the quotient:

$$\frac{Y_{TR}}{\rho\Omega^2}=73{,}025C_{T_{TR}} \quad (52)$$

a value that is required for later computation and is hence supplied to a permanent location in memory 254. The product of 73,025 $C_{T_{TR}}$ and $\rho\Omega^2$ is then obtained to provide the value of $Y_{TR}$ as:

$$Y_{TR}=73{,}025C_{T_{TR}}\rho\Omega^2 \quad (53)$$

After computing Equation 54, auxiliary computer 82 lateral force, the program is advanced to the next step wherein the tail rotor torque, $Q_{TR}$, is computed as a function of the stored values of $p\Omega^2$ and $$\frac{Y_{TR}}{\rho\Omega^2}$$

The equation for computing tail rotor torque is:

$$Q_{TR}=\rho\Omega^2\left[-261.8-.57983\left(\frac{Y_{TR}}{\rho\Omega^2}\right)-.00196\left(\frac{Y_{TR}}{\rho\Omega^2}\right)^2\right] \quad (54)$$

After computing Equation 54, auxiliary computer 82 has completed the solution of all aerodynamic effects arising as a result of the forces and moments imparted to the simulated helicopter by the tail rotor thereof. In the tandem rotor helicopter simulation, which is considered in detail infra, no consideration is given to the forces and moments of the tail rotor and the factors just previously considered are deleted.

*Fuselage forces and moments*

The fuselage calculations derive the values of the fuselage forces in each of the X, Y and Z coordinate directions, respectively, $X_F$, $Y_F$ and $Z_F$. In addition, the moments of the fuselage in the coordinate directions for roll, pitch and yaw or turn, $7_F$, $M_F$ and $N_F$, respectively, as well as fuselage dynamic pressure, $q_x$, are determined by auxiliary computer 82 during this portion of the program.

The first factor considered, fuselage longitudinal force, $X_F$, is computed in response to: air density, $\rho$; longitudinal velocity of the craft, U; total relative vertical velocity, $W_{ADJ}$; and the lateral velocity, V, of the craft in accordance with:

$$X_F=-\rho[13U|U|+32W_{ADJ}^2+23|U|W_{ADJ}+84|V||W|_{ADJ}|] \quad (55)$$

During the solution of Equation 55, the quantities absolute value of longitudinal velocity, $|U|$; absolute value of total relative vertical velocity, $|W_{ADJ}|$, and absolute value of lateral velocity, $|V|$, are determined and stored in a permanent location in memory 254 of auxiliary computer 82, along with the computed value of the fuselage longitudinal force. Each of the stored values is utilized in a subsequent computation.

Upon completion of the solution of Equation 55 and loading the memory with each of the four values computed, auxiliary computer 82 program steps to the next operation, computation of the vertical force exerted on the fuselage, $Z_F$. The fuselage vertical force is computed in response to the stored values of: $V^2$, lateral velocity squared; $|U|$, absolute value of longitudinal velocity; U, longitudinal velocity; $W_{ADJ}^2$, the squared value of the total relative vertical velocity; $W_{ADJ}$, the total relative vertical velocity; $|V|$, absolute value of vertical velocity, and $\rho$, air density, in accordance with:

$$Z_F=\rho\{86\,W_{ADJ}^2-24.5\,[U|U|+V^2]+117.6\,K_2\,|W_{ADJ}|\,[|U|+1.21\,UK_3-97\,K_3]-|V|\,W_{ADJ}\,[K_2(.0546\,|V|\,[W_{ADJ}+120.5])+279\,K_1]-31212\,K_6\,[W_{ADJ}-20]\}$$

$$K_1=1.0 \text{ if } W_{ADJ}>0$$
$$K_1=0 \text{ if } W_{ADJ}\leq 0$$
$$K_2=1-K_1$$
$$K_3=1.0 \text{ if } U>80$$
$$K_3=0 \text{ if } U\leq 80$$
$$K_6=1.0 \text{ if } W_{ADJ}>20$$
$$K_6=0 \text{ if } W_{ADJ}\leq 20 \quad (56)$$

After the fuselage vertical force has been computed, the auxiliary computer 82 program is advanced to the next step, computation of the side force exerted on the fuselage, $Y_F$. The fuselage side force is responsive to the value of the lateral velocity of the craft, V, computed during the previous computation cycle, in accordance with:

$$Y_F=-512\,V \quad \text{when } |V|\leq 10$$
$$Y_F=-44\,V+4680 \quad \text{when } V<-10 \quad (57)$$
$$Y_F=-44\,V-4680 \quad \text{when } V>10$$

After the fuselage side force value has been computed utilizing one of the three expressions in Equation 57, and the computed value has been stored, the next step in the auxiliary computer program is reached.

The next auxiliary computer 82 program step is computation of fuselage rolling moment, $7_F$. The computation of the fuselage rolling moment is in response to stored values of: lateral velocity, V; total relative vertical velocity squared, $W_{ADJ}^2$; longitudinal velocity of the craft, U; absolute value of craft lateral velocity, $|V|$; longitudinal velocity of the craft squared, $U^2$; air density in the simulated environment of the helicopter, $\rho$; and the rolling rate of the fuselage, $p$. After determining if V is greater than, equal to or less than zero, to determine the value of $K_7$, the fuselage rolling moment is computed as:

$$7_F=\rho\{160\ V|V|+5.41\ U^2-1.05\ UV^2+315.4\ UV+2.52\ W_{ADJ}^2\ V[K_7+1.0]\}-1280\ p \quad (58)$$

$$K_7=1.0 \text{ if } V\leq 0$$

$$K_7=0 \text{ if } V>0$$

After the magnitude of the fuselage rolling moment has been computed and stored in memory 254, the program counter of auxiliary computer 82 advances to the next step wherein the fuselage pitching moment, $M_F$, is determined. Fuselage pitching moment is computed in response to the stored values in memory 254 of auxiliary computer 82 indicative of: lateral velocity squared, $V^2$; longitudinal velocity squared, $U^2$; absolute value of the total relative vertical velocity, $|W_{ADJ}|$; longitudinal velocity of the helicopter craft, U; total relative vertical velocity of the craft, $W_{ADJ}$; air density, $\rho$; and pitching rate of the craft, $q_1$. These seven stored values are combined in accordance with:

$$M_F=\rho\{47\ [U^2+V^2]+165\ W_{ADJ}\ |W_{ADJ}|+6.52\ U\ W_{ADJ}\ K_8[K_2(W_{ADJ}+98)+49.3\ K_1]+.108\ W_{ADJ}\ V^2\ [K_2+.583\ K_1]\ [87.5-|W_{ADJ}|]\} \quad (59)$$

$$K_1=1.0 \text{ if } W_{ADJ}>0$$

$$K_1=0 \text{ if } W_{ADJ}\leq 0$$

$$K_2=1.0-K_1$$

$$K_8=1.0\ U>0$$

$$K_8=0\ U\leq 0$$

After determinations are made regarding the value of $W_{ADJ}$ being greater than, equal to, or less than zero, to determine the value of $K_1$, the values of $K_2$ and $K_8$ are computed and inserted in Equation 59.

The next computer program operation is to ascertain the fuselage yawing moment, $N_F$. The fuselage yawing moment is determined in response to stored values in the auxiliary computer memory 254 of: lateral velocity absolute value, $|V|$; longitudinal velocity squared, $U^2$; longitudinal velocity, U; air density, $\rho$; lateral velocity, V; and turning rate, *r*. These stored values are combined together by arithmetic section 251 of auxiliary computer 82 in accordance with:

$$N_F=\rho\ V\ [256\ |V|+32\ U^2]-4096\ r \quad (60)$$

Upon completion of the computation and storage of the fuselage yawing moment, $N_F$, the computer program advances to the next step, computation of the fuselage dynamic pressure, $q_X$. The pressure exerted on the simulated craft is determined by the digital computer of the present invention in response to the stored values of longitudinal velocity squared, $U^2$, and air density, $\rho$, in accordance with:

$$q_X=\tfrac{1}{2}\ \rho\ U^2 \quad (61)$$

As indicated, supra, the dynamic pressure exerted on the fuselage by the surrounding air is computed only for output purposes and is not involved in other computations. This procedure is followed since the values of $U^2$, $V^2$ and $W^2$, the velocities of the craft in the X, Y and Z axes, are easily computed and allow simplification of the other fuselage forces and moment computations.

*Landing gear considerations*

Consideration is now given to the forces and moments imparted to the helicopter fuselage in response to any one of the three landing gears being on the ground. These forces and moments are utilized in conjunction with the crash determination, described supra, as well as to provide the trainee with indications of the status of the gears.

The first landing gear factor to be considered, at the program step immediately following computation and storage of fuselage dynamic pressure, is landing gear retraction time. The time required to retract and extend the landing gear is the integral of a constant from the time when the trainee activates the landing gear UP-DOWN control lever. When the integrated quantity, which is computed by rectangular integration in a well-known manner, attains a predetermined value indicative of a specified time period after the student has activated the landing gear control lever to the DOWN position it can be assumed that the gear is down and locked. Similarly, the landing gear can be assumed to be in an up and locked position a predetermined time period after the student has activated the control lever to the UP position, which time is determined by the integrated value. Hence, once the integrated value which is a predetermined constant is stored in Z register 258, an indication of the landing gear being up and locked or down and locked is obtained.

The computation of whether the landing gear is up and locked or down and locked, in addition to being responsive to the discrete inputs indicative of the trainee's setting of the landing gear control lever is, of course, responsive to past, stored values of landing gear time because of the integration routine employed. In addition, the condition of the instructor activated reset switch 67 is utilized in the logic for determining if the landing gear is up or down. If the reset switch has been activated by the instructor, the craft is returned to the ground, an operation which includes locking the landing gear in a down position. Hence, the first step in the landing gear retraction time subroutine is to determine if the reset switch is activated. If reset switch 67 is not activated, the program determines whether the landing gear is up and locked or down and locked in the manner described. When the reset switch is activated, the program proceeds immediately, without going through any computations, to set the auxiliary computer 82 memory 254 with a binary signal indicative of the gear being down and locked. After the memory is loaded with a signal indicative of the gear being either up and locked or down and locked, or in neither of these conditions, the program advances to the next step.

The next program step in auxiliary computer 82 is to determine the forces on the left and right wheels, $F_{LW}$ and $F_{RW}$, and the height above ground for each wheel, $H_{LW}$ and $H_{RW}$. Right and left wheel height are computed in response to the height of the fuselage above the ground, H, the fuselage pitch angle, $\theta_F$, and fuselage roll angle, $\varphi_F$, in accordance with Equation 62:

$$H_{RW}=H-6.0+4.35\theta_F-6.47\varphi_F$$

$$H_{LW}=H-6.0+4.35\theta_F+6.47\varphi_F \quad (62)$$

After the height of the right wheel above the ground has been computed, and if it is ascertained as being equal to or less than zero, the force exerted on the right wheel is calculated by multiplying $H_{RW}$ by a constant equal to 5,000 for the SH-3A helicopter being simulated. Similarly, subsequent to the computation of the height of the left wheel above the ground and a determination of this height being equal to or less than zero, the force on the left wheel, $F_{LW}$, is computed as the same constant times $H_{LW}$. After the forces exerted on both the right and left wheels are computed, the total force exerted on both wheels is determined by summing $F_{RW}$ with $F_{LW}$. The sum of the right and left wheel forces, together with the computed heights of the right and left wheels above the ground and the individual forces exerted on the right and left wheels, are stored in separate memory locations of auxiliary computer 82.

After the forces and heights of the left and right wheels have been stored, the auxiliary computer 82 program advances to the next step wherein the height of the tail wheel and the force exerted on the tail wheel are computed. Height of the tail wheel above the ground, $H_{TW}$, is computed in response to the height of the fuselage above the field, H, and the fuselage pitch angle, $\theta_F$, in accordance with:

$$H_{TW}=H-8.4-18.99\theta_F \quad (63)$$

If Equation 63 indicates that the height of the tail wheel is zero or less, the force on the tail wheel is computed by multiplying the tail wheel height by a constant, 2,000 for the SH–3A helicopter. The computed values for the height of the tail wheel above ground and the tail wheel force, $F_{TW}$, are stored in appropriate memory locations of auxiliary computer 82, after which the computer program advances to the next step.

The next step in the auxiliary computer program is calculation of the longitudinal force exerted by the landing gear on the fuselage. Landing gear longitudinal force, $X_{LG}$, is computed in response to the stored values of: ground velocity of the craft in the X direction, U; right wheel force, $F_{RW}$; left wheel force, $F_{LW}$; tail wheel force, $F_{TW}$; the cosine of the fuselage pitch angles, $\cos\theta_F$, and the sine of the fuselage pitch angle, $\sin\theta_F$. These six parameters are combined in accordance with:

$$X_{LG}=[F_{RW}+F_{LW}+F_{TW}]\left[-\sin\theta_F+.025\frac{U_G}{|U_G|}\cos\theta_F\right] \quad (64)$$

Because the sine and cosine of the fuselage roll angle have been computed in another subprogram and stored, there is no necessity for recalculating the values of these variables. Upon completion of the calculation and storage of the computed value for the landing gear longitudinal force, $X_{LG}$; sum of the three wheel forces, $$F_{RW}+F_{LW}+F_{TW}$$

and the ratio, $$\frac{U_G}{|U_G|}$$

the computer program advances to the next step. The sum and ratio terms are stored in memory 254 because they are required for the computation of the force exerted by the landing gear on the helicopter fuselage in the vertical axis, $Z_{LG}$, the next computed function.

The stored sum of the forces exerted on the three landing wheels is combined with the cosine and sine of the fuselage pitch angle, $\theta_F$, as well as with the rate of climb of the craft, $\dot{h}$, and the $\pm 1$ value of the ratio, $$\frac{U_G}{|U_G|}$$

in accordance with:

$$Z_{LG}=(F_{RW}+F_{LW}+F_{TW})\left[\cos\theta_F-f(\dot{h})+.025\frac{U_G}{|U_G|}\sin\theta_F\right] \quad (65)$$

where $f(\dot{h})=.5\dot{h}$ when $\dot{h}\leq 0$; $f(\dot{h})=0$ when $\dot{h}>0$.

After the solution of Equation 65 is fed into an appropriate location in memory 254 of auxiliary computer 82, the auxiliary computer program proceeds to the next step.

The next step in the auxiliary computer program is the computation of the rolling moment exerted on the fuselage craft by the landing gear, $7_{LG}$. Landing gear rolling moment is computed in response to previously stored values of: the height of the right and left wheels above ground, $H_{RW}$ and $H_{LW}$; the rolling rate of the fuselage, $p$; the forces exerted by the right and left wheels on the fuselage, $F_{RW}$ and $F_{LW}$, and the logical decision as to whether either the right or left wheel is in a touchdown condition. These parameters are combined in accordance with:

$$7_{LG}=6.5(F_{RW}-F_{LW})-30{,}000pK_R \quad (66)$$

where:

$K_R=1$ when either main wheel touched down
$K_R=0$ otherwise

Prior to solving Equation 66, a determination is made as to whether either the right or left wheel is in a touchdown condition. The determination is performed by successively evaluating the most significant bit positions of the previously computed values of height of the right and left wheels above ground, $H_{RW}$ and $H_{LW}$. If either wheel is in a touchdown condition, a signal is stored in an appropriate location of memory 254 in the auxiliary computer to indicate this factor. This signal is ultimately coupled back to main computer 81 and fed to the student station 50 and instructor station 60 as a discrete output on lamps 74 to indicate which wheel is in a touchdown position. After the value of the landing gear rolling moment, $7_{LG}$, has been computed and stored the next program step of auxiliary computer 82 is reached.

The next step of the auxiliary computer program is computation of the pitching moment, $M_{LG}$, exerted on the helicopter fuselage by the landing gear. The landing gear pitching motion is calculated in response to the forces exerted on the right, left and tail wheels, $F_{RW}$, $F_{LW}$ and $F_{TW}$; the calculated value of the longitudinal force exerted by the landing gears on the fuselage, $X_{LG}$; the height of the tail wheel above the ground, $H_{TW}$; the pitching rate of the fuselage, $q_1$, and a logical signal indicative of either the left or right wheel being in a touchdown condition, $K_R$. These variables are combined in accordance with:

$$M_{LG}=-4.38(F_{RW}+F_{LW})+18.99F_{TW}+5.35X_{LG}-40{,}000q_1K_R \quad (67)$$

where:

$K_R=1$ when either main wheel touched down
$K_R=0$ otherwise

When the landing gear pitching moment, $M_{LG}$, has been computed and stored, the next step in the auxiliary computer program, relating to the yaw moment exerted on the fuselage by the tail wheel, $N_{TW}$, is calculated. The yawing moment exerted by the tail wheel on the fuselage is only a factor when the tail wheel is not locked, or if neither main wheel, i.e., the right or left wheel, is not in a touchdown position. In addition, if the turning rate of the craft, while it is on the ground, is less than a predetermined constant, 0.1 radians per second for the SH–3A, it can be assumed that the tail wheel yaw moment is zero. In consequence, prior to computing the value of the tail wheel yaw moment, the computer program must make a plurality of logical operations.

The first of the logical operations concerning tail wheel yaw moment is to determine if the student has activated the discrete input associated with locking the tail wheel. If the tail wheel was not locked, the turning rate of the craft, $r$, is examined to see if it is in excess of 0.1 radian per second. If the turning rate is in excess of 0.1 radian per second, the computer goes to the next operation, ascertaining if the main wheels are off the ground. If the main wheels are not off the ground, a determination is made as to whether the tail wheel is off the ground. If the tail wheel is not off the ground, the computer now finds the value of tail wheel yaw moment, $N_{TW}$, in response to the stored values of turning rate, $r$; tail wheel force, $F_{TW}$, and ground velocity of the craft in the X direction, U, as indicated by:

$$N_{TW}=-2200|U_G|r+150F_{TW}r \quad (68)$$

If, however, any of the logical functions considered indicates that the tail rotor yaw moment is zero, the remaining portions of the subroutine are eliminated, and a value of zero is obtained for tail wheel yaw moment. The ascertained value for tail wheel yaw moment is, in any event, fed to the appropriate memory location in auxiliary computer 82. The factors involved in computing the forces and moments associated with the landing gears are now completed.

*Wind calculations*

The next series of operations concerns the effects on the craft of the wind velocity, $v_w$, and direction angle, $\psi_w$, fed into the computer from the Digiswitches at instructor station 60. The wind direction angle, $\psi_w$, supplied to the system from instructor station 60 is resolved into a pair of orthogonal components, $\cos\psi_w$ and $\sin\psi_w$, by the program indicated supra in auxiliary computer 82. After the values of cos $\psi_w$ and sin $\psi_w$ have been calculated and stored in momery 254 of the auxiliary computer, the first wind effect on the helicopter performance is calculated.

The first wind factor computed is velocity, $U_w$, along the X or longitudinal axis of the helicopter. $U_w$ is determined in response to the stored values of $v_w$, sin $\psi_w$, cos $\psi_w$; sine and cosine of fuselage heading angle, sin $\psi_F$ and cos $\psi_F$; and the cosine of fuselage pitch angle, cos $\theta_F$, as:

$$U_w = v_w \cos\theta_F(\cos\psi_F \cos\psi_w + \sin\psi_F \sin\psi_w) \quad (69)$$

The lateral wind velocity, $V_w$, is determined in response to the same parameters as longitudinal wind velocity, except with the addition of cosine and sine of roll angle, cos $\varphi_F$ and sin $\varphi$, as:

$$V_w = v_w[\mathit{sin}\ \theta_F \sin\varphi_F(\cos\psi_F \cos\psi_w + \sin\psi_F \sin\psi_w) - \cos\varphi_F(\sin\psi_F \cos\psi_w - \cos\psi_F \sin\psi_w)] \quad (70)$$

The same terms as are employed in solving Equation 70, and which are retained in memory 254 of auxiliary computer 81, are combined to solve vertical wind velocity, $W_w$, as:

$$W_w = v_w[\sin\theta_F \cos\varphi_F(\cos\psi_F \cos\psi_w + \sin\psi_F \sin\psi_w) + \sin\varphi_F(\sin\psi_F \cos\psi_w - \cos\psi_F \sin\psi_w)] \quad (70a)$$

The wind effect computations have now been completed and are stored in discrete locations of memory 254 in auxiliary computer 82.

After the wind effects in each of the three coordinate directions have been determined, an inter-computer transfer is made between main computer 81 and auxiliary computer 82 and vice versa. The functions transferred between the two computers are tabulated in Table I, supra, and generally involve transfer of the rotor calculations made in the auxiliary computer to the main computer. After the inter-computer transfer has been accomplished, the computer program advances to the next step.

*Fuselage calculations*

The next three computations in the auxiliary computer cycle involve computations relative to the sum of the forces and moments thus far computed. Specifically, the total forces and moments calculated in the routines or subprograms now to be described are: total longitudinal force, $X_a$; total side force, $Y_a$; total down force, $Z_a$; total pitch moment, $M_a$; total rolling moment, $7_a$; turning moment due to turning rate, $N_r$; and total yaw moment, $N_a$. In general, the inputs required to solve the equations for these three forces and four moments are the contributing force and moment terms derived from the other aerodynamic computations.

The total longitudinal force, $X_a$, is computed as the sum of: the force exerted on the fuselage in the X direction, $X_F$, plus the landing gear force in the X direction, $X_{LG}$, and the force exerted by the main rotor on the helicopter in the X direction, $F_{xR}$, as indicated by:

$$X_a = X_F + X_{LG} + F_{xR} \quad (71)$$

After the value of $X_a$ has been computed and stored, the program advances to the next step, calculating the total side force exerted on the helicopter, $Y_a$. The total side force on the helicopter is the sum of: the force exerted in the Y direction on the fuselage, $Y_F$; the force exerted by the tail rotor on the fuselage in the Y direction, $Y_{TR}$, and the force exerted by the main rotor in the Y direction, $F_{yR}$, as indicated by:

$$Y_a = Y_F + Y_{TR} + F_{yR} \quad (72)$$

After the total side force has been computed and the value thereof is stored, the computer advances to the next program step, computation of the total downwardly directed force, $Z_a$. The downwardly directed force is computed as the sum of the force on the fuselage in the Z direction, $Z_F$, plus the force exerted on the fuselage by the landing gear in the Z direction, $Z_{LG}$, minus the lift exerted on the fuselage by the main rotor, $L_{MR}$, as indicated by:

$$Z_a = Z_F + Z_{LG} - L_{MR} \quad (73)$$

After the three total forces along each of the axes of the craft have been computed, the program advances to the next step, computation of the total pitch moment. Total pitch moment, $M_a$, is computed in response to inputs that are functions of: rotor speed, $\Omega$; rolling rate, $p$; landing gear pitching moment, $M_{LG}$; tail rotor torque, $Q_{TR}$; main rotor pitching moment, $M_R$; total down force, $Z_a$; main rotor hub pitching moment, $M_{RH}$, and fuselage pitching moment, $M_F$. These variables are combined in accordance with:

$$M_a = .917Z_a + M_R + M_{LG} + M_F + M_{RH} - \frac{Q_{TR}}{6.1} - p\Omega(564.5) \quad (74)$$

After the value of $M_a$, computed from Equation 74, is fed to storage, the computer program proceeds to the next step. The next step in the computer program is determining the total rolling moment, $7_a$, computed in response to the stored values of: the main rotor rolling moment, $7_{MR}$; tail rotor force in the Y direction, $Y_{TR}$; the hub rolling moment of the main rotor, $7_{RH}$; the pitching rate, $q_1$; the rolling moment of the fuselage, $7_F$; the rolling moment of the landing gear, $7_{LG}$, and a constant times rotor velocity, 564.5$\Omega$. These quantities are combined in accordance with:

$$7_a = 7_{MR} + 7_{RH} + 2.74Y_{TR} + 7_{LG} + q_1\Omega(564.5) + 7_F \quad (75)$$

The factor 564.5$\Omega$ is not recomputed during the solution of Equation 75, but the value thereof is retrieved from storage, it having been computed in conjunction with the solution of Equation 74.

After the total rolling moment has been computed and stored, the program advances to the next step, computation of the turning moment due to the turning rate of the craft, $N_r$. $N_r$ is computed in response to the product of air density, $\rho$; turning rate, $r$, and total velocity, $V_T$, as indicated by:

$$N_r = -51381\rho r V_T \quad (76)$$

After the turning moment due to turning rate has been computed and the value thereof stored, the next computer step is reached, computation of total yaw moment, $N_a$. Total yaw moment is computed as a function of main rotor torque, $Q_{MR}$; total side force, $Y_a$; turning moment due to turning rate, $N_r$; tail wheel turning moment, $N_{TW}$; fuselage turning moment, $N_F$; constants equal to the center of gravity position, $dx$, and total moment of inertia of the craft, $I_{TOT}$; rotary acceleration of the main rotor, $\dot{\Omega}$; and the tail rotor force in the Y direction, $Y_{TR}$. These variables are combined in accordance with:

$$N_a = -Y_a dx + N_{TW} + N_F - 42Y_{TR} - Q_{MR} + I_{TOT}\dot{\Omega} + N_r \quad (77)$$

With the computation and storage of the value for total yaw moment, auxiliary computer 82 has completed the portion of the program dealing with summation of the forces and moments in the various directions and about the different axes. The auxiliary computer program now advances to a plurality of operations wherein factors that must be provided to the trainee are computed and supplied through main computer 81 and digital-to-analog converter 123 to the instruments at the student station 50, FIGURE 7.

The first operation in deriving signals for controlling the student instruments is to solve for ball angle, i.e., the angle at which ball 401 in the slip indicator is positioned. Ball angle, $\beta_B$, indicative of the lateral acceleration of the aircraft, is computed as the ratio of the total side force, $Y_a$, to total down force, $Z_a$, as indicated by:

$$\beta_B = -\frac{Y_a}{Z_a} \quad (78)$$

The computed valve of ball angle is ultimately fed through digital-to-analog converter 123 to a unit in sample and hold bank 125 which drives a synchro transmitter. The latter controls a synchro receiver for governing the position of the ball in the slip indicator on the student's panel, FIGURE 7.

The next steps in the computer program are to calculate simulated accelerations for the trainee resulting from the calculations arising from the inputs of the trainee and instructor. Movement of the simulated helicopter cockpit where the trainee is located, is in accordance with the simulated longitudinal acceleration, $A_{RX}$; simulated lateral acceleration, $A_{RY}$, and simulated vertical acceleration, $A_{RZ}$. These factors, after they have been computed, are utilized to drive motors 71, 72 and 73, through digital-to-analog converter 123. The equation for determining the sensed accelerations in the longitudinal, lateral, and vertical directions are:

$$A_{RX} = \frac{X_a}{M_i} + 2 - 11(q_1 - 2\theta_F) \quad (79)$$

$$A_{RY} = \beta_B + \varphi_F + p \quad (80)$$

$$A_{RZ} = \frac{4Z_a}{M_i} - 11(\dot{q}_1) + 128 \quad (81)$$

Equations 79, 80 and 81 are computed in response to variable stored inputs indicative of: total longitudinal force, $X_a$; fuselage pitch angle, $\theta_F$; fuselage pitching rate, $q_1$; fuselage rolling rate, $p$; pitching acceleration, $\dot{q}_1$; and total vertical force, $Z_a$. In addition, total mass, $M_i$, is utilized in these computations.

Immediately prior to computation of the simulated cockpit accelerations, a determination is made as to whether the system is in the reset mode. When the system is in the reset mode, all past values of the computed variables, other than those used to derive integrated factors, are at this time cleared from the permanent memory of auxiliary computer 82 and are replaced by zeros. The variables used to derive integrated variables are stepped back to zero in successive 62.5 millisecond computation periods so that the integrated values are returned to zero and do not remain constant at the finite values they had at the time reset occurred. Hence, in response to the computer being reset, motors 71, 72 and 73 are driven to a position approximately midway in their total extent of run. Thereby, when the system is restarted, acceleration in any direction can be imparted to the cabin by the motors.

If, however, the system is not in the reset mode, the computer program computes the sensed accelerations in each of the longitudinal, lateral and vertical directions. After the sensed accelerations in the three coordinate directions of the helicopter system have been computed and stored, the computer program is ready to advance to a further segment of the computation cycle.

*Angular rates*

The next section of the computation cycle involves determining the rates at which the helicopter fuselage turns about the X, Y and Z axes, which rates are designated as $p$, $q_1$, and $r$, respectively. The angular rates are derived by computing the angular accelerations, $\dot{p}$, $\dot{q}_1$ and $\dot{r}$, and integrating the accelerations using the $0_{33}$ Mod Gurk integration routine. The acceleration values are derived in response to the stored values of the total moment about the axis being considered divided by the moment of inertia about that axis. Initially, each of the angular accelerations is computed in succession and the stored acceleration values are thereafter integrated to derive the angular rates.

In computing angular accelerations and rates, the first two values ascertained are angular accelerations about the X and Y axes, $\dot{p}$ and $\dot{q}_1$, respectively. Because of the similarities of the equations and logic utilized to determine the values of $\dot{p}$ and $\dot{q}_1$, the manner in which the system determines these values will be considered together. The logical operations for determining these two values are repetitive and the only difference lies in words retrieved from memory.

Angular acceleration, $\dot{p}$, about the X axis is computed in response to the computed value of the rolling moment, $7_a$, and the preprogrammed constant moment of inertia about the X axis, $I_x$, as:

$$\dot{p} = \frac{7_a}{I_x} \quad (82)$$

while the angular acceleration, $\dot{q}_1$, about the Y axis is computed as the ratio of pitching moment, $M_a$, and the moment of inertia about the Y axis, $I_y$, a constant preprogrammed into the machine, in accordance with:

$$\dot{q}_1 = \frac{M_a}{I_y} \quad (83)$$

Immediately prior to computing the angular accelerations about the X and Y axes, the system again determines if it is in the reset mode. If a determination is made that the system is being reset, the values of $\dot{p}$ and $\dot{q}_1$ are integrated back to zero. The values of $\dot{p}$ and $q_1$ must be integrated back to zero, rather than merely being set to zero, because a zero value thereof does not affect the resulting angular rate quantities, $p$ and $q_1$. By integrating the angular accelerations back to zero, the integrations thereof are similarly returned to zero and the angular rates which are displayed have a zero value when the trainee begins a new training cycle. If it is determined that the system is not in a reset mode of operation, the angular accelerations are computed in succession in accordance with Equations 82 and 83.

After the angular acceleration, $\dot{q}_1$, about the Y axis has been evaluated, the auxiliary computer program goes to the next operation, computation of angular acceleration about the Z axis, $\dot{r}$. The first step in determining the value of angular acceleration about the Z axis is to determine if the system is in the reset mode. If the system is in the reset mode, the value of $\dot{r}$ is integrated back to zero for the same reason indicated supra for the angular accelerations about the X and Y axes. If, on the other hand, the system is not being reset, the next operation is to determine from the stored value in memory 254 whether the main wheels are in a touchdown condition. If the main wheels are in a touchdown condition, the computer ascertains if the tail wheel is locked from the memory location responsive to the discrete input from the trainee's station. If the tail wheel is locked, and since it has been determined that the main wheels are in a touchdown condition, the craft can be assumed as being located on the ground. In consequence, there is zero angular acceleration about the Z axis, and the value of $\dot{r}$ is set to zero.

If the value of $\dot{r}$ is not set to zero, because the main wheels are not in touchdown or the tail wheels are not locked, the computer program examines the stored value of main rotor angular rotation, $\Omega$. If the main rotor angular rotation is less than 5 radians per second, the force exerted by the main rotor is insufficient to cause angular acceleration about the Z axis. In consequence, a determination of main rotor angular rotation, $\Omega$, being less than five radians per second, causes a zero value to be fed to the memory for $\dot{r}$. On the other hand, if main rotor angular velocity is greater than five radians per second, the computer solves the equation for angular acceleration, $\dot{r}$, about the Z axis in response to the computed yawing moment, $N_a$, and the preprogrammed constant moment of inertia about the Z axis, $I_z$, in accordance with:

$$\dot{r} = \frac{N_a}{I_z} \quad (84)$$

In computing the angular accelerations, $\dot{p}$, $\dot{q}_1$ and $\dot{r}$, about the X, Y and Z axes of the helicopter, the two past acceleration values, as well as the presently computed acceleration, are supplied to memory locations. Thereby, integration in accordance with the $0_{33}$ Mod Gurk integration routine is possible to determine the angular velocities $p$, $q_1$ and $r$.

The next three operations of the computer are to determine the rolling rate, $p$; pitching rate, $q_1$ and turning rate, $r$, about the X, Y and Z axes, respectively, of the helicopter. These rates are computed in successive order in response to the stored values thereof for the three previous computation cycles, as well as the previously computed values of the angular accelerations about the X, Y and Z axes. In computing each of the three rates, the values derived during the present cycle, as well as the values derived during the two previous computation cycles, are stored in appropriate memory locations to enable the $0_{33}$ Mod Gurk integration subroutine to be employed. The three angular rates are transferred to a memory location in main computer 81 so that they can be utilized in solving other equations and the turning rate can be fed through digital-to-analog converter 123 to an appropriately designated meter, FIGURE 7, at student station 50.

*Euler angles*

Since the helicopter being simulated is not required to fly in a loop, i.e., to make the longitudinal or X axis thereof execute a circular type path in the vertical plane. Euler angles, instead of direction cosines, are employed for computing orientation of the craft. Because of the inability of the helicopter to fly in a loop, the fuselage pitch angle of the X axis, $\theta_F$, never reaches a value of 90° and cosine $\theta$ never assumes a value of zero. In consequence, the secant $\theta$ term in the Euler angle routine is never undefined. In practice, it has been found that the pitch angle of the X axis is limited to a value of plus or minus 85 degrees.

The general routine utilized for obtaining the Euler angles of the craft involves calculating fuselage heading angle, $\psi_F$; pitch angle, $\theta$, and roll angle, $\varphi_F$, in response to rate of change of heading angle, $\dot{\psi}$; rate of change of pitch angle, $\dot{\theta}$, and rate of change of roll angle, $\dot{\varphi}$. These three rates of change are derived in response to previously computed values of $\psi_F$, $\varphi_F$ and $\theta$, as well as the turning rates, $p$, $q_1$ and $r$. After the three rates of change have been computed, the system goes through three separate $0_{33}$ Mod Gurk integration routines to determine the actual values.

The first step in computing each of: the rate of change of heading angle, $\dot{\psi}$; rate of change of pitch angle, $\dot{\theta}$; and rate of change of roll angle, $\dot{\varphi}$; is to determine if the system is in a reset mode. If the system is in the reset mode, each of the rates of change is integrated to zero, causing the stored values thereof, as well as of $\psi$, $\theta$ and $\varphi$ to be returned to zero. If however, the system is not in a reset mode, the Euler angles are solved by first computing the rate of change of heading angle, $\dot{\psi}$, in response to the turning rate of the fuselage, $r$; the cosine and sine of the fuselage rolling angle, $\cos \varphi_F$ and $\sin \varphi_F$; the fuselage pitching rate, $q_1$; and the cosine of the fuselage pitch angle, $\theta$; in accordance with:

$$\dot{\psi}=(r \cos \varphi_F+q_1 \sin \varphi_F)\frac{1}{\cos \theta} \quad (85)$$

After the rate of change of the heading angle, $\dot{\psi}$, has replaced $\dot{\psi}$ computed three computation periods earlier in the appropriate memory location of auxiliary computer 82, program counter 265 advances to the next step, computation of pitch angle rate of change, $\dot{\theta}$. Pitch angle rate of change is computed in response to the pitching and turning rates of the fuselage, $q_1$ and $r$, as well as the cosine and sine of the rolling rate, $\cos \varphi_F$ and $\sin \varphi_F$, in accordance with:

$$\dot{\theta}=q_1 \cos \varphi_F - r \sin \varphi_F \quad (86)$$

With the rate of change of pitch angle having been computed and stored, the program advances to the next step, computation of the rate of change of roll angle. Rate of change of roll angle, $\varphi$, is computed in response to the stored values of: rate of roll, $p$; rate of change of heading angle, $\dot{\psi}_F$, and the sine of pitch angle, $\sin \theta$; in accordance with:

$$\dot{\varphi}=p+\psi \sin \dot{\varphi}_F \quad (87)$$

Subsequent to the computation and storage of the rate of change of heading angle, $\dot{\psi}$; rate of change of pitch angle, $\dot{\theta}$, and rate of change of roll angle, $\dot{\varphi}$, the computer program is sequenced through the steps of determining: heading angle, $\psi$; pitch angle, $\theta$; and roll angle, $\varphi$. Heading, pitch and roll angles are computed in response ot the three previously stored values thereof, as well as the computed and stored values for the derivatives thereof, in accordance with the $0_{33}$ Mod Gurk integration subroutine. Prior to computing the values of heading, pitch and roll angles, however, the computer, in each instance, determines if the system is in the freeze mode. If the system is in the freeze mode, each of the computations is skipped and the previously stored value is utilized for the calculations. Thereby, the instructor setting the system into the freeze mode prevents the trainee from affecting system performance.

Upon the completion of the roll angle computation, and storage of the two past values thereof in an appropriate memory location, the actual computed value of roll angle is located in a memory position that is coupled to main computer 81 during an inter-computer transfer. Thereby, the value of roll angle, $\varphi$, can be coupled from main computer 81 through digital-to-analog converter 123 to the roll indicator meter at trainee's indicator panel, FIGURE 7. The computer program operation following storage of roll angle is computation of the fuselage pitch angle, $\theta_F$. Fuselage pitch angle is determined by adding a constant, determined by the particular helicopter being simulated and equal to 0.0698 for the SH-3A helicopter, to the computed value of pitch angle, $\theta$. The value of $\theta_F$ is supplied to a memory location in auxiliary computer 82 and is coupled to main computer 81 for display on the pitch indicator meter at student trainee station 50.

The next four operations of auxiliary computer 82 involve computing the sine and cosine of the pitch angle, $\theta$; roll angle, $\varphi_F$; heading angle, $\psi_F$, and wind heading angle, $\psi_W$. These four operations are computed in sequence, with the sine and cosine of the pitch, roll and heading angles being computed in response to the immediately preceding computed values of the angles. The sine and cosine of the wind heading angle are computed in response to the stored value of wind heading angle which is coupled into the auxiliary computer 82 memory 254 from Digiswitches located at the instructor's station 60. The sine and cosine of the four angles being considered are computed in accordance with the subroutines discussed supra. Upon completion of each operation, the cosine of the angle is stored in B register 256 of the auxiliary computer while the sine of the angle is stored in A register 255 prior to being coupled into a designated location in memory matrix 263. After the cosine of the wind heading angle has been computed, the computer program is ready to step to a new operation.

*Ground velocity of the body axes*

The next series of computations deals with determining the velocity of the helicopter being simulated relative to the ground in each of the coordinate directions, which velocities are denominated as $U_G$, $V_G$ and $W_G$, for the X, Y and Z axes of the craft. The accelerations $\dot{U}_G$, $\dot{V}_G$ and $\dot{W}_G$ of the craft relative to the ground for each of the axes is first computed as a function of, among other things, the total force along the particular axis. Upon completion of the computations for the accelerations in each of the three directions, relative to the ground, the velocities in the three directions are determined, utilizing the $0_{33}$ Mod Gurk integration subroutine.

The first step in ascertaining the value of each of $\dot{U}_G$, $\dot{V}_G$ and $\dot{W}_G$ is to determine if the system is in a reset mode. If the system is being reset during the computation cycle being considered, the values of the craft acceleration relative to ground are integrated back to zero, whereby the velocities along the three craft axes, relative to the ground, are likewise returned to zero.

If the computer is not in the reset mode, the rate of change of the craft velocity along the longitudinal axis thereof, i.e., acceleration of the craft along the longitudinal axis relative to the ground, $\dot{U}_G$, is calculated. The acceleration of the craft along the X axis thereof, relative to the ground, is computed as a function of: the ground velocities of the craft in the X and Z directions, $U_G$ and $W_G$; the pitching rate of the craft, $q_1$; the sine of the pitch angle, sin $\theta$; the acceleration due to gravity, $g$; the total force of the craft along the longitudinal axis, $X_a$; and a further value equal to the total mass of the craft, $M_i$. These quantities are combined in accordance with:

$$\dot{U}_G=\frac{X_a}{M_i}-g\sin\theta-W_Gq_1 \qquad (88)$$

Upon completion of the craft acceleration computation, relative to the ground along the X axis, the computed value replaces the value thereof that was stored in memory 254 of auxiliary computer 82 three cycles previously. The auxiliary computer then advances to the next step, computation of helicopter acceleration, $\dot{V}_G$, along the Y axis, i.e., laterally to the craft. The first step in computing lateral acceleration is to determine if the main wheels are in a touchdown condition. If the main wheels are in a touchdown condition, the next computer operation is to determine if the lateral velocity, V, is equal to zero. If the lateral velocity of the craft is not equal to zero while the main wheels are in a touchdown condition, the computer next determines if the lateral velocity is so great as to cause the craft to go into a crash condition. Determination as to whether the craft is in a crash condition or not, is made by ascertaining whether the value of $V_G$ falls within a predetermined boundary, which for the SH-3A is ±7.8 feet per second. If the lateral velocity of the craft is not within these boundaries, a freeze signal is derived by the logic of the auxiliary computer. If the freeze signal is not generated to indicate a crash, $V_G$ is equal to zero, or $V_G$ lies within the predetermined boundary; $\dot{V}_G$ is computed in response to the stored values of: ground velocity in the Y direction, $V_G$; ground velocity in the X direction, $U_G$; turning rate of the fuselage, $r$; a preprogrammed constant equal to acceleration of gravity, $g$; the sine of the roll angle of the fuselage, sin $\varphi_F$; the total force developed along the Y axis of the craft, $Y_a$; the cosine of the fuselage pitch angle, cos $\theta$; and the value indicative of total mass of the helicopter, $M_i$; and:

$$\dot{V}_G=\frac{Y_a}{M_i}+g\cos\theta\sin\varphi_F-U_Gr \qquad (89)$$

After the value for the acceleration of the craft in the Y direction relative to the ground has been computed and stored in the memory location occupied by the same parameter computed and stored three periods in the past, the computer advances to the next program step, computation of the acceleration, $\dot{W}_G$, of the craft in the Z axis, relative to the ground. The acceleration of the craft relative to the Z axis is computed, subsequent to an inspection of the reset flag, in response to the values stored in memory 254 of auxiliary computer 82 indicative of: velocity of the craft in the Z direction relative to the ground, $W_G$; the cosine of the pitch angle, cos $\theta$; the constant equal to the acceleration of gravity, $g$; the cosine of the roll angle of the fuselage, cos $\varphi_F$; the total force developed along the Z axis of the craft, $Z_a$; the total mass of the craft, preprogrammed into the system as a constant, $M_i$; the ground velocity of the craft in the X direction, $U_G$; and the pitching rate of the craft, $q_1$. These factors are combined in accordance with:

$$\dot{W}_G=\frac{Z_a}{M_i}+g\cos\theta\cos\varphi_F+U_Gq_1 \qquad (90)$$

After vertical acceleration relative to ground has been computed and the value thereof stored at the memory location of the same parameter as computed three periods in the past, the computer program steps to the next step.

The next three steps in the computer program involve integrating the accelerations of the craft relative to the ground, along the X, Y and Z axes. Prior to each of the integration steps, the system determines whether a freeze condition is in effect. If a freeze condition is in effect, no integration is performed and the previously computed velocity values are employed in the calculations. If, as is usually the case, the freeze switch has not been activated, the ground velocities along the X, Y and Z coordinates of the craft are determined by integrating the values of $\dot{U}_G$, $\dot{V}_G$ and $\dot{W}_G$, utilizing the $0_{33}$ Mod Gurk integration subroutine. After computation and storage of the velocities of the craft, relative to the ground along the three axes of the helicopter, the computer program goes to the next step.

The next three steps involved in the computer program are determining the relative air velocities of the craft in the air along the X, Y and Z axes, which are respectively denominated as U, V and W. The relative velocity in air of a particular body axis is computed as the sum of the ground velocity along that axis plus the wind velocity along the particular axis, for example, $U=U_G+U_W$. Each of the values for U, V and W is computed in sequence and the values thereof are stored in appropriate memory locations in auxiliary computer 82.

The next computer step is determining the rate of climb of the craft, $\dot{h}$. Prior to calculating the rate of climb of the craft, the computer analyzes the reset flag and if it has a binary one value, indicative of being set, the value of $\dot{h}$ is integrated back to zero. On the other hand, if the system is in a normal operating mode, the computer interrogates the locations in memory 254 where the values of ground velocities, $U_G$, $V_G$ and $W_G$, of the craft in the X, Y and Z directions are located, as well as the locations for: sine and cosine of pitch angle, sin $\theta$ and cos $\theta$ and sine and cosine of roll angle, sin $\varphi_F$ and cos $\varphi_F$. These factors are combined to derive the value for rate of climb in accordance with:

$$\dot{h}=U_G\sin\theta-\cos\theta\,(V_G\sin\varphi_F+W_G\cos\varphi_F) \qquad (91)$$

The value of $\dot{h}$ is stored in a memory location of auxiliary computer 82 that is transferred to main computer 81, whereby rate of climb can be fed via converter 123 to the appropriate meter of FIGURE 7.

After the value for Equation 91 has replaced the stored value of $\dot{h}$ computed three periods previously in memory 254 of auxiliary computer 82, the altitude above sea level, $h$ is computed utilizing the $0_{33}$ Mod Gurk subroutine and adding the integrated quantity derived thereby with the height of the field, $H_F$, inserted by the instructor through the Digiswitches in accordance with:

$$h=H_F+\int\dot{h}\,dt \qquad (92)$$

Of course, the computed value of $\int\dot{h}\,dt$ and $h$ for three computation periods must be stored in the computer memory to enable the $0_{33}$ Mod Gurk subroutine to be performed for evaluating $h$. After the true altitude above sea level, $h$, has been computed, the next step in the computer program involves determining the height of the craft above the field. The height of the craft above the field, H, is computed as the difference of the computed true altitude above sea level height, $h$, minus the preloaded height of the field, $H_F$, $(h-H_F)$. The value of $H_F$ is also transferred back to main computer 81 so that it can be converted to an analog value and displayed on a meter at instructor station 60.

The next step in the computer program is computation of the pressure altitude, $h_p$, a variable controlled by the instructor at station 60 through Digiswitches. The instructor selects a particular barometric pressure, $P_S$, at atmospheric conditions for a particular day being simulated. The pressure selected by the instructor is multiplied by a predetermined constant, −930, and the resulting product is added to a further constant that is combined, in an additive manner, with the computed altitude, $h$, to provide $h_p=h-930\ P_s+27825.6$. The value $h_p$ is fed back to main computer 81 from auxiliary computer 82 and from the main computer it is supplied to digital-to-analog converter 123, whereby the pressure altimeter indicator at the trainee's console or station 50 is deflected.

The next computed factor is the ratio of the air density at the simulated location of the helicopter to the air density at the ground. Air density ratio, $\sqrt{\sigma}$, is varied in response to the value of the pressure altimeter, $h_p$, as well as the position at which the instructor sets the pointer of potentiometer 63. It is to be recalled that the position of potentiometer 63, at instructor station 60, is indicative of air temperature at the field location. Potentiometer 63 is of the linear type and the setting thereof is coupled into the computer as a linear value varying between −1 and +1 for the minimum and maximum settings of the potentiometer slider. The position of potentiometer 63 is represented in several of the following equations as $$f\frac{INST}{5\text{-}2\text{-}1}$$

which function has a value varying between −1 and +1 in a linear manner. In response to the stored values of $h_p$ and $$f\frac{INST}{5\text{-}2\text{-}1}$$

the air density ratio is computed in accordance with:

$$\sqrt{\sigma}=[h_p(.559\times10^{-10}h_p-.1462\times10^{-14})+1]\times\left[1-.05f\frac{INST}{5\text{-}2\text{-}1}\right] \quad (93)$$

After the air density ratio has been computed, the next program step is reached, computation of the outside air temperature, $t°$, where the helicopter is assumed to be located. To calculate outside air temperature, barometric pressure, $h_p$, $$f\frac{INST}{5\text{-}2\text{-}1}$$

and a number of preprogrammed constants are combined in accordance with:

$$t°=15-.00198\ h_p+f\frac{INST}{5\text{-}2\text{-}1}(29.95995-.830025\times10^{-3}h_p) \quad (94)$$

On completion of the calculation and storage of the quantity representing outside air temperature, auxiliary computer 82 goes to the next program step, computation of the ratio of the temperature in the environment in which the helicopter is located relative to the temperature at the airfield. The temperature ratio, $\theta_a$, is computed by adding the stored value of outside air temperature, $t°$, with a constant, as indicated by:

$$\theta_a=.00346\ t°+.9481 \quad (95)$$

The next step in the computer program is to determine the square root of the temperature ratio, $\sqrt{\theta_a}$. Because square rooting is a process requiring a substantial length of time in auxiliary digital computer 82, the value of $\theta_a$ is not square rooted directly, but $\sqrt{\theta_a}$ is determined by multiplying the stored value of outside air temperature, $t°$, with a constant, and adding the product with a further constant, in accordance with:

$$\sqrt{\theta_a}=.00165\ t°+.97525 \quad (96)$$

As with all predetermined constants, the constants in Equation 96 are preloaded to the computer memory from the tape originally applied to the system prior to operation.

The next operation of the computer program is to determine the ratio of the pressure at the altitude of the simulated helicopter to the pressure at the landing field, $\delta$. The pressure ratio, $\delta$, is computed utilizing straightforward techniques as the sum of a polynomial of $h_p$ and $h_p^2$. For efficiency of the program, i.e., to reduce the time required and the amount of storage utilized, the second order polynomial is converted into a single expression involving barometric height, $h_p$, in accordance with:

$$\delta=h_p\ (.4135\times10^{-9}\ h_p-.3529\times10^{-4})+1 \quad (97)$$

Next the computer program computes the density of the air at the simulated location of the helicopter, $\rho$. Air density is a function of pressure altitude, $h_p$, and outside air temperature, $t°$, factors previously computed during the computation cycle being considered. The most straightforward technique for computing air density is a ratio between a second order polynomial of pressure altitude and outside air temperature. To achieve maximum efficiency in the program, the polynomial involving pressure altitude is simplified to the expression given by:

$$\rho=\frac{h_p(.261\times10^{-9}h_p-.2364\times10^{-4})+.68267}{273+t°} \quad (98)$$

The six quantities just computed: air density ratio, $\sigma$; outside air temperature, $t°$; temperature ratio, $\theta_a$; square root of temperature ratio, $\sqrt{\theta_a}$; pressure ratio, $\delta$; and air density, $\rho$, are all utilized in calculating the performance of the helicopter engines. In consequence, each of these factors is stored in memory addresses of auxiliary computer 82 which are transferred back to main computer 81 during an inter-computer transfer. Once transferred back to memory 254 of main computer 81, these six factors are utilized during the next computation cycle when consideration is given to the performance of the two gas turbines driving the helicopter rotor.

*Miscellaneous operations*

The computer program has now advanced to the state where certain factors can be computed which could not previously have been computed because instability would have occurred. Instability would have arisen if these factors were previously determined because it has been found that the computation order with regard to the following factors, must be followed, since the equations describing the motion of a true helicopter in flight are solved in sequence rather than simultaneously. In actual flight of course, a multiplicity of factors simultaneously influence the motion of the helicopter. In a digital simulator, however, these factors cannot be simultaneously performed because of the very nature of the repetitive action of the machine. We have found that by calculating the fuselage air speed and the mean inflow velocity of air coming through the rotor disk as well as the rotor velocity, at the end of the program, that the system will perform substantially as if each of the factors were being considered simultaneously.

In consequence, the next operation in the computer program is computation of the average or mean velocity of air flowing over the rotor disk, $W_{i_{mean}}$. The mean inflow velocity of air over the rotor disk is computed using the values determined during the prior computation period for: total velocity, $V_T$; main rotor lift, $L_{MR}$; and air density, $\rho$; in accordance with:

$$W_{i_{mean}}=\frac{.000177L_{MR}}{\rho V_T} \qquad (99)$$

By utilizing the value for total velocity of the craft, $V_T$, computed during the prior computation cycle, the mean velocity of the air flowing over the rotor disk inherently simulates the time lag between the rate of air flow and craft velocity change.

The next operation in the computer program is determining total velocity of the craft, $V_T$. Total velocity is computed from the velocities in each of the three coordinate directions, U, V and W, as well as functions of mean or average airflow velocity over the rotor disk, $W_{i_{mean}}$. The vertical velocity, W, of the craft and the value for the mean airflow through the rotor disk are translated into functions, the values of which are multiplied together and further multiplied with the constant, as indicated by:

$$V_T=\sqrt{U^2+V^2+\left(W-97.5f\frac{W_{i_{mean}}}{2\text{-}11\text{-}1}f\frac{(W)}{2\text{-}11\text{-}2}\right)^2} \qquad (100)$$

| $W_{i_{mean}}$ | $f\frac{W_{i_{mean}}}{2\text{-}11\text{-}1}$ | $W$ | $f\frac{W}{2\text{-}11\text{-}2}$ |
|---|---|---|---|
| −32 | −.880 | −120 | 1.373 |
| 0 | .000 | −35.7 | .373 |
| 29.14 | .801 | +7.0 | .466 |
| 128.00 | 1.000 | 57.0 | .802 |
| | | 62.0 | .578 |
| | | 79.0 | .709 |
| | | 135.0 | .933 |
| | | 200.0 | 1.000 |

The value for $V_{T_n}$, the total velocity during the particular computation period being considered, is now computed in response to the values for $V_T$ over the last two cycles, $V_{T_{n-1}}$ and $V_{T_{n-2}}$, which are combined in accordance with:

$$V_{T_n}=\frac{1}{2}\left[V_{T_{n-2}}+\left(\frac{V_{T_{n-1}}}{V_{T_{n-2}}}\right)^2\right] \qquad (101)$$

An intermediate calculation in determining the fuselage air speed, $V_T$, is ascertaining the total vertical velocity of the craft relative to the earth, $W_{ADJ}$. Total vertical velocity relative to the earth, the last squared term under the square root sign in Equation 100, is computed and stored in a permanent location in memory 254 of auxiliary computer 82. The value of $W_{ADJ}$ and its square, together with total velocity of the craft, $V_T$, are stored in appropriate memory locations in memory 254 of auxiliary computer 82 for use in subsequent calculations.

The next operation in the computer program is determining the indicated air speed of the craft. Indicated air speed, $V_i$, is a nonlinear function of two variables of helicopter velocity, U, in the X axis. In addition to these two functions, indicated air speed is also a function of total velocity, $V_T$, and air density ratio, $\sigma$. The value of indicated air speed is computed in response to the stored values of these factors in accordance with:

$$V_i=256.8\sqrt{\sigma}\left[-114.285\frac{f\frac{U}{2\text{-}221\text{-}1}}{V_T}-f\frac{U}{2\text{-}221\text{-}2}\right] \qquad (102)$$

| $U$ | $f\frac{U}{2\text{-}221\text{-}1}$ | $f\frac{U}{2\text{-}221\text{-}2}$ |
|---|---|---|
| −80 | 0.00 | 0.00 |
| 0 | 0.001 | 0.00 |
| 60 | .024 | .182 |
| 120 | .206 | .490 |
| 180 | .583 | .798 |
| 240 | 1.000 | 1.000 |
| 300 | 1.000 | 1.000 |

After the value of indicated air speed has been computed in accordance with Equation 102, the needle positions of the air speed indicator, $V_i°$, at trainee station 50 and instructor station 60 are ascertained, utilizing the nonlinear table look-up approach indicated by:

$$V_i°=f\frac{V_i}{2\text{-}222\text{-}1} \qquad (103)$$

| $V_i$ | $f\frac{V_i}{2\text{-}222\text{-}1}$ |
|---|---|
| 0 | 0 |
| 13.5 | 10 |
| 21 | 25 |
| 42 | 100 |
| 53 | 125 |
| 87 | 220 |
| 120 | 270 |
| 150 | 333 |

The function computed in accordance with Equation 103 is supplied to main computer 81 from auxiliary computer 82 during an inter-computer transfer. From the main computer 81, the value of indicated air speed needle position is coupled, in succession, to indicator needles at trainee station 50 and instructor station 60.

The next operation in the computer program is computation of the angular rotational acceleration of the main rotor, $\dot{\Omega}$. Angular acceleration of the main rotor is computed in response to stored values indicative of torques developed by each: of the tail rotor, $Q_{TR}$; the main rotor, $Q_{MR}$; engine one, $Q_{E1}$, and engine two, $Q_{E2}$. These four torques are summed together and combined with constant, preprogrammed values, in accordance with.

$$\dot{\Omega}=\frac{Q_{MR}+Q_{TR}+Q_{E1}+Q_{E2}-1700}{10{,}275} \qquad (104)$$

The computed value for angular acceleration of the main rotor, together with the two past values thereof, are stored in memory 254 of auxiliary computer 82, so that the angular velocity of the rotor, $\Omega$, can be computed utilizing the $0_{33}$ Mod Gurk routine. The value of rotor speed is computed utilizing the integration subroutine, with inputs derived from the present and past values for rotor angular acceleration, as well as rotor angular velocity. The computations for the cycle being considered are now completed. Before proceeding to the next computation cycle, however, it is necessary to update the integration of coefficients of auxiliary computer 82 in the manner described supra for main computer 81.

Upon completion of the integration updating operation, the Digiswitch inputs are inserted into memory 254 of auxiliary computer 82, provided the instructor is inserting initial conditions into the computer. After the Digiswitch information has been coupled to appropriate locations in the auxiliary computer memory, the auxiliary computer routine is complete for the cycle being considered. The auxiliary computer remains in a static state after the last Digiswitch information has been coupled thereto until the initiation of a new computation cycle by cycle timer 134, FIGURE 8. When the new computation cycle begins, the program of auxiliary computer 82 is restarted in the manner described supra, whereby a complete operating cycle occurs once every 62.5 milliseconds.

*Tandem rotor helicopter*

The preceding discussion was concerned solely with the operation of a single rotor helicopter. While the tandem and single rotor helicopters perform in a somewhat similar manner, there are impotrant differences therein. Particularly, the single rotor helicopter accomplishes turning by varying the side thrust of the tail rotor in response to activation by the pilot of the rudder pedals. In a tandem rotor helicopter, however, both rotors rotate at identical speeds in opposite directions in generally horizontal planes. Turning with the tandem rotor helicopter is accomplished by tilting the swash plates of the front and rear rotors in opposite directions so that the rotors exert a turning moment couple on the craft.

The general approach involved in simulating the performance of a tandem rotor helicopter, according to the present invention, is to divide the aerodynamic factors in two main parts, the fuselage aerodynamics, and the rotor aerodynamics. The division of the aerodynamic terms into two parts is different from the approach utilized in the single rotor simulation wherein the aerodynamic considerations were divided into three parts, tail rotor, fuselage, and main rotor. Simulation of the two rotors of a tandem rotor helicopter is accomplished by combining the forces and moments thereof into a single set of equations. The rear rotor effects of the tandem rotor helicopter are mechanized by ratios of the swash plate angles of the front and rear rotors. Hence, only the front rotor is simulated. Consideration is specifically given to the forces and moments arising in a CH–46A tandem rotor helicopter, having overlapping rotors. In consequence, the effects of interference between the two rotors must also be provided.

The general approach to simulation of the tandem rotor helicopter is substantially like that for the single rotor helicopter, except that the tail rotor aerodynamic section of the program for the single rotor helicopter is replaced by other equations. Of course, many predetermined constants utilized in the single rotor computations are replaced with different values in the tandem rotor simulation. The changes in the program equations solved, as well as the constants, are inserted into the computer memory at the beginning of the use thereof. In consequence, the same instructor station, trainee station, and computer, may be utilized for training pilots of both the tandem and single rotor helicopters, with only a change in program being required to shift the mode of operation from one type of helicopter to the other.

*Tandem rotor program*

Except for the deletion of the tail rotor simulation, the program for the tandem rotor helicopter follows substantially the same flow diagram as the single rotor helicopter. The following discussion is directed to those aspects of the program which result in different equations.

The first point of departure between the two programs is in the computation, by main computer 81, of swash plate angles. In the tandem rotor helicopter, it is necessary to consider the angles of the fore and aft swash plates. The collective and lateral swash plate angles for the fore rotor, $A_{0s_{FR}}$, and $A_{1s_{FR}}$, as well as for the aft rotor, $A_{0s_{AR}}$ and $A_{1s_{AR}}$, are computed from: the effective control positions of the cyclic pitch stick 53 in the fore and aft directions as well as in the lateral direction, $\delta_{\theta Fe}$ and $\delta_{\theta Le}$; the effective position of collective pitch stick 51, $\delta_{\theta ce}$; and the effective position of rudder pedals 55, $\delta_{RPe}$. In contrast, the longitudinal swash plate angle for the front rotor, $B_{1s_{FR}}$, is a constant, while the same angle for the aft rotor, $B_{1s_{AR}}$, is computed as a function of $q_x$.

The swash plate angles are computed in response to these variables in accordance with:

$$A_{0s_{FR}}=.0973+.787\ \delta_{\theta ce}+.285\ \delta_{\theta Fe} \quad (105)$$
$$A_{0s_{AR}}=.0973+.787\ \delta_{\theta ce}-.285\ \delta_{\theta Fe}$$
$$A_{1s_{FR}}=.781\ \delta_{\theta Le}+.671\ \delta_{RPe}$$
$$A_{1s_{AR}}=-.652\ \delta_{\theta Le}+.671\ \delta_{RPe}.$$
$$B_{1s_{FR}}=.04887$$

$$B_{1s_{AR}}=-.0087+.0785 f\frac{q_x}{2\text{-}136\text{-}1}$$

| $q_x$ | $f\frac{q_x}{2\text{-}136\text{-}1}$ |
|---|---|
| 0 | 0 |
| 16. 67 | 0 |
| 41. 68 | 1 |
| 100. 0 | 1 |

$$f\frac{q_x}{2\text{-}136\text{-}1}=0 \text{ when } q_x \leq 16.67$$

$$f\frac{q_x}{2\text{-}136\text{-}1}=.04q_x-.6625 \text{ when } 16.67 \leq q_x \leq 41.68$$

$$f\frac{q_x}{2\text{-}136\text{-}1}=1 \text{ when } q_x \geq 41.68$$

Upon computation and storage of the six swash plate angles in main computer 81, main computer 81 advances to the next step, computation of the difference between the various swash plate angles of the fore and aft rotors, $\delta A_{1s}$, $\delta A_{0s}$, and $\delta B_{1s}$. After each of the three swash plate differential angles has been computed, the next step is to determine the ratio between the collective swash plate angles of the aft and front rotors, $$\frac{A_{0s_{AR}}}{A_{0s_{FR}}}$$

After the swash plate ratio has been computed, the main computer advances to the next step, computation of blade flap angle for the main rotor, a calculation that is carried out in precisely the same manner as indicated for the single rotor helicopter discussed supra.

The next operation that differs from the single rotor simulation in the tandem rotor program is calculation of vertical velocity of the blade at each of the twelve blade element stations, $U_{P\psi\text{-}y}$. Vertical velocity at each of the twelve blade stations in the tandem rotor trainer includes the same variables as in the single rotor, except that the pitching rate of the craft, $q_1$, is considered. In consequence, the vertical velocity at any one of the twelve stations is computed as a function of the stored values of: vertical, longitudinal and lateral velocities, W, U and V; rolling rate, $p$; pitching rate, $q_1$; flap angle, $\beta$ ; flap angle rate of change, $\beta_\psi$, and the air inflow velocity over the station being considered, $W_{i\psi\text{-}y}$. These variable, stored quantities are combined with constant inputs indicative of the radial distances from the three radial stations from the position of the flap hinge and the distance from the center of the rotor hub to the flap hinge in accordance with:

$$U_{P\psi\text{-}y}=W-W_{i\ \psi\text{-}y}-y\dot{\beta}_\psi+(e+y)(q_1 \cos\psi + p \sin\psi)-\beta_\psi(U\cos\psi-V\sin\psi)-16.49\ q_1 \quad (106)$$

The next point at which the program for the tandem rotor helicopter deviates from that of the single rotor helicopter is in computation of the rotor lifts. Because a pair of rotors is provided, it is necessary to compute the lifts for both the forward and aft rotors. Computation of the lift for the forward rotor is approximately in accordance with the equation given for computation of lift of the main rotor of the single rotor helicopter, i.e. forward rotor lift is computed from the sum of: the individual azimuth station lifts, $L_\psi$, multiplied by the number of blades divided by the number of azimuth stations and further multiplied by functions of total air speed, $V_T$, and altitude above the ground, H. Lift due to the aft rotor, $L_{AR}$, is computed as a function of: the determined value of the forward rotor lift, $L_{FR}$, multipled by a function of the ratio between the swash plate angles of the aft and forward rotors and functions of velocities, U and V, in the longitudinal and lateral directions; the front rotor collective swash plate angle, $A_{0S}$; rotor angular velocity, $\Omega$; differential collective swash plate angle, $\Delta A_{0S}$; and pitching rate, $q_1$. These quantities are combined to derive the lift of the aft rotor in accordance with:

$$L_{AR}=1.194\ L_{FR}\cdot\frac{A_{0s_{AR}}}{A_{0s_{FR}}}\cdot f\frac{U}{2\text{–}139\text{–}3}\cdot f\frac{V}{2\text{–}139\text{–}4}\cdot f\frac{A_{0s_{FR}}}{2\text{–}139\text{–}5}+f\frac{A_{0s_{FR}}}{2\text{–}139\text{–}6}[L_{FR}+57296\ K\Omega\Delta A_{0s}]+2000q_1 \quad (107)$$

| $U$ | $f\frac{U}{2\text{–}139\text{–}3}$ | $V$ | $f\frac{V}{2\text{–}139\text{–}4}$ | $A_{0sFR}$ | $f\frac{A_{0sFR}}{2\text{–}139\text{–}5}$ | $f\frac{A_{0sFR}}{2\text{–}139\text{–}6}$ |
|---|---|---|---|---|---|---|
| −80 | 0.804 | −80 | 1.000 | 0 | 0 | 1 |
| −35 | ---------- | 0 | 0.959 | .0524 | 0 | 1 |
| 0 | 0.804 | +80 | 1.000 | .157 | 1 | 0 |
| 30 | ---------- | | | .5585 | 1 | 0 |
| 35 | 0.696 | | | | | |
| 70 | ---------- | | | | | |
| 90 | ---------- | | | | | |
| 116 | 0.857 | | | | | |
| 180 | 0.839 | | | | | |
| 300 | 1.000 | | | | | |

The next material deviation in the program between the tandem and single rotor helicopters is in computation of the rotor torques for the fore and aft rotors. Computation of the torque for the fore rotor is along the same lines indicated supra for the single rotor craft, while computation of the aft rotor torque involves multiplying the fore rotor torque by the ratio of the collective swash plate angles between the aft and fore rotors, $$\frac{A_{0s_{AR}}}{A_{0s_{FR}}}$$

In addition, computation of the aft rotor torque is a function of the lateral and vertical velocities, U and V, of the craft. The quantities involved in the computation of aft rotor torque are coupled from memory 254 of main computer 81 to the arithmetic unit 251 thereof in accordance with:

$$Q_{AR}=\frac{A_{0s_{AR}}}{A_{0s_{FR}}}\cdot Q_{FR}\cdot f\frac{V}{2\text{–}138\text{–}2}+K_1\cdot f\frac{W}{2\text{–}138\text{–}4}$$

$$K_1=27{,}796 \quad (108)$$

| $V$ | $f\frac{V}{2\text{–}138\text{–}2}$ | $W$ | $f\frac{W}{2\text{–}138\text{–}4}$ |
|---|---|---|---|
| −80 | .924 | 0 | 0 |
| 0 | 1.0 | 10 | 0 |
| 80 | .924 | 200 | 1.00 |

The next departure between the program for the single and tandem rotor helicopters is in the calculation of the total rotor forces, $F_{x_{AR}}$ and $F_{y_{AR}}$, along the longitudinal and lateral axes of the tandem helicopter due to the aft rotor. The force along the X or longitudinal axis of the craft due to the aft rotor is computed as a function of the force along the X axis due to the front rotor, $F_{x_{FR}}$, as well as functions of the craft velocity along the longitudinal axis, U; the rotor rotational velocity, $\Omega$; and the differential between the longitudinal swash plate angles of the fore and aft rotors, $\Delta B_{1S}$. These quantities are combined to derive the total force due to the aft rotor along the longitudinal axis in accordance with:

$$F_{X_{AR}}=F_{X_{FR}}+17200\ f\frac{U}{2\text{–}140\text{–}1}\cdot f\frac{V}{2\text{–}140\text{–}2}\cdot f\frac{\Omega}{2\text{–}141\text{–}3}\cdot\Delta B_{1s}\cdot K\Omega \quad (109)$$

| $U$ | $f\frac{U}{2\text{–}140\text{–}1}$ | $V$ | $f\frac{V}{2\text{–}140\text{–}2}$ | $\Omega$ | $f\frac{\Omega}{2\text{–}141\text{–}3}$ |
|---|---|---|---|---|---|
| −80 | .766 | −80 | 1 | 0 | 0 |
| 0 | 1.00 | +80 | .496 | 20 | 1 |
| 110 | .766 | | | 26.077 | 1 |
| 300 | .693 | | | 27.681 | .7143 |
| | | | | 35 | .7143 |

The lateral force, $F_{y_{AR}}$, due to the aft rotor is computed in a somewhat similar manner in response to the lateral $F_{x_{FR}}$; and the force due to the aft rotor along the X axis velocity of the craft along the longitudinal and lateral axes, U and V; the rotor angular velocity, $\Omega$; and the differential lateral swash plate angle, $\Delta A_{1S}$. The variables and constants utilized in computation for the lateral aft rotor force are combined from memory 254 in main computer 81 in accordance with:

$$F_{y_{AR}}=F_{y_{FR}}+20600f\frac{U}{2\text{–}141\text{–}1}\cdot f\frac{V}{2\text{–}141\text{–}2}\cdot f\frac{\Omega}{2\text{–}141\text{–}3}\cdot\Delta A_{1s}\cdot K\Omega \quad (110)$$

| $U$ | $f\frac{U}{2\text{–}141\text{–}1}$ | $V$ | $f\frac{V}{2\text{–}141\text{–}2}$ |
|---|---|---|---|
| −80 | .45 | −80 | 1.0 |
| 0 | 1.00 | 0 | .43 |
| 55 | .45 | 80 | 1.0 |
| 207 | .886 | | |
| 300 | 1.00 | | |

The next deviation in the programs between the tandem and single rotor helicopters involves computation of the aft rotor rolling and pitching moments, $7_{AR}$ and $M_{AR}$, respectively. The aft rotor rolling moment is simply a constant times the previously computed force of the aft rotor in the Y direction ($7_{AR}=7.65F_{yAR}$), while the aft rotor pitching moment is the algebraic sum of a constant times the force in the X direction due to the aft rotor $F_{x_{AR}}$, plus the product of a second constant with the lift, $L_{AR}$, due to the aft rotor ($-M_{AR}=8.377F_{x_{AR}}+16.49L_{AR}$).

The next deviation between the programs of the two helicopters involves calculating the rolling moment of the aft rotor hub, $7_{ARH}$. The aft rotor hub rolling moment is computed by adding the previously determined value of the front rotor hub rolling moment, $7_{FRH}$, with a function of rotor angular velocity, $\Omega$, and the difference between the swash plate angles of the fore and aft rotors. These stored quantities are combined to determine the aft rotor hub rolling moment in accordance with:

$$7_{ARH}=7_{FRH}+35{,}000(\Delta A_{1S})K\Omega$$
$$K\Omega=1 \text{ when } \Omega\geqq 20 \quad (111)$$
$$K\Omega=0 \text{ when } \Omega<20$$

The remaining calculations for the tandem rotor helicopter in main computer 81 are substantially the same as for the single rotor helicopter, hence need not be described.

Consideration is now given to the distinction between the equations solved by auxiliary computer 82 for the single tandem rotor helicopters. The first material deviation between the programs of the two helicopters in auxiliary computer 82 is concerned with determining the fuselage forces along each of the axes of the craft and the rolling and yawing moments. These calculations are effected by the inclusion of the forces and moments resulting from simulation of the aft rotor of the tandem rotor helicopter. In particular, computation of the longitudinal force, $X_F$, exerted on the helicopter fuselage is a function of the total relative vertical velocity of the craft, $W_{ADJ}$; the longitudinal velocity thereof, U; the absolute value of total relative vertical velocity, $|W_{ADJ}|$; the lateral velocity of the craft squared, $V^2$; the absolute value of the lateral velocity, $|V|$; the lateral velocity, V; the absolute value of the longitudinal velocity, $|U|$; and the air density, $\rho$, of the area in which the simulated helicopter is assumed to be located. Auxiliary computer 82 feeds these eight quantities from its memory 254 to arithmetic unit 251 where they are combined to derive the fuselage longitudinal force in accordance with:

$$X_F=\rho\{-16.5U|U|+50V^2-1195|V| -12|U|W_{ADJ}+[5.7K_1W_{ADJ} -7.25W_{ADJ}][.37|V||W_{ADJ}|-.004V^2|W_{ADJ}|]\} \quad (112)$$

$$K_1=1.0 \text{ if } W_{ADJ}>0$$

$$K_1=0 \text{ if } W_{ADJ}\leq 0$$

Substantially the same parameters which are utilized to solve Equation 112 are fed from memory 254 of auxiliary computer 82 to the auxiliary computer arithmetic unit 251 to determine the fuselage vertical and lateral forces, $Z_F$ and $Y_F$, in accordance with Equations 113 and 114, respectively:

$$Z=\rho\{47.78U^2[K_{12}-1.3378]-172003K_{12} +37.3V^2-2061|V|-84U|W_{ADJ}| -3.04V^2W_{ADJ}-60.13|V|W_{ADJ} -71.8|W_{ADJ}|W_{ADJ}+29.1U^2K_{11}\} \quad (113)$$

$$K_{11}=1.0 \text{ if } U<0$$

$$K_{11}=0 \text{ if } U\geq 0$$

$$K_{12}=1 \text{ when } U<60$$

$$K_{12}=0 \text{ when } U\geq 60$$

$$Y_F=-512V \text{ when } |V|\leq 10$$

$$Y_F=-44V+4680 \text{ when } V<-10 \quad (114)$$

$$Y_F=44V-4680 \text{ when } V>10$$

Upon completion of the computation and storage of the fuselage lateral force, $Y_F$, the same variables are again combined to determine the fuselage rolling and yawing moments, $7_F$ and $N_F$, in accordance with:

$$7_F=\rho\Big\{-25U^2-231|V|V+5979V-25.1W_{ADJ}^2+ [202.2W_{ADJ}^2-25267|W_{ADJ}|]f\frac{V}{2\text{–}103\text{–}1}K_2+ 154.33\left[U^2f\frac{V}{2\text{–}103\text{–}2}-185.12Uf\frac{V}{2\text{–}103\text{–}3}\right]\Big\} \quad (115)$$

$$K_2=1.0 \text{ if } W_{ADJ}\leq 0$$

$$K_2=0 \text{ if } W_{ADJ}>0$$

| $V$ | $f\frac{V}{2\text{–}103\text{–}1}$ | $f\frac{V}{2\text{–}103\text{–}2}$ | $f\frac{V}{2\text{–}103\text{–}3}$ |
|---|---|---|---|
| −80 | −.9015 | 1.0 | 1.0 |
| −40 | −.6241 | ---------- | ---------- |
| −30 | −.5173 | ---------- | ---------- |
| −25 | ---------- | .2011 | .0596 |
| −20 | −.2691 | ---------- | ---------- |
| −10 | −.448 | ---------- | ---------- |
| 0 | 0 | 0 | 0 |
| 10 | +1.0 | ---------- | ---------- |
| 20 | +.6019 | ---------- | ---------- |
| 25 | ---------- | −.1031 | .0230 |
| 30 | +.5173 | ---------- | ---------- |
| 40 | +.6241 | ---------- | ---------- |
| 80 | +.9015 | −.8559 | −.5570 |

$$N_F=\{36.U^2-907V|V|+12887V+35.5W_{ADJ}^2 +1.75VU[2.4|V|-428] -VW_{ADJ}[K_2(17.8W_{ADJ}+428) +K_1(6.7W_{ADJ}-101)]\} \quad (116)$$

$$K_1=1.0 \text{ if } W_{ADJ}>0$$

$$K_1=0 \text{ if } W_{ADJ}\leq 0$$

$$K_2=1.0-K_1$$

The next material difference between the programs in auxiliary computer 82 between the two helicopter simulations is in calculating the turning moment of the aft rotor, $N_{AR}$. Calculation of $N_{AR}$ involves forming the product of the force of the aft rotor along the lateral axis of the craft and a constant, ($N_{AR}=16.49F_{yAR}$). The rotor turning moment calculations are accomplished subsequently to transfer of the rotor computations from main computer 81 to auxiliary computer 82, whereby the rotor turning moments are formed from the rotor calculations performed during the computation cycle being considered, rather than a prior computation cycle.

The next area in which the program for the tandem rotor helicopter differs from that of the single rotor helicopter is in computing the total forces and moments exerted on the craft. In computing the total forces and moments on the craft, of course, the forces and moments due to the aft rotor must be considered. In consequence, the total longtudinal force, $X_a$, is computed as a function of the aft rotor lift, $L_{AR}$; landing gear longitudinal force, $X_{LG}$; fuselage longitudinal force, $X_F$; the force due to the front rotor along the longitudinal axis of the craft, $F_{xFR}$; and the force due to the aft rotor along the X axis of the craft, $F_{yAR}$. These four variables, stored in memory 254 of the auxiliary computer 82, are combined in the auxiliary computer arithmetic unit 251 to derive the value for total longitudinal force in accordance with:

$$X_a=X_E+X_{LF}+F_{xFR}+F_{xAR}-0.0436L_{AR} \quad (117)$$

The total side or lateral force is next computed in auxiliary computer 82 by linearly summing the stored values for the lateral force exerted on the fuselage, $Y_F$; the lateral force of the fore and aft rotors, $F_{yFR}$ and $F_{yAR}$, as indicated by:

$$Y_a=Y_F+F_{yAR}+F_{yAR} \quad (118)$$

The total down force being exerted on the tandem rotor helicopter is now computed by summing the downward force, $Z_F$, being exerted on the fuselage and the downward force being exerted on the landing gear, $Z_{LG}$, and subtracting this sum from the combined lifts of the fore and aft rotors, ($L_{AR}+L_{FR}$), in accordance with:

$$Z_A=Z_F+Z_{LG}-(L_{AR}+L_{FR}) \quad (119)$$

The next program step in auxiliary computer 82 during the tandem rotor helicopter simulation is calculation of the total pitch moment, $M_a$, exerted on the craft. Total pitch moment is computed as a function of the total down force exerted on the craft, $Z_a$; a preprogrammed constant equal to the center of gravity of the craft, $dx$; landing gear pitching moment, $M_{LG}$; pitching rate, $q_1$; and the pitching moments of the fore and aft rotors, $M_{FR}$ and $M_{AR}$. These stored values are combined to derive the total pitching moment in accordance with:

$$M_a=Z_adx+M_{FR}+M_{AR}+M_{LG}-1024q_1 \quad (120)$$

The next operation is to calculate the total rolling moment of the craft, $7_a$. Total rolling moment is derived as a function of the torque of the aft rotor, $Q_{AR}$; the landing gear rolling moment, $7_{LG}$; the fuselage rolling moment, $7_F$; the rolling moments of the aft and fore rotor hubs, $7_{ARH}$ and $7_{FRH}$; and the rolling moments of the front and aft rotors, $7_{FR}$ and $7_{AR}$. These parameters are combined in arithmetic unit 254 of auxiliary computer 82 to derive the value for total rolling moment in accordance with:

$$7_a=7_{AR}+7_{FR}+7_{FRH}+7_{ARH}+7_F+7_{LG}+.0436Q_{AR} \quad (121)$$

The next step in the auxiliary computer 82 tandem rotor program is computation of total yaw moment, $N_a$. Total yaw moment is computed as a function of total side force, $Y_a$; the preprogrammed center of gravity of the craft, *dx*; the tail wheel turning moment, $N_{TW}$; the landing gear turning moment, $N_{LG}$; the turning moments due to the fore and aft rotors, $N_{FR}$ and $N_{AR}$; the turning moment due to the fuselage, $N_F$; and the torques developed by the fore and aft rotors, $Q_{FR}$ and $Q_{AR}$. These quantities, previously stored in memory 254 of auxiliary computer 82, are combined in arithmetic unit 251 of the auxiliary computer to derive the total yaw moment in accordance with:

$$N_a = Y_a dx + N_F - Q_{FR} + Q_{AR} + N_{LG} + N_{FR} + N_{AR} - N_{TW} \quad (122)$$

The last segment of the auxiliary computer 82 program for the tandem rotor helicopter that differs from the program of the single rotor helicopter involves computation of the average velocity induced by the air flow over the aft rotor, $$W_{i_{mean_{AR}}}$$

The averaged induced velocity of the aft rotor is computed in response to the lift, $L_{AR}$, of the aft rotor and the product of air density, $\rho$, and a function of true velocity, $V_T$. These variables are combined to derive the average induced velocity due to airflow over the aft rotor in accordance with:

$$W_{i_{mean_{AR}}} = \frac{.00028 L_{AR}}{\rho f \frac{V_T}{2\text{-}185\text{-}3}} \quad (123)$$

| $V_T$ | $f \frac{V_T}{2\text{-}185\text{-}3}$ |
|---|---|
| $V_T$ 5 | 5 |
| $V_T$ 5 | $V_T$ |

After the average induced velocity due to airflow through the aft rotor has been computed, the next step in the program of auxiliary computer 82 is to determine the weighted average of the induced velocities of both rotors, $W_{i_{AV}}$, that results from their overlapping relation. The weighted average of the induced velocity of the air through both rotors is computed as a function of longitudinal velocity, U, and the mean induced velocities, of the fore and aft rotors in accordance with:

$$W_{i_{mean_{FR}}}$$

and $$W_{i_{mean_{AR}}}$$

$$W_{i_{AV}} = W_{i_{mean_{FR}}} \cdot f \frac{U}{2\text{-}185\text{-}1} + W_{i_{mean_{AR}}} \cdot f \frac{U}{2\text{-}185\text{-}2}$$

$$f \frac{U}{2\text{-}185\text{-}1} = 0.01U + 0.5 \quad f \frac{U}{2\text{-}185\text{-}2} = 1 - f \frac{U}{2\text{-}185\text{-}1} \quad (124)$$

The auxiliary computer is now ready to determine the angular acceleration of each rotor, which is the same for both rotors since they are geared together. Angular acceleration of the rotors, $\dot{\Omega}$, is computed in response to stored values indicative of the torques developed by engines 1 and 2, $Q_{E1}$ and $Q_{E2}$, as well as the torques of the fore and aft rotors, $Q_{FR}$ and $Q_{AR}$, in accordance with:

$$\dot{\Omega} = \frac{Q_{FR} + Q_{AR} + .955(Q_{E1} + Q_{E2})}{7500} \quad (125)$$

7500

*Conclusion*

It should now be apparent that there has been described herein a digital helicopter trainer wherein the forces and moments arising from the motion of the generally horizontally disposed rotor blades are considered. The manner in which the trainer functions, during typical computations cycles, has been described for both the single and tandem rotor devices.

While we have described and illustrated one specific embodiment of our invention, it will be clear that variations of the details of construction which are specifically illustrated and described may be made without departing from the true spirit and scope of the invention as defined in the appended claims. For example, in at least one embodiment actually constructed and sold, many additional parameters were simulated. Exemplary of the additional parameters simulated are radio aids, automatic stabilization equipment, simulation of folded blade conditions, simulation of fuel expenditure, simulation of transmission oil temperature and pressure, as well as hydraulic pressures and radar equipment. To minimize the length of the disclosure and simplify the presentation, these factors are not included herein.

We claim:

1. A system for training pilots of rotary wing aircraft, said system comprising a trainee station, including means for deriving first and second analog responses indicative of simulated signals for the cyclic pitch changes of the wing along the longitudinal and lateral axes of the aircraft, means for deriving a third analog response indicative of a simulated signal for the collective pitch angle of the wing, and a plurality of indicators for aerodynamic characteristics of the aircraft;

means for converting each of said analog responses to a digital signal;

a digital computer responsive to said digital signals for computing aerodynamic characteristics, including effects due to the rotary wing, of the aircraft; and means responsive to computations of said computer for feeding signals indicative of some of the computed aerodynamic characteristics to said indicators.

2. The trainer of claim 1 wherein said trainee station further includes: rudder pedal means, means responsive to said rudder pedal means for deriving a fourth response; means for converting said fourth response to a digital signal; and means for feeding the digital signal deriving from to said fourth response to said computer.

3. The trainer of claim 2 including means for periodically activating said digital computer to compute repetitively said aerodynamic characteristics.

4. The trainer of claim 3 including means responsive to said periodic activating means for feeding said digital signals to said computer during each of the periods the computer computes said aerodynamic characteristics.

5. The trainer of claim 4 further including means for at will preventing said responses from being fed as said digital signals to said computer while enabling the computer to continue periodically computing aerodynamic characteristics with the responses previously fed thereto.

6. The trainer of claim 5 further including means for deriving a freeze signal in response to said computer deriving predetermined output responses; and means for activating said preventing means in response to said freeze signal.

7. The training system of claim 5 further including an instructor station, said instructor station including: means responsive to said computer for displaying simulated aircraft responses derived by said computer, and manual means for deriving a freeze signal; and means for activating said preventing means in response to said freeze signal.

8. The trainer of claim 5 further including means responsive to said computer for deriving a first freeze signal in response to said computer deriving predetermined output responses; an instructor station, said instructor station including: means responsive to said computer for displaying said simulated responses, and manual means for deriving a second freeze signal; and means for activating said preventing means in response to either of said freeze signals.

9. The trainer of claim 5 further including means for activating said computer to erase the cumulated effects of said responses to reset the craft to a predetermined location.

10. The trainer of claim 2 further including means for at will preventing said responses from being fed as said digital signals to said computer while enabling the computer to continue computing aerodynamic characteristics with the responses previously fed thereto.

11. The trainer of claim 10 further including means for activating said computer to erase the cumulated effects of said responses to reset the craft to a predetermined location.

12. The trainer of claim 2 further including means for activating said computer to erase the cumulated effects of said responses to reset the craft to a predetermined location.

13. The trainer of claim 1 wherein each of said response deriving means includes a separate transducer for deriving an analog signal, said means for converting comprises: a single analog-to-digital converter, means for sampling said analog signals and for applying one of the analog signals at a time to said analog-to-digital converter so that said converter derives a plurality of digital input signals at different times, and means for applying each of said digital input signals separately to said computer.

14. The trainer of claim 13 including means for periodically activating said digital computer to compute said aerodynamic characteristics, and means for feeding all of said digital input signals to said computer during each activation period of said computer.

15. The trainer of claim 1 wherein said computer computes said effects in response to the computation of forces and moments at a plurality of discrete points along the path of the rotary wing.

16. The trainer of claim 15 wherein said computer computes said forces and moments in response to coefficients of lift.

17. In a system for training personnel to operate equipment, a trainee station including simulated control means for operating said equipment, means for deriving command signals in response to actuation of said simulated control means, and means for indicating the simulated performance of the equipment;

a computer responsive to said command signals for computing responses of said equipment to said actuation of said simulated control means;

means responsive to the equipment responses computed by said computer for feeding further signals indicative of said computed equipment responses to said indicating means; and means for at will preventing said command signals from being fed to said computer while enabling the computer to continue computing said equipment responses to the command signals previously fed thereto.

18. The training system of claim 17 including means for periodically activating said computer to repetitively compute said equipment responses, and means responsive to said periodic activating means for normally feeding said command signals to said computer during each computer activation period.

19. The training system of claim 18 wherein said computer is of the digital type and said command signals are derived as analog responses; and further including means for converting said analog responses to digital signals, and means for feeding said digital signals to said computer.

20. The training system of claim 19 wherein said digital signal feeding means includes said preventing means.

21. The training system of claim 20 further including means responsive to predetermined states of said computed responses for deriving a freeze signal, and means for activating said preventing means in response to said freeze signal.

22. The training system of claim 20 further including an instructor station, said instructor station including: means responsive to said computer for displaying said simulated responses, and manual means for deriving a freeze signal; and means for activating said preventing means in response to said freeze signal.

23. The training system of claim 20 further including means responsive to predetermined states of said computed responses for deriving a first freeze signal; an instructor station, said instructor station including: means responsive to said computer for displaying said simulated responses, and manual means for deriving a second freeze signal; and means for activating said preventing means in response to either of said freeze signals.

24. The training system of claim 17 further including means responsive to predetermined states of said computed responses for deriving a freeze signal, and means for activating said preventing means in response to said freeze signal.

25. The training system of claim 17 further including an instructor station, said instructor station including: means responsive to said computer for displaying said simulated responses, and manual means for deriving a freeze signal; and means for activating said preventing means in response to said freeze signal.

26. The training system of claim 17 further including means responsive to predetermined states of said computed responses for deriving a first freeze signal; an instructor station, said instructor station including: means responsive to said computer for displaying said simulated responses, and manual means for deriving a second freeze signal; and means for activating said preventing means in response to either of said freeze signals.

27. A system for training personnel to fly rotary wing aircraft comprising a student station, said student station including: a simulated collective pitch controller for said wing, and a simulated cyclic lateral and longitudinal pitch controller; means responsive to said controllers for deriving digital input signals in response to the positions of said controllers; a digital computer including digital signal storing means, said computer being responsive to each of said digital input signals for deriving and storing digital signals indicative of the simulated forces along the lateral and longitudinal axes of a simulated rotary wing aircraft due to said wing, said computer including means responsive to said stored signals for deriving a further digital signal indicative of the simulated velocity of said aircraft; and means responsive to said further digital signal for providing an analog indication of said simulated velocity.

28. The system of claim 27 wherein said digital signal indicative of simulated longitudinal force is derived in response to said computer deriving and storing signals indicative of the simulated wing flap angle, lift and drag at a plurality of azimuth locations about the path of the simulated wing.

29. The system of claim 28 wherein the digital signal indicative of lift at each of said plurality of azimuth stations is derived in response to stored digital signals indicative of coefficient of lift and blade tangential velocity at a plurality of radial stations along the azimuth location.

30. The system of claim 29 wherein the digital signal indicative of blade tangential velocity at each of said stations is derived in response to stored digital signals indicative of: the radial and azimuth location of the station, the rotary velocity of said wing, and the lateral and longitudinal velocities of the craft.

31. The system of claim 29 wherein the digital signal indicative of coefficient of lift at each of said stations is derived in response to stored digital signals of a predetermined constant and the angle of attack of said wing at the station.

32. The system of claim 31 wherein the digital signal indicative of angle of attack at each of said stations is derived in response to stored digital signals indicative of the pitch angle and inflow angle of said wing at the station.

33. The system of claim 32 wherein the digital signal indicative of inflow angle at each of said stations is derived in response to stored digital signals indicative of the vertical and tangential velocities of the wing at the station.

34. The system of claim 33 wherein the digital signal indicative of vertical velocity at each of said stations is derived in desponse to stored digital signals indicative of: the vertical, lateral and longitudinal velocities of said craft, the vertical velocity of the wing at the station; the flap angle position and velocity of the wing at the azimuth location for the station; the dynamic rates of rotation of the aircraft about the longitudinal and lateral axes; and the inflow velocity of air at said station.

35. The system of claim 34 wherein the digital signal indicative of inflow velocity of air at each of said stations is derived in response to stored digital signals indicative of: the mean velocity of air over the entire path covered by said wing, and the lateral and longitudinal velocities of said aircraft.

36. The system of claim 28 wherein the digital signal indicative of lift at each of said plurality of azimuth stations is derived in response to stored digital signals indicative of coefficient of lift and blade tangential velocity at the azimuth location.

37. The system of claim 36 wherein the digital signal indicative of blade tangential velocity at each of said stations is derived in response to stored digital signals indicative of: the radial and azimuth location of the station, the rotary velocity of said wing, and the lateral and longitudinal velocities of the craft.

38. The system of claim 36 wherein the digital signal indicative of coefficient of lift at each of said stations is derived in response to stored digital signals of a predetermined constant and the angle of attack of said wing at the station.

39. The system of claim 38 wherein the digital signal indicative of angle of attack at each of said stations is derived in response to stored digital signals indicative of the pitch angle and inflow angle of said wing at the station.

40. The system of claim 39 wherein the digital signal indicative of inflow angle at each of said stations is derived in response to stored digital signals indicative of the vertical and tangential velocities of the wing at the station.

41. The system of claim 40 wherein the digital signal indicative of vertical velocity at each of said stations is derived in response to stored digital signals indicative of: the vertical, lateral and longitudinal velocities of said craft; the vertical velocity of the wing at the station; the flap angle position and velocity of the wing at the station; the dynamic rates of rotation of the aircraft about the longitudinal and lateral axes; and the inflow velocity of air at said station.

42. The system of claim 41 wherein the digital signal indicative of inflow velocity of air at each of said stations is derived in response to stored digital signals indicative of: the mean velocity of air over the entire path covered by said wing, and the lateral and longitudinal velocities of said aircraft.

43. The system of claim 28 wherein the digital signal indicative of drag at each of said plurality of azimuth stations is derived in response to stored digital signals indicative of: air density; coefficients of drag and lift at a plurality of radial stations along the azimuth location; and the tangential and vertical velocities of said wing at said radial stations.

44. The system of claim 28 wherein the digital signal indicative of drag at each of said plurality of azimuth stations is derived in response to stored digital signals indicative of: air density; coefficients of drag and lift at a radical station along the azimuth location; and the tangential and vertical velocities of said wing at said radial station.

45. The system of claim 28 wherein the signal indicative of flap angle at each of said plurality of azimuth stations is derived in response to stored digital signals indicative of: the longitudinal and lateral flapping angles of said wing; the rotational velocity of said wing; and the relative angle at each station to a reference.

46. The system of claim 45 wherein said longitudinal and lateral flapping angles are derived in response to stored digital signals indicative of the roll rates of the craft about its lateral and longitudinal axes, and the sum of the flapping moments of the wing at each of the azimuth stations.

47. The system of claim 27 wherein said digital signal indicative of simulated lateral force is derived in response to said computer deriving and storing digital signals indicative of the simulated wing drag, flap angle and lift at a plurality of azimuth locations about the path of the simulated wing.

48. A system for training personnel to fly rotary wing aircraft comprising a student station, said student station including: a simulated collective pitch controller for said wing, and a simulated cyclic lateral and longitudinal pitch controller; means responsive to said controllers for deriving digital input signals in response to the positions of said controllers; a digital computer including digital signal storing means, said computer being responsive to each of said digital input signals for deriving a digital signal indicative of the simulated lift on a simulated aircraft due to said wing, said computer including means responsive to said stored digital lift signal for deriving and storing a digital signal indicative of the vertical force of the wing on the craft and for deriving, in response to the lift signal, further digital signals indicative of the altitude and rate of change of altitude of said craft; and means responsive to said further digital signals for providing analog indications of altitude and rate of change of altitude.

49. The system of claim 48 wherein the digital signal indicative of lift is derived in response to stored digital signals indicative of the sum of the individual lifts at a plurality of azimuth stations about the path of the simulated wing.

50. The system of claim 49 wherein the digital signal indicative of lift at each of said plurality of azimuth stations is derived in response to stored digital signals indicative of coefficient of lift and blade tangential velocity at the azimuth location.

51. A system for training pilots of rotary wing aircraft comprising: a student station, said student station including: a simulated cyclic pitch controller for deriving a pair of responses, a simulated collective pitch stick for deriving a third response, and an indicated air speed indicator; a digital computer; means responsive to said responses for driving digital input signals indicative of each response for said computer; said computer including: digital memory means responsive to said digital input signals, and arithmetic means responsive to signals stored in said memory means for deriving signals indicative of longitudinal velocity of the craft and true air velocity of the craft, means for feeding the latter two signals to said memory and means for feeding said signals indicative of longitudinal and true velocities to said arithmetic means for deriving a digital signal indicative of indicated air speed; and means responsive to the digital signal indicative of indicated air speed for driving said indicator.

52. The system of claim 51 wherein said computer derives the signal indicative of longitudinal velocity in response to stored digital signals indicative of: force along the longitudinal axis, pitch angle and pitch rate of the fuselage, and the velocity of the craft in the vertical plane.

53. The system of claim 51 wherein said computer derives the signal indicative of longitudinal velocity in response to stored digital signals indicative of force of the rotary wing along the longitudinal axis, wherein the longitudinal force of the rotary wing is derived by said arithmetic means in response to stored signals in said memory indicative of the drag, flap angle and lift of the rotary wing.

54. The system of claim 51 wherein said computer derives the signal indicative of longitudinal velocity in response to stored digital signals indicative of force of the rotary wing along the longitudinal axis, wherein the longitudinal force of the rotary wing is derived by said arithmetic means in response to stored signals in said memory indicative of the drag, flap angle and lift of the rotary wing at a plurality of azimuth locations about the wing.

55. The system of claim 51 wherein said rotary wing aircraft is a helicopter having a main rotor as the rotary wing and a torque controlling tail rotor mounted in the vertical plane; said student station further including simulated rudder controller means for deriving another response; means responsive to said another response for deriving another digital signal; means for feeding said another digital signal to said computer; wherein said computer derives the signal indicative of longitudinal velocity in response to a stored signal indicative of the force of the tail rotor along the lateral axis of the craft.

56. The system of claim 55 wherein the computer derives the signal indicative of the lateral force of the tail rotor in response to stored values indicative of the tail rotor: angular velocity, pitch angle, lateral, vertical velocity and longitudinal velocity.

57. The system of claim 51 wherein said rotary wing aircraft is a helicopter having a main rotor as the rotary wing and a torque controlling tail mounted in the vertical plane; said student station further including simulated rudder controller means for deriving another response; means responsive to said another response for deriving another digital signal; means for feeding said another digital signal to said computer; wherein said computer derives the signal indicative of longitudinal velocity in response to a stored signal indicative of: the force of the tail rotor along the lateral axis of the craft, the force of the main rotor along the longitudinal axis, the pitch angle and pitch rate of the fuselage.

58. The system of claim 51 wherein said rotary wing aircraft is a helicopter having a pair of main rotors; said student station further including simulated rudder controller means for deriving another response; means responsive to said another response for deriving another digital signal; means for feeding said another digital signal to said computer; wherein said computer derives the signal indicative of longitudinal velocity in response to a stored signal indicative of the forces of both of said rotors along the longitudinal axis of the craft.

59. The system of claim 58 wherein said computer computes the forces of said rotors in response to stored signals indicative of the difference in the swash plate angles of said rotors, said difference in the swash plate angles being derived in response to the stored signals corresponding with said another digital signal.

60. The system of claim 51 wherein said rotary wing aircraft is a helicopter having a pair of main rotors; said student station further included simulated rudder controller means for deriving another response; means responsive to said another response for deriving another digital signal; means for feeding said another digital signal to said computer; wherein said computer derives the signal indicative of longitudinal velocity in response to a stored signal indicative of: the forces of both of said rotors along the longitudinal axis of the craft, fuselage pitch angle and pitch rate.

61. A system for training pilots of rotary wing aircraft comprising: a student station, said student station including: a simulated cyclic pitch controller for deriving a pair of responses and a simulated collective pitch stick for deriving a third response, a rotor speed indicator; a digital computer; means responsive to said responses for deriving digital input signals indicative of each response for said computer; said computer including: digital memory means responsive to said digital input signals, and arithmetic means responsive to signals stored in said memory means for deriving digital signals indicative of the torques of said rotor and an engine driving said rotor, the signal indicative of the engine torque being derived in response to stored digital signals indicative of the speed of the engine drive shaft and the engine power factor.

62. The system of claim 61 wherein the student station includes a simulated throttle controller means for deriving another response; means responsive to said another response for deriving another digital signal; means for feeding said another digital signal to said computer; wherein said computer derives the signal indicative of power factor in response to stored digital signals indicative of said another digital signal and the speed of the engine.

63. A helicopter simulator for training students pilots, comprising a student station including continuously variable means simulating the longitudinal, lateral, vertical, and directional flight control mechanisms or any one or combinations thereof, aboard an actual helicopter of the type simulated, means responsive to actuation of said flight control simulating means for generating analog signals functionally representative of the character and extent of the respective control exercised on said actual helicopter by corresponding actuation of said actual flight control mechanisms, selective switching means simulating power plant ignition and landing apparatus activation conditioning control mechanisms, or any one or combination thereof, aboard said actual helicopter, and means responsive to actuation of said conditioning control simulating means for supplying discrete signals or absence of signals functionally representative of the character of the respective control exercised on said actual helicopter by corresponding actuation of said actual conditioning control mechanism;

data processing means responsive to control-representative signals emanating from said student station for computation therewith according to aerodynamic equations peculiar to said actual helicopter to generate digital information signals representatives of the response of said actual helicopter to the respective control functions exercised by actuation of the control simulating means; and display means at said student station for supplying indications of said actual helicopter response in accordance with the information signals generated by said data processing means.

64. The invention according to claim 63 wherein said data processing means includes digital computer means for computing the effects on said simulator of the moments and forces attributable to operation of the helicopter rotor, as a result of said control functions exercised on the simulated helicopter, by computing the moments and forces occurring at a plurality of distinct points about the rotor at periodic sampling intervals, and averaging the contribution of said plurality of points at each interval.

65. The invention according to claim 64 wherein said data processing means is further responsive to said control-representative signals for deriving analog signals therefrom representative of the character and extent of the movement of an actual helicopter in response to the control functions exercised on the simulated helicopter, and wherein is further provided motion simulating means at said student station for producing limited representative movement of the student position in response to said analog signals derived by said data processing means.

66. The invention according to claim 65 wherein is further included an instructor station having means for selectively setting simulated flight condition and helicopter operation information into the simulation system as actual flight condition and operational parameters to be observed by the student during training, in the form of representative parametric signals applied to said data processing means, said data processing means further responsive to signals received from said instructor station for effecting said computations, said instructor station including means for monitoring the student performance and the response of the simulated helicopter to control functions exercised by the student and the instructor, said monitoring means comprising display means responsive to the information signals generated by said data processing means for indicating the present nature of the parameters being monitored.

67. The invention according to claim 66 wherein said means at said instructor station includes means for preventing the exercise of control functions by the student from affecting the simulated operation of the helicopter.

68. An aircraft simulator for training students to control the operation and flight of an actual aircraft of the type simulated, said simulator comprising a student station, including means for generating electrical signals representative of the control functions exercised by the student to simulate the operation and flight of the actual aircraft, and display means for indicating the simulated flight conditions and the simulated effect of said control functions on the operation and flight of said aircraft;

an instructor station including means for generating electrical signals representative of the simulated flight conditions and aircraft operational parameters selectively controlled by the instructor to provide a realistic impression of actual conditions to the student, and display means for monitoring the simulated performance of the aircraft, and thus the performance of the student, in response to the control functions exercised on the aircraft;

means responsive to the electrical signals generated from said student station and said instructor station for processing thereof and for computing their effect on the performance of the aircraft, the last-named means including means for periodically calculating the overall effect on the performance of the aircraft of parameters simulating moments and forces occurring at a plurality of observation points within the propulsion system of the aircraft, and means for generating digital signals representative of the processing, computations and calculations performed by said last-named means as the simulated response of the aircraft to the control functions exercised by student and instructor; and means for supplying said digital signals in a predetermined format to said student station and to said instructor station to actuate the respective display means thereat.

69. The invention according to claim 68 further including a motion simulating system at said student station responsive to said further signals representative of the motional response of the aircraft to said control functions for effecting limited representative movement of said student station.

References Cited

UNITED STATES PATENTS

| | | | |
|---|---|---|---|
| 2,885,792 | 5/1959 | Hemstreet | 35—12 |
| 3,001,299 | 9/1961 | Packer et al. | 35—12 |
| 3,037,699 | 6/1962 | Lee et al. | 235—154 |

EUGENE R. CAPOZIO, *Primary Examiner.*

P. WILLIAMS, *Assistant Examiner.*